(12) United States Patent
Wu et al.

(10) Patent No.: US 7,378,483 B2
(45) Date of Patent: May 27, 2008

(54) COMPOSITIONS FOR GOLF EQUIPMENT

(75) Inventors: Shenshen Wu, North Dartmouth, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 94 days.

(21) Appl. No.: 11/461,617

(22) Filed: Aug. 1, 2006

(65) Prior Publication Data

US 2007/0093317 A1 Apr. 26, 2007

Related U.S. Application Data

(63) Continuation of application No. 10/859,558, filed on Jun. 2, 2004, now Pat. No. 7,105,623, which is a continuation-in-part of application No. 10/619,313, filed on Jul. 14, 2003, now Pat. No. 6,903,178, and a continuation-in-part of application No. 10/434,739, filed on May 9, 2003, now Pat. No. 6,949,617, and a continuation-in-part of application No. 10/434,738, filed on May 9, 2003, now Pat. No. 6,989,431, and a continuation-in-part of application No. 10/409,144, filed on Apr. 9, 2003, now Pat. No. 6,958,379, which is a continuation-in-part of application No. 10/228,311, filed on Aug. 27, 2002, now Pat. No. 6,835,794, application No. 10/859,558, which is a continuation-in-part of application No. 10/407,641, filed on Apr. 4, 2003, now Pat. No. 6,861,492.

(51) Int. Cl.
*A63B 37/12* (2006.01)
*C08G 18/48* (2006.01)
*C08G 18/12* (2006.01)

(52) U.S. Cl. .............. 528/64; 528/68; 528/73; 473/374; 473/378

(58) Field of Classification Search .............. None
See application file for complete search history.

(56) References Cited

U.S. PATENT DOCUMENTS

| | | |
|---|---|---|
| 2,394,597 A | 2/1946 | Dickey et al. |
| 3,120,502 A | 2/1964 | Merten |
| 3,124,605 A | 3/1964 | Wagner |
| 3,152,162 A | 10/1964 | Fischer et al. |
| 3,201,372 A | 8/1965 | Wagner |
| 3,268,542 A | 8/1966 | Burk, Jr. et al. |
| 3,277,138 A | 10/1966 | Holtschmidt et al. |
| 3,358,042 A | 12/1967 | Dunlop et al. |
| 3,394,164 A | 7/1968 | McClellan et al. |
| 3,454,606 A | 7/1969 | Brotherton et al. |
| 3,455,883 A | 7/1969 | Kamal et al. |
| 3,465,024 A | 9/1969 | Brownstein et al. |
| 3,480,595 A | 11/1969 | Burk, Jr. et al. |
| 3,492,301 A | 1/1970 | Herweh et al. |
| 3,507,900 A | 4/1970 | Burk, Jr. et al. |
| 3,517,039 A | 6/1970 | Wagner et al. |
| 3,560,492 A | 2/1971 | Burk et al. |
| 3,567,763 A | 3/1971 | Emmons et al. |
| 3,644,457 A | 2/1972 | Konig et al. |
| 3,652,507 A | 3/1972 | Burk et al. |
| 3,654,106 A | 4/1972 | Wagner et al. |
| 3,703,542 A | 11/1972 | Alburn et al. |
| 3,738,947 A | 6/1973 | Fishbein et al. |
| 3,753,968 A | 8/1973 | Ward |
| 3,769,318 A | 10/1973 | Windemuth et al. |
| 3,773,697 A | 11/1973 | Olstowski |
| 3,813,365 A | 5/1974 | Frisch et al. |
| 3,813,380 A | 5/1974 | Bock et al. |
| 3,825,554 A | 7/1974 | Burk et al. |
| 3,832,311 A | 8/1974 | Windemuth et al. |
| 3,840,572 A | 10/1974 | Castro |
| 3,929,700 A | 12/1975 | Tybus et al. |
| 3,936,410 A | 2/1976 | Terhune et al. |
| 4,077,989 A | 3/1978 | Schafer et al. |
| 4,088,665 A | 5/1978 | Findeisen et al. |
| 4,120,850 A | 10/1978 | Pechhold |
| 4,123,061 A | 10/1978 | Dusbiber |
| 4,156,095 A | 5/1979 | Jevne et al. |
| 4,294,719 A | 10/1981 | Wagner et al. |
| 4,343,925 A | 8/1982 | Chang et al. |
| 4,344,855 A | 8/1982 | Schafer et al. |
| 4,440,937 A | 4/1984 | Krimm et al. |
| 4,501,905 A | 2/1985 | Krimm et al. |
| 4,508,652 A | 4/1985 | van Dijk et al. |
| 4,536,339 A | 8/1985 | Ritschel et al. |
| 4,560,168 A | 12/1985 | Aoyama |
| 4,582,895 A | 4/1986 | Peerman et al. |
| 4,590,285 A | 5/1986 | Ernst |
| 4,698,426 A | 10/1987 | Meyer et al. |

(Continued)

FOREIGN PATENT DOCUMENTS

JP 2003-342347 3/2003

*Primary Examiner*—David J. Buttner
(74) *Attorney, Agent, or Firm*—William B. Lacy

(57) ABSTRACT

A golf ball comprising a core, an inner cover layer, and an outer cover layer, the outer cover layer being formed from a polyurea comprising:
 a prepolymer comprising:
  an aliphatic isocyanate mixture comprising dimerized uretdione of HDI and trimerized isocyanurate of HDI;
  a first amount of modified polyoxypropylene diamine having a formula:

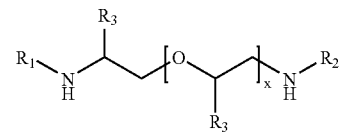

where x=1-70; $R_1$ and $R_2$ each independently=a $C_{1-20}$ alkyl group, phenyl, or a mixture thereof; and $R_3$=$CH_3$, or a mixture thereof; and
 a caprolactone; and
 a curative comprising a mixture of 3,5-diethyl-2,4-toluenediamine and 3,5-diethyl-2,6-toluenediamine.

19 Claims, No Drawings

U.S. PATENT DOCUMENTS

| | | | |
|---|---|---|---|
| 4,739,019 A | 4/1988 | Schappert et al. |
| 4,808,691 A | 2/1989 | Konig et al. |
| 4,925,193 A | 5/1990 | Melvin et al. |
| 4,937,320 A | 6/1990 | Vreeswijk et al. |
| 4,956,438 A | 9/1990 | Ruetman et al. |
| 4,960,281 A | 10/1990 | Aoyama |
| 4,960,849 A | 10/1990 | Okabe et al. |
| 5,001,208 A | 3/1991 | Ross et al. |
| 5,006,297 A | 4/1991 | Brown et al. |
| 5,028,674 A | 7/1991 | Hatch et al. |
| 5,030,674 A | 7/1991 | Notorgiacomo, Jr. |
| 5,053,534 A | 10/1991 | Cosgrove |
| 5,066,762 A | 11/1991 | Ohbuchi et al. |
| 5,071,578 A | 12/1991 | Ohkubo et al. |
| 5,126,170 A | 6/1992 | Zwiener et al. |
| 5,133,898 A | 7/1992 | Fock et al. |
| 5,136,055 A | 8/1992 | Tramount |
| 5,141,978 A | 8/1992 | Ehrend |
| 5,230,714 A | 7/1993 | Steckel |
| 5,236,741 A | 8/1993 | Zwiener et al. |
| 5,248,878 A | 9/1993 | Ihara |
| 5,249,804 A | 10/1993 | Sanchez |
| 5,273,676 A | 12/1993 | Boeckh et al. |
| 5,316,730 A | 5/1994 | Blake et al. |
| 5,326,815 A | 7/1994 | Serdiuk et al. |
| 5,334,673 A | 8/1994 | Wu |
| 5,338,485 A | 8/1994 | Fock et al. |
| 5,484,870 A | 1/1996 | Wu |
| 5,545,692 A | 8/1996 | Kohler et al. |
| 5,562,552 A | 10/1996 | Thurman |
| 5,575,477 A | 11/1996 | Hwang |
| 5,616,679 A | 4/1997 | Fies et al. |
| 5,621,065 A | 4/1997 | Pudleiner et al. |
| 5,661,207 A | 8/1997 | Carlson et al. |
| 5,688,191 A | 11/1997 | Cavallaro et al. |
| 5,692,974 A | 12/1997 | Wu et al. |
| 5,713,801 A | 2/1998 | Aoyama |
| 5,733,428 A | 3/1998 | Calabria et al. |
| 5,792,008 A | 8/1998 | Kakiuchi et al. |
| 5,800,286 A | 9/1998 | Kakiuchi et al. |
| 5,803,831 A | 9/1998 | Sullivan et al. |
| 5,820,488 A | 10/1998 | Sullivan et al. |
| 5,820,491 A | 10/1998 | Hatch et al. |
| 5,833,552 A | 11/1998 | Hamada et al. |
| 5,859,122 A | 1/1999 | Umeya |
| 5,863,627 A | 1/1999 | Szycher et al. |
| 5,885,172 A | 3/1999 | Hebert et al. |
| 5,908,358 A | 6/1999 | Wu |
| 5,919,100 A | 7/1999 | Boehm et al. |
| 5,929,153 A | 7/1999 | Mori et al. |
| 5,929,189 A | 7/1999 | Ichikawa et al. |
| 5,957,787 A | 9/1999 | Hwang |
| 5,959,059 A | 9/1999 | Vedula et al. |
| 5,965,669 A | 10/1999 | Cavallaro et al. |
| 5,981,654 A | 11/1999 | Rajagopalan |
| 5,981,658 A | 11/1999 | Rajagopalan et al. |
| 5,993,968 A | 11/1999 | Umezawa et al. |
| 6,001,424 A | 12/1999 | Lettmann et al. |
| 6,001,915 A | 12/1999 | Schwarte et al. |
| 6,008,312 A | 12/1999 | Shirasaka |
| 6,056,842 A | 5/2000 | Dalton et al. |
| 6,099,415 A | 8/2000 | Lutz |
| 6,103,822 A | 8/2000 | Housel et al. |
| 6,103,852 A | 8/2000 | Shirasaka |
| 6,146,288 A | 11/2000 | Crast et al. |
| 6,149,535 A | 11/2000 | Bissonnette et al. |
| 6,152,836 A | 11/2000 | Bradley et al. |
| 6,159,110 A | 12/2000 | Sullivan et al. |
| 6,162,134 A | 12/2000 | Sullivan et al. |
| 6,177,522 B1 | 1/2001 | Brady et al. |
| 6,187,903 B1 | 2/2001 | Elsasser et al. |
| 6,190,268 B1 | 2/2001 | Dewanjee |
| 6,193,619 B1 | 2/2001 | Wu et al. |
| 6,197,051 B1 | 3/2001 | Zhong |
| 6,203,450 B1 | 3/2001 | Bradley et al. |
| 6,204,331 B1 | 3/2001 | Sullivan et al. |
| 6,207,784 B1 | 3/2001 | Rajagopalan |
| 6,210,294 B1 | 4/2001 | Wu |
| 6,210,295 B1 | 4/2001 | Yoneyama |
| 6,213,898 B1 | 4/2001 | Ogg |
| 6,231,460 B1 | 5/2001 | Higuchi et al. |
| 6,241,622 B1 | 6/2001 | Gobush et al. |
| 6,248,804 B1 | 6/2001 | Lutz |
| 6,252,037 B1 | 6/2001 | Kojima et al. |
| 6,286,364 B1 | 9/2001 | Aoyama et al. |
| 6,290,615 B1 | 9/2001 | Ogg |
| 6,310,174 B1 | 10/2001 | Griswold |
| 6,315,915 B1 | 11/2001 | Hebert et al. |
| 6,338,684 B1 | 1/2002 | Winfield et al. |
| 6,358,161 B1 | 3/2002 | Aoyama |
| 6,371,870 B1 | 4/2002 | Calabria et al. |
| 6,386,992 B1 | 5/2002 | Harris et al. |
| 6,409,615 B1 | 6/2002 | McGuire et al. |
| 6,435,986 B1 | 8/2002 | Wu et al. |
| 6,437,078 B1 | 8/2002 | Smith |
| 6,441,095 B1 | 8/2002 | Keller et al. |
| 6,454,667 B1 | 9/2002 | Iwami |
| 6,462,303 B1 | 10/2002 | Brown |
| 6,476,130 B1 | 11/2002 | Rajagopalan et al. |
| 6,476,147 B1 | 11/2002 | Sullivan et al. |
| 6,488,591 B1 | 12/2002 | Gobush et al. |
| 6,500,073 B1 | 12/2002 | Gobush et al. |
| 6,500,495 B2 | 12/2002 | Lutz |
| 6,506,130 B2 | 1/2003 | Sullivan |
| 6,509,410 B2 | 1/2003 | Ohira et al. |
| 6,518,358 B1 | 2/2003 | Wu |
| 6,528,578 B2 | 3/2003 | Wu |
| 6,540,624 B1 | 4/2003 | Isogawa |
| 6,548,618 B2 | 4/2003 | Sullivan et al. |
| 6,565,455 B2 | 5/2003 | Hayashi et al. |
| 6,565,456 B2 | 5/2003 | Hayashi et al. |
| 6,610,812 B1 | 8/2003 | Wu et al. |
| 6,635,716 B2 | 10/2003 | Voorheis et al. |
| 6,639,024 B2 | 10/2003 | Simonds et al. |
| 6,642,347 B1 | 11/2003 | Baek et al. |
| 6,653,382 B1 | 11/2003 | Statz et al. |
| 6,670,429 B2 | 12/2003 | Appelman et al. |
| 6,705,959 B2 | 3/2004 | Morgan et al. |
| 6,729,976 B2 | 5/2004 | Bissonnette et al. |
| 6,756,436 B2 | 6/2004 | Rajagopalan et al. |
| 6,784,219 B2 | 8/2004 | Heitkamper et al. |
| 6,796,912 B2 | 9/2004 | Dalton |
| 6,800,690 B2 | 10/2004 | Rajagopalan et al. |
| 6,824,476 B2 | 11/2004 | Sullivan et al. |
| 6,846,898 B2 | 1/2005 | Yokota |
| 6,855,764 B2 | 2/2005 | Maier et al. |
| 6,855,793 B2 | 2/2005 | Harris et al. |
| 6,924,347 B2 | 8/2005 | Morgan et al. |
| 6,935,240 B2 | 8/2005 | Gosetti |
| 6,953,820 B2 | 10/2005 | Statz et al. |
| 6,998,445 B2 | 2/2006 | Ladd et al. |
| 7,041,769 B2 | 5/2006 | Wu et al. |
| 2001/0009310 A1 | 7/2001 | Hebert et al. |
| 2001/0031369 A1 | 10/2001 | Reusmann |
| 2002/0115813 A1 | 8/2002 | Shirasaka |
| 2002/0160859 A1 | 10/2002 | Morgan et al. |
| 2002/0160862 A1 | 10/2002 | Morgan et al. |
| 2002/0183443 A1 | 12/2002 | Housel et al. |
| 2002/0193507 A1 | 12/2002 | Reusmann |
| 2003/0050373 A1 | 3/2003 | Chen |
| 2003/0109648 A1 | 6/2003 | Risen, Jr. et al. |
| 2003/0114565 A1 | 6/2003 | Chen et al. |
| 2003/0232666 A1 | 12/2003 | Sullivan |

COMPOSITIONS FOR GOLF EQUIPMENT

CROSS-REFERENCE TO RELATED APPLICATIONS

This application is a continuation of U.S. patent application Ser. No. 10/859,558, filed Jun. 2, 2004 now U.S. Pat. No. 7,105,623, the entire disclosure of which is hereby incorporated herein by reference. The parent application, U.S. patent application Ser. No. 10/859,558, is a continuation-in-part of U.S. patent application Ser. No. 10/407,641, filed Apr. 4, 2003, now U.S. Pat. No. 6,861,492; a continuation-in-part of U.S. patent application Ser. No. 10/434,738, filed May 9, 2003, now U.S. Pat. No. 6,989,431; a continuation-in-part of U.S. patent application Ser. No. 10/434,739, filed May 9, 2003, now U.S. Pat. No. 6,949,617; a continuation-in-part of U.S. patent application Ser. No. 10/619,313, filed Jul. 14, 2003, now U.S. Pat. No. 6,903,178; and a continuation-in-part of U.S. patent application Ser. No. 10/409,144, filed Apr. 9, 2003, now U.S. Pat. No. 6,958,379, which is a continuation-in-part of U.S. patent application Ser. No. 10/228,311, filed Aug. 27, 2002, now U.S. Pat. No. 6,835,794.

DETAILED DESCRIPTION OF THE INVENTION

The present disclosure relates to golf equipment such as golf balls, golf clubs (drivers, putters, woods, irons, and wedges, including heads and shafts thereof), golf shoes, golf gloves, golf bags, or the like that comprise novel polyurethane, polyurea, and/or poly(urethane-co-urea) compositions. The components of the compositions can be saturated, i.e., substantially free of double or triple carbon-carbon bonds or aromatic groups, to produce light stable compositions. Components that are unsaturated or partially saturated can also be used.

The golf ball can comprise at least one thermoplastic, thermoset, castable, or millable material formed from a composition comprising at least one poly(urethane-co-urea) prepolymer and at least one curative. The poly(urethane-co-urea) prepolymer can be formed at least in part from at least one aminoalcohol telechelic and at least one polyisocyanate. The aminoalcohol telechelic can be linear, branched, block, graft, monodisperse, polydisperse, regular, irregular, tactic, isotactic, syndiotactic, stereoregular, atactic, stereoblock, single-strand, double-strand, star, comb, dendritic, and/or ionomeric. The aminoalcohol telechelic can be chosen from homopolymers, random copolymers, pseudo-copolymers, statistical copolymers, alternating copolymers, periodic copolymer, bipolymers, terpolymers, and quaterpolymers. The aminoalcohol telechelic can comprise at least one polymeric structure chosen from polyhydrocarbons, polyethers, polyesters, polyamides, polycarbonates, polyacrylates, polysiloxanes, and copolymers thereof. The composition can further comprise at least one reactant chosen from isocyanates and curatives, or at least one isocyanate-containing prepolymer where the aminoalcohol telechelic is used to cure the prepolymer. The aminoalcohol telechelic can be a reaction product of at least one polyamine telechelic and at least one cyclic compound chosen from cyclic esters and cyclic amides. The polyamine telechelic can have a molecular weight of 200-5,000, and can be a polyether polyamine chosen from diamines and triamines of polyoxyethylene, polyoxypropylene, and poly(oxyethylene-co-oxypropylene). The cyclic compound can be chosen from caprolactone, caprolactone diols, and caprolactone triols. The poly(urethane-co-urea) prepolymer can be an in situ polymerization product of at least one polyamine telechelic, at least one cyclic ester and/or cyclic amide, and at least one polyisocyanate chosen from uretdione dimers and isocyanurate trimers. The poly(urethane-co-urea) prepolymer can have a viscosity of 1,000 cP at temperatures of about 125° C. or less.

The material can at least in part form at least one portion of the golf ball chosen from inner center, core, inner core layer, intermediate core layer, outer core layer, intermediate layer, cover, inner cover layer, intermediate cover layer, outer cover layer, discontinuous layer, wound layer, foamed layer, lattice network layer, web or net, adhesion or coupling layer, barrier layer, layer of uniformed or non-uniformed thickness, layer having a plurality of discrete elements, and layer filled with liquid, gel, powder, and/or gas. In one example, the golf ball can comprise a core comprising at least a first portion, and a cover comprising at least a second portion, wherein the material is disposed in at least one of the first and second portions, and/or between the core and the cover. The material can at least in part form at least one cover layer having a thickness of 0.125 inch or less and a Shore D hardness of 20-80.

Golf equipment can be formed from a variety of compositions. Balata, a natural or synthetic trans-polyisoprene rubber, has been used to form golf ball covers. Olefinic ionomer resins have also been used as cover materials. Chemically, olefinic ionomer resins are copolymers of olefin (such as ethylene) and a,β-ethylenically unsaturated carboxylic acid (such as acrylic acid or methacrylic acid) that have 10% to 100% of the carboxylic acid groups neutralized by cations (such as metal cations). Examples of commercially available olefinic ionomer resins include, but are not limited to, SURLYN® from Du Pont de Nemours and Company, and ESCOR® and IOTEK® from ExxonMobil.

Polyurethanes are useful materials for golf ball covers. Polyurethane covers can be polyurethane prepolymers cured with curing agents having at least one active hydrogen groups (such as amines and/or polyols), wherein the prepolymers are formed of hydroxy-terminated telechelics with polyisocyanates. Polyureas formed of polyurea prepolymers and curatives are relatively new choices for golf ball materials. Polyurethanes and polyureas can be thermoset or thermoplastic, depending at least in part on the curing agent used. Unsaturated components (such as aromatic diisocyanate, aromatic polyol, and/or aromatic polyamine) used in a polyurethane or polyurea composition are at least in part responsible for the composition's susceptibility to discoloration and degradation upon exposure to thermal and actinic radiation, such as ultraviolet (UV) light. Substituting the unsaturated components with partially unsaturated or saturated components can enhance light stability of the composition. Highly light-stable compositions may include only substantially saturated components. As used herein, the term "saturated" or "substantially saturated" means that the compound or material of interest is fully saturated (i.e., contains no double bonds, triple bonds, or aromatic ring structures), or that the extent of unsaturation is negligible, e.g., as shown by a bromine number in accordance with ASTM E234-98 of less than 10, such as less than 5. The compositions of the disclosure may also include at least one light stabilizer to improve light stability, especially when unsaturated (e.g., aromatic) components are used.

Moisture absorption is another mechanism through which desirable physical properties in the composition are compromised. This can be remedied, for example, by incorporating at least one moisture vapor barrier layer in the golf ball. Alternatively, the use of water/moisture-resistant compositions in golf ball components leads to a golf ball with improved shelf-life and/or use-life. Conventional polyurethane and polyurea golf ball covers can be prone to absorption of moisture. Incorporation of hydrophobic backbones into the compositions can reduce moisture absorption and water/moisture permeability, as reflected in reduced water vapor transmission rate (WVTR).

As used herein, the terms "araliphatic," "aryl aliphatic," or "aromatic aliphatic" all refer to compounds that contain one or more aromatic moieties and one or more aliphatic moieties, where the reactable functional groups such as, without limitation, isocyanate groups, amine groups, and hydroxyl groups are directly linked to the aliphatic moieties and not directly bonded to the aromatic moieties. Illustrative examples of araliphatic compounds are o-, m-, and p-tetramethylxylene diisocyanate (TMXDI).

The subscript letters such as m, n, x, y, and z used herein within the generic structures are understood by one of ordinary skill in the art as the degree of polymerization (i.e., the number of consecutively repeating units). In the case of molecularly uniformed products, these numbers are commonly integers, if not zero. In the case of molecularly non-uniformed products, these numbers are averaged numbers not limited to integers, if not zero, and are understood to be the average degree of polymerization.

Any numeric references to amounts, unless otherwise specified, are "by weight." The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer.

As used herein, the term "polymer" is used to refer to oligomers, adducts, homopolymers, random copolymers, pseudo-copolymers, statistical copolymers, alternating copolymers, periodic copolymer, bipolymers, terpolymers, quaterpolymers, other forms of copolymers, substituted derivatives thereof, and mixtures thereof. These polymers can be linear, branched, block, graft, monodisperse, polydisperse, regular, irregular, tactic, isotactic, syndiotactic, stereoregular, atactic, stereoblock, single-strand, double-strand, star, comb, dendritic, and/or ionomeric.

As used herein, the term "telechelic" is used to refer to polymers having at least two terminal reactive end-groups and capable of entering into further polymerization through these reactive end-groups. Reactive end-groups disclosed herein include, without limitation, amine groups, hydroxyl groups, isocyanate groups, carboxylic acid groups, thiol groups, and combinations thereof.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

For molecular weights, whether $M_n$, or $M_w$, these quantities are determined by gel permeation chromatography using polystyrene as standards as is well known to those skilled in the art and such as is discussed in U.S. Pat. No. 4,739,019 at column 4, lines 2-45, which is incorporated herein by reference in its entirety.

As used herein, the terms "formed from" and "formed of" denote open, e.g., "comprising," claim language. As such, it is intended that a composition "formed from" or "formed of" a list of recited components be a composition comprising at least these recited components, and can further comprise other non-recited components during formulation of the composition.

As used herein, the term "cure" as used in connection with a composition, e.g., "a curable material," "a cured composition," shall mean that any crosslinkable components of the composition are at least partially crosslinked. In certain examples of the present disclosure, the crosslink density of the crosslinkable components, i.e., the degree of crosslinking, can range from 5% to 100% of complete crosslinking. In other examples, the crosslink density can range from 35% to 85% of full crosslinking. In other examples, the crosslink density can range from 50% to 85% of full crosslinking. One skilled in the art will understand that the presence and degree of crosslinking, i.e., the crosslink density, can be determined by a variety of methods, such as dynamic mechanical thermal analysis (DMTA) in accordance with ASTM E1640-99.

The compositions of the present disclosure typically comprise a reaction product of a polyisocyanate and one or more reactants. In one example, the reaction product can be a polyurethane formed from a polyurethane prepolymer and a curative, the polyurethane prepolymer being a reaction product of a polyol telechelic and an isocyanate. The polyol telechelic comprises at least two terminal hydroxyl end-groups that are independently primary, secondary, or tertiary. The polyol telechelic can further comprise additional hydroxyl groups that are independently located at the termini, attached directly to the backbone as pendant groups, and/or located within pendant moieties attached to the backbone. The polyol telechelic can be α,ω-hydroxy telechelics having isocyanate-reactive hydroxyl end-groups on opposing termini. All polyol telechelics are polyols, which also include monomers, dimers, trimers, adducts, and the like having two or more hydroxyl groups.

In another example, the reaction product can be a polyurea formed from a polyurea prepolymer and a curative, the polyurea prepolymer being a reaction product of a polyamine telechelic and an isocyanate. The polyamine telechelic comprises at least two terminal amine end-groups that are independently primary or secondary. The polyamine telechelic can further comprise additional amine groups that are independently primary or secondary, and are independently located at the termini, attached directly to the backbone as pendant groups, located within the backbone, or located within pendant moieties that are attached to the backbone. The secondary amine moieties may in part form single-ring or multi-ring heterocyclic structures having one or more nitrogen atoms as members of the rings. The polyamine telechelic can be α,ω-amino telechelics having isocyanate-reactive amine end groups on opposing termini. All polyamine telechelics are polyamines, which also include monomers, dimers, trimers, adducts, and the like having two or more amine groups.

In a further example, the reaction product can be a poly(urethane-urea) formed from a poly(urethane-urea) prepolymer and a curative. The poly(urethane-urea) prepolymer can be a reaction product of an isocyanate and a blend of polyol and polyamine telechelics. Alternatively, the poly(urethane-urea) prepolymer can be a reaction product of an aminoalcohol telechelic and an isocyanate. The aminoalcohol telechelic comprises at least one primary or secondary terminal amine end-group and at least one terminal hydroxyl end-group. The polyamine telechelic can further comprise additional amine and/or hydroxyl groups that are independently located at the termini, attached directly to the backbone as pendant groups, located within the backbone, or located within pendant moieties that are attached to the backbone. The secondary amine moieties may in part form single-ring or multi-ring heterocyclic structures having one or more nitrogen atoms as members of the rings. The aminoalcohol telechelic can be α-amino-ω-hydroxy telechelics having isocyanate-reactive amine and hydroxyl end groups on opposing termini. All aminoalcohol telechelics are aminoalcohols, which also include monomers, dimers, trimers, adducts, and the like having at least one amine group and at least one hydroxyl group.

Any one or combination of two or more of the isocyanate-reactive ingredients disclosed herein can react with stoichiometrically deficient amounts of polyisocyanate such as diisocyanate to form elastomers that are substantially free of hard segments. Such elastomers can have rubber elasticity and wear resistance and strength, and can be millable.

Polyamine Telechelics

Polyamine telechelics have two, three, four, or more amine end-groups capable of forming urea linkages (such as with isocyanate groups), amide linkages (such as with carboxyl group), imide linkages, and/or other linkages with other organic moieties. As such, polyamine telechelics can be reacted with polyacids to form amide-containing polyamine or polyacid telechelics, be reacted with isocyanates to form polyurea prepolymers, and be used as curatives to cure various prepolymers. Any one or more of the hydrogen atoms in the polyamine telechelic (other than those in the terminal amine end-groups) may be substituted with halogens, cationic groups, anionic groups, silicon-based moieties, ester moieties, ether moieties, amide moieties, urethane moieties, urea moieties, ethylenically unsaturated moieties, acetylenically unsaturated moieties, aromatic moieties, heterocyclic moieties, hydroxy groups, amine groups, cyano groups, nitro groups, and/or any other organic moieties. For example, the polyamine telechelics may be halogenated, such as having fluorinated backbones and/or N-alkylated fluorinated side chains.

Any polyamine telechelics available or known to one of ordinary skill in the art are suitable for use in compositions of the present disclosure. The $M_w$ of the polyamine telechelics can be about 100-20,000, such as about 150, about 200, about 230, about 500, about 600, about 1,000, about 1,500, about 2,000, about 2,500, about 3,000, about 3,500, about 4,000, about 5,000, about 8,000, about 10,000, about 12,000, about 15,000, or any $M_w$ therebetween. The polyamine telechelic can comprise one or more hydrophobic and/or hydrophilic segments.

Exemplary polyamine telechelics, such as α,ω-amino telechelics, include polyamine polyhydrocarbons (e.g. polyamine polyolefins), polyamine polyethers, polyamine polyesters (e.g., polyamine polycaprolactones), polyamine polyamides (e.g., polyamine polycaprolactams), polyamine polycarbonates, polyamine polyacrylates (e.g., polyamine polyalkylacrylates), polyamine polysiloxanes, polyamine polyimines, polyamine polyimides, and polyamine copolymers including polyamine polyolefinsiloxanes (such as α,ω-diamino polybutadiene-dimethylsiloxane) and α,ω-diamino poly(isobutylene-dimethylsiloxane)), polyamine polyetherolefins (such as α,ω-diamino poly(butadiene-oxyethylene)), polyamine polyetheresters, polyamine polyethercarbonates, polyamine polyetheramides, polyamine polyetheracrylates, polyamine polyethersiloxanes, polyamine polyesterolefins (such as α,ω-diamino poly(butadiene-caprolactone) and α,ω-diamino poly(isobutylene-caprolactone)), polyamine polyesteramides, polyamine polyestercarbonates, polyamine polyesteracrylates, polyamine polyestersiloxanes, polyamine polyamideolefins, polyamine polyamidecarbonates, polyamine polyamideacrylates, polyamine polyamidesiloxanes, polyamine polyamideimides, polyamine polycarbonateolefins, polyamine polycarbonateacrylates, polyamine polycarbonatesiloxanes, polyamine polyacrylateolefins (such as α,ω-diamino poly(butadiene-methyl methacrylate), α,ω-diamino poly(isobutylene-t-butyl methacrylate), and α,ω-diamino poly(methyl methacrylate-butadiene-methyl methacrylate)), polyamine polyacrylatesiloxanes, polyamine polyetheresteramides, any other polyamine copolymers, as well as blends thereof.

a) Polyamine Polyhydrocarbons

An example of polyamine polyhydrocarbons has a generic structure of:

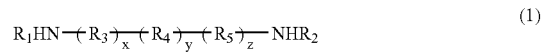

$$R_1HN-(R_3)_x-(R_4)_y-(R_5)_z-NHR_2 \qquad (1)$$

where $R_1$ and $R_2$ are independently chosen from hydrogen, alkyl, aryl, aralkyl, alicyclic, cycloalkyl, and alkoxy groups; $R_3$, $R_4$, and $R_5$ are independently chosen from linear, branched, cyclic (including monocyclic, aromatic, bridged cyclic, spiro cyclic, fused polycyclic, and ring assemblies), saturated, unsaturated, hydrogenated, and/or substituted hydrocarbon moieties having 1 to about 30 carbon atoms; x, y, and z are independently zero to about 200, and x+y+z≥2. $R_1$ and $R_2$ can be linear or branched structures having about 20 carbon atoms or less, such as 1-12 carbon atoms. $R_3$, $R_4$, and $R_5$ can independently have the structure $C_nH_m$, where n is an integer of about 2-20, and m is zero to about 40. Any one or more of the hydrogen atoms in $R_1$ to $R_5$ may be substituted with halogens, cationic groups, anionic groups, silicon-based moieties, ester groups, ether groups, amide groups, urethane groups, urea groups, ethylenically unsaturated groups, acetylenically unsaturated groups, hydroxy groups, amine groups, or any other organic moieties. $R_1$ and $R_2$ can be identical. At least one of $R_3$, $R_4$, and $R_5$ can have the structure $C_nH_{2n}$, n being an integer of about 2-12, and x+y+z is about 5-100.

The polyamine polyhydrocarbon can have one of the following structures:

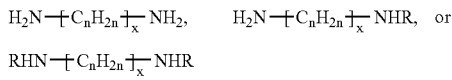

where x is the chain length, i.e., 1 or greater; n is about 1-12; and R is alkyl group having 1 to about 20, such as 1-12, carbon atoms, a phenyl group, a cyclic group, or mixture thereof.

Polyamine polyhydrocarbons are hydrophobic in general, and can provide reduced moisture absorption and permeability to the resulting compositions. Non-limiting examples of polyamine polyhydrocarbons include α,ω-diamino polyolefins such as α,ω-diamino polyethylenes, α,ω-diamino polypropylenes, α,ω-diamino polyethylenepropylenes, α,ω-diamino polyisobutylenes, α,ω-diamino polyethylenebutylenes (with butylene content of at least about 25% by weight, such as at least 50%), amine-terminated Kraton rubbers; α,ω-diamino polydienes such as α,ω-diamino polyisoprenes, partially or fully hydrogenated α,ω-diamino polyisoprenes, amine-terminated liquid isoprene rubbers, α,ω-diamino polybutadienes, partially and/or fully hydrogenated α,ω-diamino polybutadienes; as well as α,ω-diamino poly(olefin-diene)s such as α,ω-diamino poly(styrene-butadiene)s, α,ω-diamino poly(ethylene-butadiene)s, and α,ω-diamino poly(butadiene-styrene-butadiene)s.

One group of polyamine polyhydrocarbons is polyamine polyalkylenes having a plurality of secondary or tertiary amine moieties, such as those having the formula R'HN—(R—N(R'))$_n$—H, where R is the same or different alkyl, aryl, aralkyl, alicyclic, cycloalkyl, and alkoxy groups; R' is the same or different moieties chosen from hydrogen, alkyl, aryl, aralkyl, alicyclic, cycloalkyl, and alkoxy groups; n is about 5 or greater, such as about 10 or greater. R and R' can independently have 1 to about 20 carbon atoms, such as 1-12 carbon atoms, or about 1-4 carbon atoms.

Another group of polyamine polyhydrocarbons is polyamine polydienes, which also include polyamine poly(alkylene-diene)s, as well as blends thereof. Suitable polyamine polydienes have $M_n$ of about 1,000-20,000, such as about 1,000-10,000, or about 3,000-6,000, and an amine functionality of about 1.6-10, such as about 1.8-6, or about 1.8-2. The diene monomers can be conjugated dienes such as 1,3-butadiene, isoprene, 2,3-dimethyl-1,3-butadiene, and mixtures thereof. The polyamine polydiene can be substantially hydrogenated to improve stability, such that at least about 90%, or at least about 95%, of the carbon-carbon double bonds in the polydiene are hydrogenated.

The elastomer compositions of the present disclosure can be resilient. Resilience can be measured, for example, by determining the percentage of the original height to which a ½" steel ball will rebound after being dropped onto an immobilized ½" thick elastomer sample from a height of one meter. A resilient elastomer can display a rebound height percentage of greater than 60%, such as greater than about 70%, or greater than about 75%.

Diamino polydienes and diamino copolydienes, among other polyamine telechelics, are capable of imparting high resiliency in the compositions. The diamino polydiene can be diamino polybutadiene having 1,4-addition of about 30-70%, such as about 40-60%. The diamino polybutadiene can have 1,2-addition of at least about 40%, such as about 40-60%. The hydrogenated diamino polybutadiene can remain liquid at ambient temperature. In one example, the diamino polybutadiene can be more than about 99% hydrogenated, having $M_n$ of about 3,300, an amine functionality of about 1.92, and a 1,2-addition content of about 54%. In another example, the diamino polydiene can be diamino polyisoprene having 1,4-addition of at least about 80% and moderate glass transition temperature and viscosity.

One group of diamino copolydienes has a generic structure of:

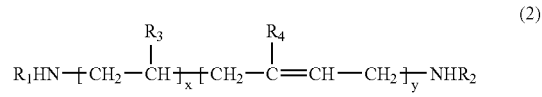

where $R_1$ and $R_2$ are independently chosen from hydrogen, alkyl, aryl, aralkyl, alicyclic, cycloalkyl, and alkoxy groups; $R_3$ is hydrogen, linear or branched alkyl group (such as methyl or t-butyl), cyano group, phenyl group, halide, or a mixture thereof; $R_4$ is hydrogen, linear or branched alkyl group, halide (such as chloride or fluoride), or a mixture thereof; x and y are independently about 1-200. $R_1$ and $R_2$ can be linear or branched, having about 20 carbon atoms or less, such as 1-12 carbon atoms. The y:x ratio can be about 82:18 to about 90:10. The diamino copolydiene can be substantially hydrogenated (i.e., substantially all of the >C=CH— or >C=CH$_2$ moieties are hydrogenated into >CH—CH$_2$— or >C—CH$_3$ moieties, respectively). One example can be hydrogenated diamino poly(acrylonitrile-co-butadiene) where $R_3$ is cyano group and $R_4$ is hydrogen.

Polyamine polyhydrocarbons can also be derived from polyol polyhydrocarbons through means such as amination, or reaction with aminoalcohols, amino acids, or cyclic amides. For example, polyol polyhydrocarbons can be end-capped with 2-, 3-, and/or 4-aminobenzoic acid and the likes thereof as disclosed herein to form aminobenzoate derivatives, e.g., polymethylene-di-p-aminobenzoates.

b) Polyamine Polyethers

An example of the polyamine polyethers has a generic structure of:

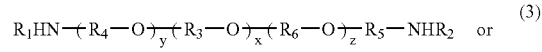

where $R_1$ and $R_2$ are independently chosen from hydrogen, alkyl, aryl, aralkyl, alicyclic, cycloalkyl, and alkoxy groups; $R_3$ to $R_6$ are independently linear, branched, or cyclic moieties having at least one carbon atom, such as about 2-60 carbon atoms; i is about 2-10, such as about 2-6; x is about 1-200, and y and z are independently zero to about 200. $R_1$ and $R_2$ can be linear or branched structures having about 20 carbon atoms or less, such as 1-12 carbon atoms. Any one or more of the hydrogen atoms in $R_1$ to $R_6$ may be substituted with halogens, cationic groups, anionic groups, silicon-based moieties, ester groups, ether groups, amide groups, urethane groups, urea groups, ethylenically unsaturated groups, acetylenically unsaturated groups, hydroxy groups, amine groups, or any other organic moieties. $R_1$ and $R_2$ can be identical. $R_3$ to $R_6$ can independently have the structure $C_nH_m$, where n is an integer of about 1-30, and m is an integer of about 2-60. $R_3$ and $R_5$ can be identical. The number x can be about 2-70, such as about 5-50, or about 12-35. Alternatively, y+z can be about 2-10, while x can be about 8-50.

Commercial examples of polyamine polyethers include, but are not limited to, polyoxyethylene diamines, polyoxypropylene diamines (such as Jeffamine® D2000 from Huntsman Corporation, Austin, Tex.), α,ω-bis(2-aminopropyl)polyoxypropylenes (such as those having $M_w$, about 200-5,000), polyoxytetramethylene diamines, modified polyoxytetramethylene diamines, poly(oxyethylene-oxypropylene) diamines, α,ω-bis(3-aminopropyl)polytetrahydrofurans (such as those having $M_w$ about 200-2,000), poly(oxyethylene-capped oxypropylene)diamines, poly(oxybutylene-oxypropylene-oxyethylene)diamines, polyoxyalkylene diamines initiated by bisphenol A or primary monoamines, tri-block polyether polyamines such as poly(oxypropylene-block-oxyethylene-block-oxypropylene) diamines and poly(oxyethylene-block-oxypropylene-block-oxyethylene)diamines, polyoxypropylene triamines initiated by glycerin, trimethylolethane, or trimethylolpropane, polyoxypropylene tetramines initiated by pentaerythritol, ethylene diamine, phenolic resin, or methyl glucoside, diethylenetriamine-initiated polyoxypropylene pentamines, sorbitol-initiated polyoxypropylene hexamines, and sucrose-initiated polyoxypropylene octamines. Other suitable polyether polyamines include those disclosed in co-pending application Ser. No. 10/434,739.

In one example, the polyamine polyether has the structure of (3), where $R_3$ and $R_5$ are the same linear, branched, or cyclic radicals having at least about 10 carbon atoms, such as at least about 18 carbon atoms, or at least about 30 carbon atoms, and y and z are zero, so that the generic structure becomes $R_1HN—[R_3—O]_x—R_3—NHR_2$, where $R_1$ to $R_3$ are as described above. In one example, $R_3$ is an alkylene moiety, while x is about 1-50, such as about 1.5-30. These polyamine polyethers can be highly hydrophobic. When x is about 10 or less, such as 1.5, 2, 4, 5, 7, or any number therebetween, these polyamine polyethers are typically liquid at ambient temperature, having a viscosity at 25° C. of about 3,000 cP. The hydrophobicity of such polyamine polyethers can enhance hydrolysis resistance of the compositions and reduce moisture absorption.

In another example, the polyamine polyether has the structure of (3), where $R_5$ and $R_6$ are identical, $R_4$ and $R_5$ are the same or different alkylene groups having about 2-40 carbon atoms, such as about 2-20 carbon atoms, or about 2-10 carbon atoms, or about 2-4 carbon atoms, $R_3$ is a backbone of a dimer diol, fatty polyol, or oleochemical polyols as disclosed herein below, x is 1, and 40=(y+z)=1. As such, the structure (3) becomes $R_1HN—[R_4—O]_y—R_3—[O—R_5]_{z+1}—NHR_2$, where $R_1$ to $R_5$ are as described above. These polyamine polyethers are hydrolysis-resistant, and typically have $M_n$ of about 600-3,000.

To enhance resilience of the compositions of the present disclosure, the hydroxy-terminated and/or amine-terminated polymers as described herein can have oxyethylene moieties at the terminals, such as in direct attachment with the amine and/or hydroxyl end-groups, and the content of the terminal oxyethylene moieties can be about 5-30% by weight of the polymer. The oxyethylene moieties can be added to hydroxy-terminated and/or carboxyl-terminated polymers via ring-opening polymerization of ethylene oxide with an alkali catalyst such as alkali metal, alkali metal hydroxide, alkali metal alkoxide, and double metal cyanide complex.

For resilient elastomer compositions, a blend of two polyamine polyethers can be used to react with isocyanate and form the prepolymer, wherein the first polyamine polyether has a first molecular weight of about 3,500-6,500, a first amine functionality of about 3 or less, and a first oxyethylene content of about 8-20% by weight, while the second polyamine polyether has a second molecular weight of about 4,000-7,000, a second amine functionality of about 4-8, and a second oxyethylene content of about 5-15% by weight. The first polyamine polyether may constitute about 70-98% by weight of the blend, while the second polyamine polyether may constitute about 2-30% by weight of the blend. Alternatively, a mixture having about 25-95% of the polyamine polyether blend and about 5-75% of at least a third polyamine telechelic different from the first and second polyamine polyethers is also suitable to formulate a resilient elastomer composition.

In another resilient composition, the polyamine telechelic is a polyether triamine having $M_n$ of about 4,500-6,000 and an average amine functionality of about 2.4-3.5, such as about 2.4-2.7. In a further resilient example, the polyamine polyether may have a weight average unsaturation of about 0.03 meq/g or less (measured by ASTM D-2849-69), such as about 0.02 meq/g or less, or about 0.015 meq/g or less, or about 0.01 meq/g or less, and $M_n$ of about 1,500-5,000. The polyamine polyether may comprise at least one random poly(oxyethylene-oxyalkylene) terminal block or polyoxyethylene terminal block, with an oxyethylene content of about 12-30% by weight. Low unsaturation in the polyamine polyethers of about 0.002-0.007 meq/g is achieved by using double metal cyanide catalysts when forming the polyether backbone. Concomitant to the low unsaturation, the polyamine polyethers may also have a low polydispersity of about 1.2 or less.

In a further example, the polyamine polyether can have repeating branched oxyalkylene monomer units derived from branched diol monomers, chiral diol monomers, alkylated cyclic ethers, and/or chiral cyclic ethers, through homo-polymerization, co-polymerization, and/or ring-opening polymerization. The polyamine polyethers can be obtained by aminating polyol polyethers formed from chiral diol/ether and achiral diol/ether at a molar ratio of about 85:15 to about 20:80. A non-limiting example of such polyol polyethers is referred to as a modified polytetramethylene ether glycol ("PTMEG") diamine, or an amine-terminated poly(tetrahydrofuran-co-methyltetrahydrofuran) ether.

Other generic structures for polyamine polyethers include:

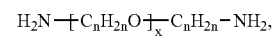

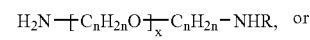

where x is the chain length, i.e., 1 or greater, n is about 1-12, and R is any $C_1$ to $C_{20}$ or $C_1$ to $C_{12}$ alkyl group, phenyl group, cyclic group, or mixture thereof;

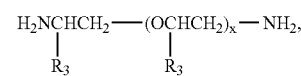

-continued

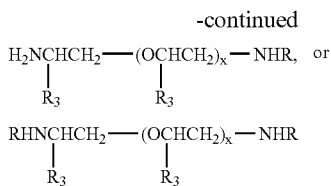

wherein x is about 1-70, such as about 5-50 or about 12-35, R is any $C_1$ to $C_{20}$ or $C_1$ to $C_{12}$ alkyl group, phenyl group, cyclic group, or mixture thereof, and $R_3$ is hydrogen, methyl group, or mixture thereof;

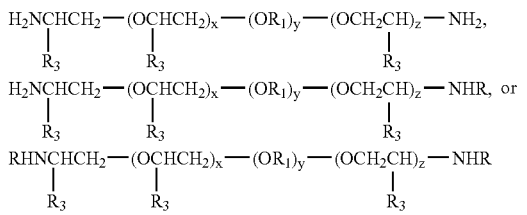

wherein x+z is about 3.6-8, y is about 9-50, R is any $C_1$ to $C_{20}$ or $C_1$ to $C_{12}$ alkyl group, phenyl group, cyclic group, or mixture thereof, $R_1$ is —$(CH_2)_a$— with a being about 1-10, phenylene moiety, cyclic moiety, or mixture thereof, and $R_3$ is hydrogen, methyl group, or mixture thereof, $H_2N$—$R_1$—O—$R_1$—O—$R_1$—$NH_2$, $H_2N$—$R_1$—O—$R_1$—O—$R_1$—NHR, or RHN—$R_1$—O—$R_1$—O—$R_1$—NHR wherein R is any $C_1$ to $C_{20}$ or $C_1$ to $C_{12}$ alkyl group, phenyl group, cyclic group, or mixture thereof, and $R_1$ is —$(CH_2)_a$— with a being about 1-10, phenylene moiety, cyclic moiety, or mixture thereof;

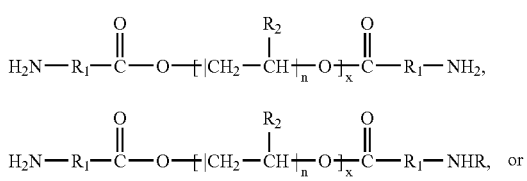

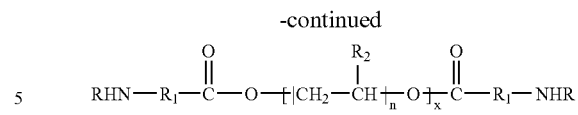

where x and n are chain lengths, i.e., 1 or greater, n is about 1-12, such as about 2, R and $R_1$ are independently chosen from linear or branched alkyl groups having about 1-20 carbon atoms, such as about 1-12 carbon atoms, phenyl group, cyclic group, or mixtures thereof, and $R_2$ is hydrogen, methyl group, or mixture thereof;

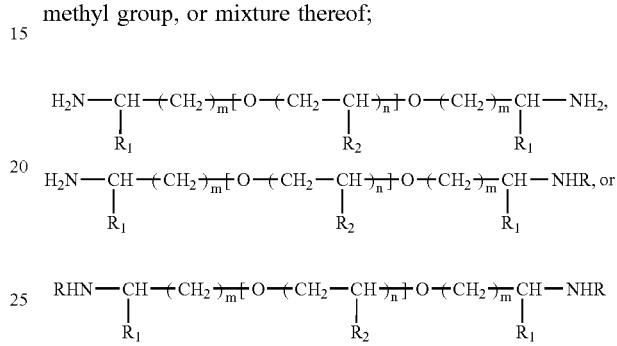

where m is 1 or greater, such as about 1-6, or about 2, m is 1 or greater, such as about 1-12, or about 2, R is any $C_1$ to $C_{20}$ or $C_1$ to $C_{12}$ alkyl group, phenyl group, cyclic group, or mixture thereof, and $R_1$ and $R_2$ are independently chosen from hydrogen, methyl group, or mixture thereof.

c) Polyamine Polyesters

An example of the polyamine polyesters has a generic structure of:

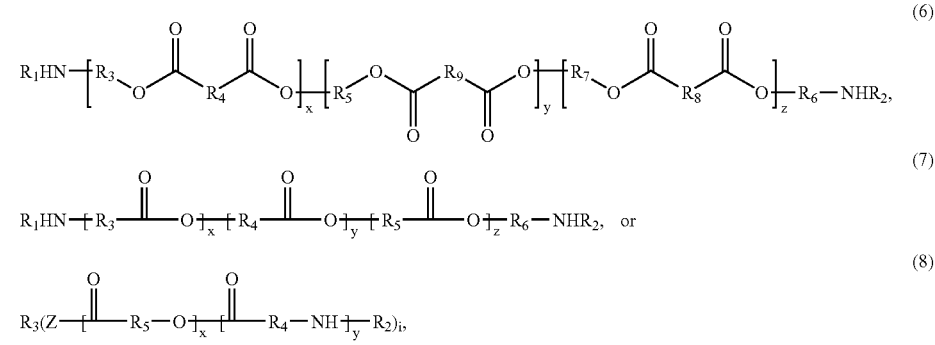

where $R_1$ and $R_2$ are independently chosen from hydrogen, alkyl, aryl, aralkyl, alicyclic, cycloalkyl, and alkoxy groups; $R_3$ to $R_9$ are independently linear, branched, or cyclic moieties having at least one carbon atom, such as about 2-60 carbon atoms; Z is the same or different moieties chosen from —O— and —NH—; i is about 2-10, such as about 2-6; x is the same or different numbers of about 1-200, and y and z are independently zero to about 200. $R_1$ and $R_2$ can be linear or branched structures having about 20 carbon atoms or less, such as 1-12 carbon atoms. $R_3$ to $R_9$ can independently have the structure $C_nH_m$, where n is an integer of about 2-30, and m is an integer of about 2-60. The number y can be 1 or greater, and less than the number x. Any one or more of the hydrogen atoms in $R_1$ to $R_9$ may be substituted with halogens, cationic groups, anionic groups, silicon-based moieties, ester groups, ether groups, amide groups, urethane groups, urea groups, ethylenically unsaturated groups, acetylenically unsaturated groups, hydroxy groups, amine groups, or any other organic moieties. $R_1$ and $R_2$ can be identical. $R_4$ and $R_5$ can be identical. $R_3$ and $R_6$ can be identical, having a structure of $C_nH_{2n}$, n being an integer of about 2-30, x+y+z is about 1-100, such as about 5-50. The number y can be 1 or greater and less than the number x.

Examples of polyamine polyesters include, without limitation, poly(ethylene adipate)diamines, poly(butylene adipate)diamines, poly(1,4-butylene glutarate)diamines, poly(ethylene propylene adipate)diamines, poly(ethylene butylene adipate)diamines, poly(hexamethylene adipate)diamines, poly(hexamethylene butylene adipate)diamines, poly(hexamethylene phthalate)diamines, poly(hexamethylene terephthalate)diamines, poly(2-methyl-1,3-propylene adipate)diamines, poly(2-methyl-1,3-propylene glutarate)diamines, and poly(2-ethyl-1,3-hexylene sebacate)diamines. Non-limiting examples of polyester polyamines based on fatty polyacids or polyacid adducts, such as those disclosed herein, include poly(dimer acid-co-ethylene glycol) hydrogenated diamines and poly(dimer acid-co-1,6-hexanediol-co-adipic acid) hydrogenated diamines.

Other generic structures of polyamine polyesters include:

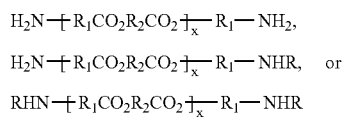

where x is the chain length, i.e., 1 or greater, such as about 1-20, R is any $C_1$ to $C_{20}$ or $C_1$ to $C_{12}$ alkyl group, phenyl group, cyclic group, or mixture thereof, and $R_1$ and $R_2$ are independently chosen from straight or branched hydrocarbon chains, e.g., alkylene or arylene chains.

The polyamine polyester can have a crystallization enthalpy of at most about 70 J/g and $M_n$ of about 1,000-7,000, such as about 1,000-5,000. This polyamine polyester can be blended with a polyamine polyether having $M_n$ of about 500-2,500. The average amine functionality of the blend, which is the ratio of total number of amine groups in the blend to total number of telechelic molecules in the blend, can be about 2-2.1. The polyamine polyester can have an ester content (number of ester bonds/number of all carbon atoms) of about 0.2 or less, such as about 0.08-0.17.

An example of the polyamine polycaprolactones has a generic structure of:

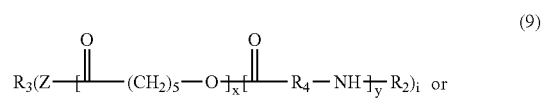

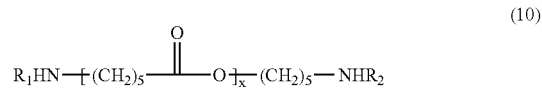

where $R_1$ to $R_4$, Z, i, x are as described above. In one example, x is about 5-100, and y is 1 or greater and less than the number x. Suitable polyamine polycaprolactones include, but are not limited to, amination derivatives of polyol polycaprolactones disclosed herein, such as those products of polyamine-initiated and/or polyol-initiated ring-opening polymerization of caprolactone, and polymerization products of hydroxy caproic acid. Suitable polyamine and polyol initiators include any polyamines and polyols available to one of ordinary skill in the art, such as those disclosed herein, as well as any and all of the polyamine and polyol telechelics of the present disclosure. The caprolactone monomer can be replaced by or blended with any other cyclic esters and/or cyclic amides disclosed herein to produce copolymer telechelics.

d) Polyamine Polyamides

An example of the polyamine polyamides has a generic structure of:

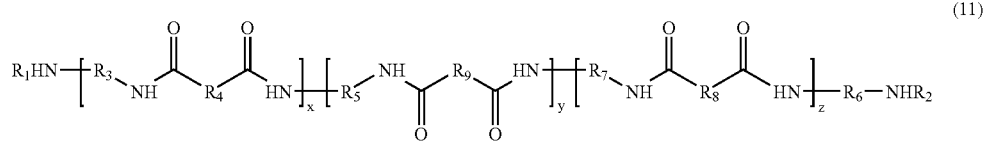

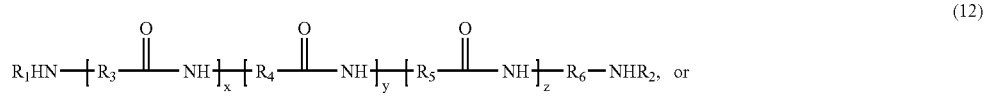

where $R_1$ and $R_2$ are independently chosen from hydrogen, alkyl, aryl, aralkyl, alicyclic, cycloalkyl, and alkoxy groups; $R_3$ to $R_9$ are independently linear, branched, or cyclic moieties having at least one carbon atom, such as about 2-60 carbon atoms; Z is the same or different moieties chosen from —O— and —NH—; i is about 2-10, such as about 2-6; x is the same or different numbers of about 1-200, and y and z are independently zero to about 200. $R_1$ and $R_2$ can be linear or branched structures having about 20 carbon atoms or less, such as 1-12 carbon atoms. $R_3$ to $R_9$ can independently have the structure $C_nH_m$, where n is an integer of about 2-30, and m is an integer of about 2-60. Any one or more of the hydrogen atoms in $R_1$ to $R_9$ may be substituted with halogens, cationic groups, anionic groups, silicon-based moieties, ester groups, ether groups, amide groups, urethane groups, urea groups, ethylenically unsaturated groups, acetylenically unsaturated groups, hydroxy groups, amine groups, or any other organic moieties. $R_1$ and $R_2$ can be identical. $R_3$ and $R_6$ can be identical, having a structure of $C_nH_{2n}$, n being an integer of about 2-30, x+y+z can be about 1-100, such as about 5-50.

The polyamide chain above can be formed from condensation polymerization reaction of polyacid (including polyacid telechelic) and polyamine (including polyamine telechelic), with an equivalent ratio of polyamine to polyacid being greater than 1, such as about 1.1-5 or about 2. Mixtures of polyacid and polyamine can be, for example, hexamethylene diammonium adipate, hexamethylenediammonium terephthalate, or tetramethylene diammonium adipate. Alternatively, the polyamide chain can be formed partially or essentially from ring-opening polymerization of cyclic amides such as caprolactam. The polyamide chain can also be formed partially or essentially from polymerization of amino acid, including those that structurally correspond to the cyclic amides. Obviously, the polyamide chain can comprise multiple segments formed from the same or different polyacids, polyamines, cyclic amides, and/or amino acids, non-limiting examples of which are disclosed herein. Suitable starting materials also include polyacid polymers, polyamine telechelics, and amino acid polymers. At least one polyacid, polyamine, cyclic amide, or amino acid having $M_w$ of at least about 200, such as at least about 400, or at least about 1,000 can be used to form the backbone. A blend of at least two polyacids and/or a blend of at least two polyamines can be used, wherein one has a molecular weight greater than the other. The polyacid or polyamine of smaller molecular weight can contribute to hard segments in the polyamine polyamide, which may improve shear resistance of the resulting elastomer. For example, the first polyacid/polyamine can have a molecular weight of less than 2,000, and the second polyacid/polyamine can have a molecular weight of 2,000 or greater. In one example, a polyamine blend can comprise a first polyamine having a $M_w$ of 1,000 or less, such as Jeffamine® 400 ($M_w$ about 400), and a second polyamine having a $M_w$ of 1,500 or more, such as Jeffamine® 2000 ($M_w$ about 2,000). The backbone of the polyamine polyamide can have about 1-100 amide linkages, such as about 2-50, or about 2-20. Polyamine polyamides can be linear, branched, star-shaped, hyper-branched or dendritic (such as amine-terminated hyper-branched quinoxaline-amide polymers of U.S. Pat. No. 6,642,347, the disclosure of which is incorporated herein by reference).

An example of the polyamine polycaprolactams has a generic structure of:

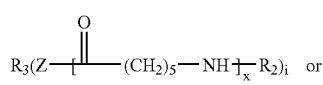

(14)

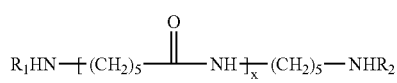

(15)

where $R_1$ to $R_3$, Z, i, x are as described above. The number x can be about 5-100. Polyamine polycaprolactams include, but are not limited to, those products of polyamine-initiated and/or polyol-initiated ring-opening polymerization of caprolactam, and polymerization products of amino caproic acid. Suitable polyamine and polyol initiators include any polyamines and polyols available to one of ordinary skill in the art, such as those disclosed herein, as well as any and all of the polyamine and polyol telechelics of the present disclosure. The caprolactam monomer can be replaced by or blended with any other cyclic esters and/or cyclic amides disclosed herein to produce copolymer telechelics.

Non-limiting examples of polyamine-initiated polycaprolactam polyamines include bis(2-aminoethyl)ether-initiated polycaprolactam polyamines, polyoxyethylenediamine-initiated polycaprolactam polyamines, propylenediamine-initiated polycaprolactam polyamines, polyoxypropylenediamine-initiated polycaprolactam polyamines, 1,4-butanediamine-initiated polycaprolactam polyamines, trimethylolpropane-based triamine-initiated polycaprolactam polyamines, neopentyldiamine-initiated polycaprolactam polyamines, hexanediamine-initiated polycaprolactam polyamines, polytetrahydrofurandiamine-initiated polycaprolactam polyamines, and mixtures thereof. Non-limiting examples of polyol-initiated polycaprolactams are bis(2-hydroxyethyl) ether initiated polycaprolactam polyamines, 2-(2-aminoethylamino) ethanol initiated polycaprolactam polyamines, polyoxyethylene diol initiated polycaprolactam polyamines, propylene diol initiated polycaprolactam polyamines, polyoxypropylene diol initiated polycaprolactam polyamines, 1,4-butanediol initiated polycaprolactam polyamines, trimethylolpropane-initiated polycaprolactam polyamines, hexanediol-initiated polycaprolactam polyamines, polytetramethylene ether diol initiated polycaprolactam polyamines, and mixtures thereof.

Non-limiting examples of polyacid telechelics include polyacid polycaprolactones and polyacid polycaprolactams having generic structures of:

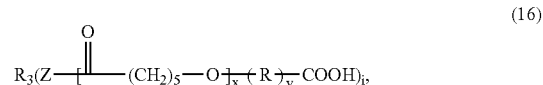

(16)

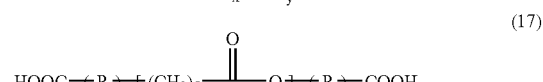

(17)

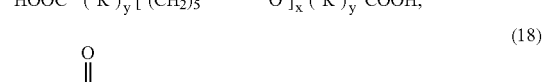

(18)

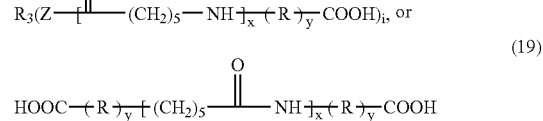

(19)

where $R_3$ is a linear, branched, or cyclic moiety having at least one carbon atom, such as about 2-60 carbon atoms; Z is the same or different moieties chosen from —O— and —NH—; R is the same or different moieties chosen from linear or branched aliphatic, alicyclic, aralphatic, and aromatic moieties having 1-60 carbon atoms; i is about 2-10, such as about 2-6; x is the same or different numbers of about 1-200, such as 5-100; and y is the same or different numbers of 0 or 1.

e) Polyamine Polycarbonates

An example of the polyamine polycarbonates has a generic structure of:

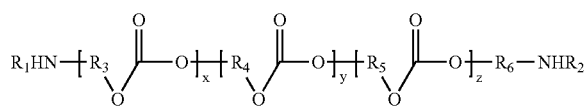
(20)

where $R_1$ and $R_2$ are independently chosen from hydrogen, alkyl, aryl, aralkyl, alicyclic, cycloalkyl, and alkoxy groups; $R_3$ to $R_6$ are independently chosen from linear, branched, cyclic, aliphatic, alicyclic, araliphatic, aromatic, and ether moieties having at least one carbon atom, such as about 2-60 carbon atoms; x is about 1-200, and y and z are independently zero to about 200. $R_1$ and $R_2$ can be linear or branched structures having about 20 carbon atoms or less, such as 1-12 carbon atoms. $R_3$ to $R_6$ can independently have the structure $C_nH_m$, where n is an integer of about 2-30, and m is an integer of about 2-60. Any one or more of the hydrogen atoms in $R_1$ to $R_6$ may be substituted with halogens, cationic groups, anionic groups, silicon-based moieties, ester groups, ether groups, amide groups, urethane groups, urea groups, ethylenically unsaturated groups, acetylenically unsaturated groups, hydroxy groups, amine groups, or any other organic moieties. $R_1$ and $R_2$ can be identical. $R_3$ and $R_6$ can be identical. $R_3$, $R_5$ and $R_6$ can all be identical. The polyamine polycarbonate can be substantially free of ether linkages.

When y and z are both zero, the polyamine polycarbonate can be substantially crystalline. Examples include poly (phthalate carbonate)diamines, poly(hexamethylene carbonate)diamines, and polycarbonate diamines comprising Bisphenol A. When at least one of y and z is greater than zero and $R_3$, $R_4$ and $R_5$ are different from each other, the polyamine polycarbonate becomes amorphous due to reduction in cohesive energy density, and displays lowered crystallinity, lowered hysteresis, and improved impact resistance as compared to crystalline polyamine polycarbonates. Non-limiting examples of $R_3$ to $R_6$ include —$(CH_2)_n$— where n is about 1-16, such as hexamethylene (n=6); —$CH_2C_6H_{10}CH_2$— (1,4-cyclohexane dimethylene); —$C_6H_5C(CH_3)_2C_6H_5$— (bisphenol A); and —$(C_mH_{2m}O)_n$ $C_mH_{2m}$— where m is about 1-6, and n is about 1-16, such as trioxyethylene (m is 2, n is 2). A non-limiting example of such amorphous polyamine copolycarbonate is α,ω-diamino poly(hexamethylene carbonate-block-trioxyethylene carbonate-block-hexamethylene carbonate). Polyamine polycarbonates may be derived from polyol polycarbonates as disclosed herein, for example, through amination. In one example, the polyamine polycarbonate can have at least one segment based exclusively or predominantly on 1,6-hexanediol, in combination with diaryl carbonate, dialkyl carbonate, dioxolanone, phosgene, bis-chlorocarbonate, and/or urea.

Other polyamine polycarbonates can have the following structure:

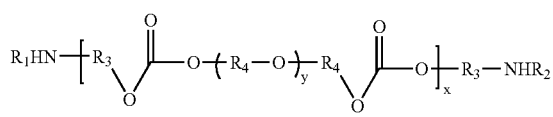
(21)

where $R_1$ and $R_2$ are independently chosen from hydrogen, alkyl, aryl, aralkyl, alicyclic, cycloalkyl, and alkoxy groups; $R_3$ is chosen from linear, branched, cyclic, aliphatic, alicyclic, araliphatic, and aromatic moieties having about 4-40 carbon atoms, and alkoxy moieties having about 2-20 carbon atoms; $R_4$ is chosen from linear, branched, cyclic, aliphatic, alicyclic, araliphatic, and aromatic moieties having about 2-20 carbon atoms, and organic moieties having about 2-4 linear carbon atoms in the main chain with or without one or more pendant carbon groups; x is the same or different numbers of about 2-50, such as about 2-35; and y is the same or different numbers chosen from 0, 1 and 2.

Further polyamine polycarbonates can have one of the following structures:

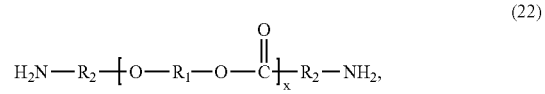
(22)

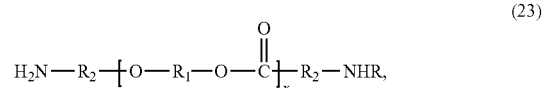
(23)

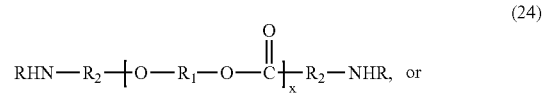
(24)

where x is the chain length, such as about 1-20, $R_1$ is a straight chain hydrocarbon or predominantly bisphenol A units or derivatives thereof, $R_2$ is an alkylene moiety having about 1-20 or about 1-12 carbon atoms, phenylene moiety, cyclic moiety, or mixture thereof, and R is any $C_1$ to $C_{20}$ or $C_1$ to $C_{12}$ alkyl group, phenyl group, cyclic group, or mixture thereof.

f) Polyamine Polyimines

Linear and branched polyamine polyalkyleneimines may have respective generic structures of:

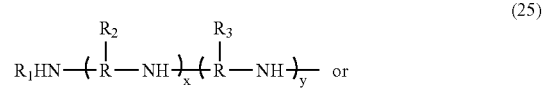
(25)

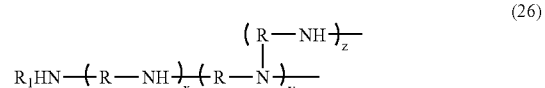
(26)

where R is the same or different linear or branched divalent moieties, such as $C_1$ to $C_6$ alkylene moieties such as methylene, ethylene, propylene, butylene, amylene, or hexylene; $R_1$ is chosen from hydrogen, alkyl, aryl, aralkyl, alicyclic, cycloalkyl, and alkoxy groups; $R_2$ and $R_3$ are the same or different moieties chosen from hydrogen, linear or branched $C_1$ to $C_8$ alkyl groups, linear or branched $C_1$ to $C_8$ hydroxy alkyl groups, aryl groups, and hydroxy aryl groups; x, y, and z are independently about 1-200. $R_1$ can be linear or branched structures having about 20 carbon atoms or less, such as 1-12 carbon atoms. Polyamine polyalkyleneimines can have a greater content of secondary amines (such as about 50% or more) than primary and/or tertiary amines. Linear polyalkyleneimine chains can be prepared by hydrolyzing the corresponding polyalkylene oxazolines (e.g., polyethyleneoxazolines). Branched polyalkyleneimines can be obtained by (co)polymerizing cyclic monomers (e.g., ethylene imine). Non-limiting examples include polyethyleneimines and polypropyleneimines. $M_w$ of polyamine polyalkyleneimines can be as low as about 500 and as high as about 30,000. Polyamine polyimines may further contain grafted polymeric segments such as, without limitation, polyethylene glycol and methoxylated polyethylene glycol. Linear, branched, and grafted polyamine polyimines can be used alone or in combination of two or more thereof.

Linear or branched polyamine polyethyleneimines can have one of the following structures:

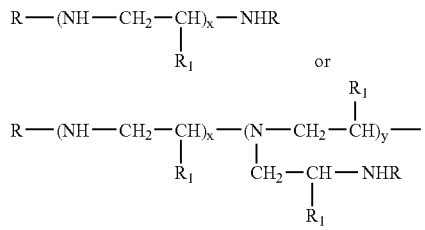

wherein x and y are chain lengths, i.e., greater than 1, R is the same or different moieties chosen from hydrogen, linear or branched alkyl group having 1 to about 20 carbon atoms, such as 1-12 carbon atoms, phenyl group, cyclic group, or mixture thereof, and $R_1$ is chosen from hydrogen, methyl group, or mixture thereof.

Other polyamine polyimines include polypropylenimine tetramine dendrimer, polypropylenimine octamine dendrimer, polypropylenimine hexadecamine dendrimer, polypropylenimine dotriacontamine dendrimer, polypropylenimine tetrahexacontamine dendrimer. These and other hyper-branched and dendritic macromolecules are usable in the compositions of the present disclosure, including dendrimers and tecto-dendrimers (having a core dendrimer surrounded by multiple dendrimers of the same or different structure/surface functionality), and those described in co-owned and co-pending U.S. Application Publication No. 2003/0236137, which are incorporated herein by reference. PAMAM dendrimers can have a variety of cores such as ethylenediamine, cystamine, 1,4-diaminobutane, 1,6-diaminohexane, and 1,12-diaminododecane, different generations from 0 to about 10, such as about 2-6, and a variety of surface end-groups such as amine, hydroxyl, amidoethanol, amidoethylethanolamine, succinamic acid, sodium carboxylate, tris(hydroxymethyl)aminomethane, and combinations thereof. Such dendrimers are available from Dendritic Nanotechnologies of Mt. Pleasant, Mich. and Dendritech of Midland, Mich.

g) Polyamine Polyacrylates

An example of polyamine polyacrylates has a generic structure of:

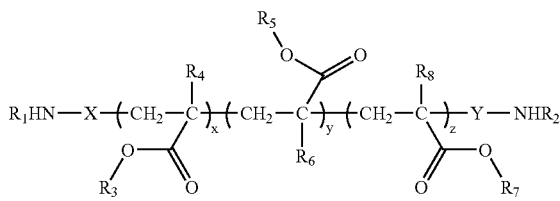

where $R_1$ and $R_2$ are independently chosen from hydrogen, alkyl, aryl, aralkyl, alicyclic, cycloalkyl, and alkoxy groups; $R_3$ to $R_8$ are independently chosen from hydrogen, aliphatic, alicyclic, aromatic, carbocyclic, heterocyclic, halogenated, and substituted moieties, each having less than about 20 carbon atoms; X and Y are optional, independently being linear or branched alkyl, aryl, mercaptoalkyl, ether, ester, carbonate, acrylate, halogenated, or substituted moieties; x is about 1-200, and y and z are independently zero to about 100. $R_1$ and $R_2$ can be linear or branched structures having about 20 carbon atoms or less, such as 1-12 carbon atoms. $R_3$ to $R_8$ can independently be linear or branched moieties having about 20 carbon atoms or less, such as of the structure $C_nH_m$, where n is an integer of about 2-20, and m is an integer of about 2-40. Any one or more of the hydrogen atoms in $R_1$ to $R_8$ may be substituted with halogens, cationic groups, anionic groups, silicon-based moieties, ester groups, ether groups, amide groups, urethane groups, urea groups, ethylenically unsaturated groups, acetylenically unsaturated groups, hydroxy groups, amine groups, or any other organic moieties. $R_1$ and $R_2$ can be identical. $R_4$, $R_6$, and $R_8$ can independently be hydrogen or methyl group, while $R_3$, $R_5$, and $R_7$ can independently have the structure of $C_nH_{2n}$, n being an integer of about 2-16, x+y+z is about 1-100, such as about 5-50. Non-limiting examples of polyalkylacrylate polyamines include α,ω-diamino polymethylmethacrylates, α,ω-diamino polybutylmethacrylates, and α,ω-diamino polyethylhexylmethacrylates.

h) Polyamine Polysiloxanes

An example of polyamine polysiloxanes has a generic structure of:

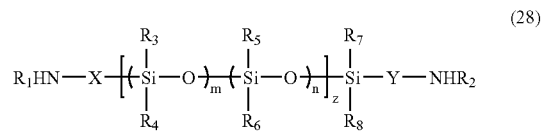

where $R_1$ and $R_2$ are independently chosen from hydrogen, alkyl, aryl, aralkyl, alicyclic, cycloalkyl, and alkoxy groups; $R_3$ to $R_8$ are independently chosen from hydrogen, aliphatic, alicyclic, aromatic, carbocyclic, heterocyclic, halogenated, and substituted moieties, such as $C_1$ to $C_8$ linear, branched or cyclic alkyl or phenyl moieties; X and Y are optional, independently being linear or branched alkyl, aryl, mercaptoalkyl, ether, ester, carbonate, acrylate, halogenated, or substituted moieties; m is about 1-200; n is zero to about 100; z is about 1-100. $R_1$ and $R_2$ can be linear or branched structures having about 20 carbon atoms or less, such as 1-12 carbon atoms. $R_3$ to $R_8$ can independently have linear or branched structure of $C_nH_m$, where n is an integer of about 2-20, and m is an integer of about 2-40. Any one or more of the hydrogen atoms in $R_1$ to $R_8$ may be substituted with halogens, cationic groups, anionic groups, silicon-based moieties, ester groups, ether groups, amide groups, urethane groups, urea groups, ethylenically unsaturated groups, acetylenically unsaturated groups, hydroxy groups, amine groups, etc. $R_1$ and $R_2$ can be identical. In one example, $R_3$=$R_4$, $R_5$=$R_6$, and $R_7$=$R_8$.

Non-limiting examples of polyamine polysiloxanes include bis(aminoalkyl)polydimethylsiloxanes (such as bis (3-aminopropyl)polydimethylsiloxanes), poly(dimethylsiloxane-co-diphenylsiloxane)diamines, poly(dimethylsiloxane-co-methylhydrosiloxane)diamines, and polydimethylsiloxane diamines. Non-limiting examples of polyamine copolymers include polysiloxaneether polyamines obtained by aminating the reaction product of polysiloxane diol and polyether diol and/or cyclic ether, such as poly(dimethylsiloxane-oxyethylene)diamines, and polysiloxaneester polyamines or polysiloxaneamide polyamines obtained by reacting polysiloxane diol with amino acid or cyclic amide, respectively.

i) Fatty Polyamine Telechelics

Fatty polyamine telechelics include hydrocarbon polyamine telechelics, adduct polyamine telechelics, and various oleochemical polyamine telechelics. Hydrocarbon polyamine telechelics can have an all-carbon backbone of about 8-100 carbon atoms, such as about 10, about 12, about 18, about 20, about 25, about 30, about 36, about 44, about 54, about 60, and any numbers therebetween. Fatty polyamine telechelics can be derived from corresponding fatty polyacids, such as by reacting the fatty polyacids with ammonia to obtain the corresponding nitrites which may then be hydrogenated to form the fatty polyamine telechelics. Alternatively, fatty polyamine telechelics can also be derived from corresponding fatty polyol telechelics through, for example, amination, reaction with suitable amino acids or esters thereof, reaction with suitable cyclic amides, or reaction with suitable polyamines or aminoalcohols. These fatty polyamine telechelics can be liquid.

One form of adduct polyamine telechelics can be dimer diamines, which can be aliphatic α,ω-diamines having relatively high molecular weight. Dimer diamines can have a dimer content of greater than about 90%, such as greater than about 95% by weight. The dimer diamines may be unsaturated, partly hydrogenated, or completely hydrogenated (i.e., fully saturated). Non-limiting dimer diamines can have one of the following structures:

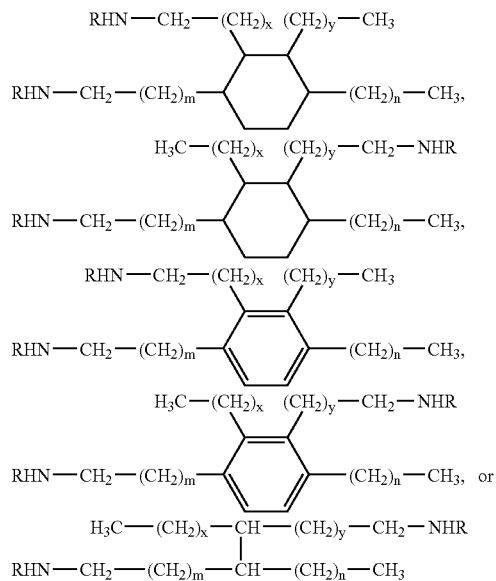

where R is the same or different moieties chosen from hydrogen, alkyl, aryl, aralkyl, alicyclic, cycloalkyl, and alkoxy groups; x+y and m+n are both at least about 8, such as at least about 10, such as 12, 14, 15, 16, 18, 19, or greater.

Molecular weight of fatty polyamine telechelics can be about 200-15,000, such as about 250-12,000, or about 500-5,000. Fatty polyamine telechelics can be liquid at room temperature, having low to moderate viscosity at 25° C. (e.g., about 100-5,000 cP or about 500-3,000 cP). Fatty polyamine telechelics can have a total amine value of at least 150, at least 175, at least 185, at least 250, or at least 280, a primary amine value of at least 100, such as at least 135, at least 150, at least 165, or at least 175, and optionally a secondary amine value of at least 100, such as at least 135. Examples are available from HumKo Chemical of Memphis, Tenn. Fatty polyamine telechelics can be branched, such as with alkyl groups, suitable in forming soft segments, and in formulating solvent-free two pack full solid polyurethane/polyurea compositions. Fluid fatty polyamine telechelics can be used as reactive diluents in solvent-borne polyurethane/polyurea compositions to achieve higher solid content. Conventional volatile solvents such as xylene, butyl acetate, methoxy propylacetate, ethoxy propylacetate may be used in blends thereof.

j) Polyamine Telechelics Derived from Acid-Catalyzed Polyol Telechelics

Polyamines and/or polyamine telechelics can be derived from the acid-catalyzed polyols and/or polyol telechelics of the present disclosure, such as having the structure of $R_1HN-[R-O-]_n-R-NHR_2$, where $R_1$ and $R_2$ are independently chosen from hydrogen, alkyl, aryl, aralkyl, alicyclic, cycloalkyl, and alkoxy groups; R is a linear or branched alkylene radical having about 5 carbon atoms or more, such as about 8, about 10, about 12, about 16, about 18, about 20, about 30, about 36, about 44, and about 54 carbon atoms or more; and n is more than 1, such as about 2 or more. The main chain of R can have at least about 5 carbon atoms, such as about 8 or about 10 carbon atoms or more. For molecularly non-uniform polyamine polyethers, the number n can be about 0.5-5, such as about 1-4. For molecularly uniform polyamine polyethers, the number n can be about 1-10, such as about 3-6. The polyamine polyethers can have an acid value of less than 5, such as about 1-3, and a viscosity at 25° C. of about 3,000 cP or greater, such as about 3,000-12,000 cP.

k) Polyamine Polyethercarbonates

Polyamine polyethercarbonates can be derived from the carbonate-transesterified polyol telechelics as disclosed herein, having $M_w$ of about 500-12,000, such as about 700, about 1,000, about 2,000, about 2,500, about 3,000, about 5,000, about 6,000, or any number therebetween, in which a ratio of ether linkages to carbonate linkages is about 5:1 to about 1:5, such as about 3:1 to about 1:3, and the various alkylene units are arranged statistically, alternately, and/or blockwise. Some of these polyamine polyethercarbonates can be low-melting waxes, having a softening point of less than about 40° C., and a viscosity at 50° C. of about 8,500 or less, such as about 5,000, about 3,500, about 2,000, about 600, or less, or any number therebetween. Some of these polyamine polyethercarbonates can be liquid at room temperature. These polyamine polyethercarbonates can be high in hydrophobicity, hydrolysis resistance, and saponification resistance.

l) Derivatized Polyamine Telechelics

Polyamine telechelics can be derived from corresponding polyacids, such as by reacting the polyacids with ammonia to obtain the corresponding nitrites which may then be hydrogenated to form the polyamine telechelics. Polyamine telechelics can also be derived from corresponding polyol telechelics through, for example, amination, reaction with suitable amino acids or esters thereof, reaction with suitable cyclic amides, or reaction with suitable polyamines or aminoalcohols. Amination, as understood by one of ordinary skill in the art, includes reductive amination of polyether polyols with ammonia and hydrogen in the presence of a catalyst, hydrogenation of cyanoethylated polyols, amination of polyol/sulfonic acid esters, reacting polyols with epichlorohydrin and a primary amine, and any other methods known to the skilled artisan. Fatty polyacids and polyacid adducts such as the dimerized fatty acids as disclosed herein can be converted to fatty polyamines and dimer diamines through one or more of these mechanisms. When cyclic amides are used to form the polyamine telechelics, the non-carbonyl carbon adjoining N can be substituted with at least one cyclic structure (e.g., cyclic hydrocarbons, heterocyclics) or at least two organic moieties selected from halides and $C_1$ to $C_{20}$ linear or branched aliphatic moieties.

The amino acids or esters thereof used to form the polyamine telechelics can have a generic structure of $R'_1HN\text{-}Z'\text{-}COOR'_2$, where $R'_1$ and $R'_2$ are independently chosen from hydrogen, aliphatic, araliphatic, cycloaliphatic, and aromatic moieties; and $Z'$ is a divalent organic moiety. $R'_1$ and $R'_2$ can be linear or branched structures having about 20 carbon atoms or less, such as 1-12 carbon atoms. The amino acids or esters thereof can react with polyol telechelics to form polyamine telechelics having ester linkages. In one example, the polyol telechelic can be a polyol polyether, and the derived polyamine telechelic can be a polyamine polyetherester having a generic structure of:

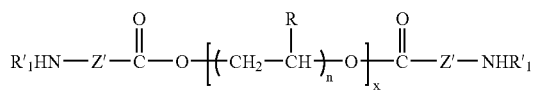

(29)

where $R'_1$, $R'_2$, and $Z'$ are as described above, R is chosen from hydrogen, linear or branched alkyl group (such as methyl), phenyl group, halide, and mixture thereof, n is about 1-12, and x is about 1-200. Such polyamine polyetheresters can be obtained by end-capping polyol polyethers with 4-aminobenzoic acid and methyl or ethyl esters thereof, e.g., poly(1,4-butanediol)-bis(4-aminobenzoate) in liquid or waxy solid form, polyethyleneglycol-bis(4-aminobenzoate), polytetramethylene ether glycol-di-p-aminobenzoate, polypropyleneglycol-di-p-aminobenzoate, and mixtures thereof.

The reactivity of the reactive amine end-groups in polyamine telechelics can be moderated to improve molecular stability of the resulting products toward actinic radiations such as UV light, by means of, for example, increasing steric hinderance around these amine end-groups. To impart hightened steric hinderance, the amino acids or esters of the generic structure above can have at least one branched aliphatic or substituted cyclic structure in $Z'$, wherein at least one structural condition chosen from the following is met: i) both $R'_1HN$ and $COOR'_2$ adjoin a single carbon atom; ii) $R'_1HN$ adjoins a tertiary carbon atom in $Z'$, iii) $R'_1HN$ adjoins a secondary carbon atom (such as a methine carbon) in $Z'$, the secondary carbon being further adjoined to two other carbon atoms selected from tertiary and quaternary carbons; and iv) $R'_1HN$ adjoins a secondary carbon atom in $Z'$, the secondary carbon being further adjoined to a quaternary carbon atom that adjoins $COOR'_2$. Generic structures of such amino acids or esters thereof include the following:

(30)

(31)

(32)

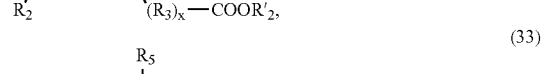

(33)

(34)

where $R'_1$ and $R'_2$ are as described above; $R_1$, $R_2$, $R_4$, and $R_5$ are independently chosen from linear or branched $C_1$ to $C_{60}$ organic moieties, such as $C_1$ to $C_{20}$ aliphatic hydrocarbon moieties, or $C_1$ to $C_{12}$ alkyl groups; $R_3$ is linear or branched $C_1$ to $C_{60}$ organic moiety, such as $C_1$ to $C_{20}$ aliphatic hydrocarbon moiety, or $C_1$ to $C_{12}$ alkylene moiety; $R_6$ and $R_7$ are the same or different linear or branched, substituted or unsubstituted, organic moieties having about 20 carbon atoms or less, such as $C_1$ to $C_{12}$ aliphatic hydrocarbon moieties, or $C_1$ to $C_4$ alkylene moieties; and x, y, and z are independently 0 or 1. $R'_1$ and $R_1$ to $R_7$ may independently be linear or branched, substituted (such as halogenated) or unsubstituted, have one or more heteroatoms such as O, N, S, P, or Si, and/or have one or more cyclic structures. Suitable cyclic structures can be substituted or unsubstituted, saturated or unsaturated, having five or more ring members, three or more of which can be carbon atoms, and include monocyclics, polycyclics (fused, spiro, and/or bridged), and heterocyclics. A non-limiting example of suitable amino acids is 1-aminocyclopentane carboxylic acid.

One group of polyamine telechelics can be derived from the derivatized polyol telechelics as disclosed herein, thereby having ring-opened cyclic ether moieties at the termini attaching to the amine end-groups. General structure of such telechelics can be $R_1HN\text{—}(Y\text{—}O)_m\text{—}X\text{—}O\text{-}(Z\text{-}O)_n\text{—}NHR_2$, where $R_1$ and $R_2$ are independently chosen from hydrogen, alkyl, aryl, aralkyl, alicyclic, cycloalkyl, and alkoxy groups; X is the backbone of the starting polyol telechelic HO-Z-OH; Y is the organic moiety of cyclic ether

Z is the organic moiety of cyclic ether

m and n are the same or different numbers of 0 or more, and m+n is about 2-100, such as about 2-40. Y and Z can be the same or different, and can have 2 or more carbon atoms or 5 or more carbon atoms. Y and Z can independently have one or more heteroatoms such as O, S, N, and Si. The molecular weight of segment Z-O can be at least about 1% by weight of the $M_w$ of the polyamine telechelic, the latter of which can be about 500-20,000, such as about 600, about 1,000, about 2,000, about 3,000, about 5,000, about 8,000, about 10,000, about 12,000, about 15,000, and any number therebetween.

m) Ethylenically and/or Acetylenically Unsaturated Polyamine Telechelics

Any of the polyamine telechelics disclosed herein above may comprise one, two, or a plurality of ethylenic and/or acetylenic unsaturation moieties. These unsaturation moieties can be used to form carbon-carbon and/or ionic crosslinks in combination with vulcanizing agents (i.e., radical initiators, polyisocyanates, co-crosslinking agents, curatives comprising ethylenic and/or acetylenic unsaturation moieties, and/or processing aids). These unsaturation moieties may be pendant along the backbone of the polyamine telechelics, attached to pendant groups or chains branched off the backbone, and/or attached to the amine end-groups of the polyamine telechelics.

For example, ethylenically and/or acetylenically unsaturated polyamine polyhydrocarbons include, without limitation, those having high or low vinyl polyolefin backbones. These backbones can be formed from one or more diene monomers, optionally with one or more other hydrocarbon monomers. Exemplary diene monomers include conjugated dienes containing 4-12 carbon atoms, such as 1,3-butadiene, isoprene, chloroprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene, and the like; non-conjugated dienes containing 5-25 carbon atoms such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclononadienes such as 3-methylbicyclo-(4,2,1)-nona-3,7-diene, and the like, indenes such as methyl tetrahydroindene, and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, and the like; and tricyclodienes such as 3-methyltricyclo(5,2,1,0$^{2,6}$)-deca-3,8-diene and the like.

Non-limiting examples of vinyl polyolefin backbones are vinyl polybutadienes, vinyl polyisoprenes, vinyl polystyrenebutadienes, vinyl polyethylenebutadienes, vinyl poly(styrene-propylene-diene)s, vinyl poly(ethylene-propylene-diene)s, and fluorinated or perfluorinated derivatives thereof. High 1,2-vinyl content can be at least about 40%, such as 50%, 60%, 70%, 80%, 90%, or even greater. Low 1,2-vinyl content can be less than about 35%, such as 30%, 20%, 15%, 12%, 10%, 5%, or even less. The vinyl polyolefin backbone can have various combinations of cis-, trans-, and vinyl structures, such as having a trans-structure content greater than cis-structure content and/or 1,2-vinyl structure content, having a cis-structure content greater than trans-structure content and/or 1,2-vinyl structure content, or having a 1,2-vinyl structure content greater than cis-structure content or trans-structure content.

Other ethylenically and/or acetylenically unsaturated moieties that may be incorporated onto the backbone of the polyamine telechelics include allyl groups and α,β-ethylenically unsaturated $C_3$ to $C_8$ carboxylate groups. Non-limiting examples of such ethylenically unsaturated moieties include acrylate, methacrylate, fumarate, β-carboxyethyl acrylate, itaconate, and others unsaturated carboxylates disclosed herein. These unsaturated moieties can attach to the amine groups on the polyamine telechelics by forming amide linkages. The incorporation of these unsaturated moieties may take place before the formation of prepolymer, or after the prepolymer is reacted with stoichiometrically excessive amounts of polyamine and/or polyol curatives.

Ethylenically and/or acetylenically unsaturated polyamine polyhydrocarbons can be liquid at ambient temperature, such as those having vinyl polybutadiene homopolymers or copolymers as backbones, and can have low to moderate viscosity, low volatility and emission, high boiling point (such as greater than 300° C.), and molecular weight of about 1,000 to about 5,000, such as about 1,800 to about 4,000, or about 2,000 to about 3,500.

Polyamines

Polyamines suitable for use in the present disclosure include any and all organic compounds having two, three, four, or more amine groups in the molecule that are capable of forming urea linkages (such as with isocyanate groups) or amide linkages (such as with carboxyl group). The polyamine can be aromatic, araliphatic, aliphatic, alicyclic, heterocyclic, saturated or unsaturated, and each molecule has at least two isocyanate-reactive amine groups independently being primary or secondary. Depending on the number of isocyanate-reactive amine groups being present, polyamines may be referred to as diamines, triamines, tetramines, and other higher polyamines.

a) Aromatic Polyamines

Aromatic polyamines may have one or more monocyclic or aromatic polycyclic (fused, spiro, and/or bridged) aromatic rings, where at least two isocyanate-reactive amine groups are directly attached to the rings. Aromatic polyamines can have about 6-60 carbon atoms, such as about 6-22 carbon atoms. Non-limiting examples of single-ring aromatic diamines include o-, m-, or p-phenylenediamine, 1,2-, 1,3-, or 1,4-bis(sec-butylamino)benzene, toluene diamine, 3,5-diethyl-(2,4- or 2,6-)toluenediamine, 3,5-dimethylthio-(2,4- or 2,6-)toluenediamine, and 3,5-diethylthio-(2,4- or 2,6-)toluenediamine. Illustrative examples of fused polycyclic aromatic diamines are 1,4-, 1,6-, 1,8-, and 2,7-diaminonaphthalene.

Non-limiting examples of dual-ring aromatic polyamines include 4,4'-diaminodiphenyl ether, 4,4'-diaminodiphenylmethane ("MDA"), 4,4'-diaminodiphenylpropane, 3,3'-dimethyl-4,4'-diaminodiphenylmethane, 3,3'-diethyl-5,5'-dimethyl-4,4'-diaminodiphenylmethane, 3,3'-dichloro-4,4'-diaminodiphenylmethane ("MOCA"), 3,3'-diethyl-5,5'-dichloro-4,4'-diaminodiphenylmethane, 3,3',5,5'-tetraethyl-4,4'-diaminodiphenylethane ("MDEA"), 3,3',5,5'-tetraisopropyl-4,4'-diaminodiphenylmethane, 3,3'-dimethyl-5,5'-diisopropyl-4,4'-diaminodiphenylmethane, 3,3'-diethyl-5,5'-diisopropyl-4,4'-diaminodiphenylmethane, 3,3'-dimethyl-5,5'-di-t-butyl-4,4'-diaminodiphenylmethane, 2,2'-dichloro-3,3',5,5'-tetraethyl-4,4'-diaminodiphenylmethane ("MCDEA"), 3,3'-dichloro-4,4'-diaminodiphenylmethane, 2,2',3,3'-tetrachloro-4,4'-diaminodiphenylmethane ("MDCA"), 3,3'-dichloro-2,2',6,6'-tetraethyl-4,4'-diaminodiphenylmethane, 4,4'-bis(sec-butylamino)-diphenylmethane, and N,N'-dialkylamino-diphenylmethane.

b) Araliphatic Polyamines

Araliphatic polyamines may have one or more monocyclic or polycyclic (fused, spiro, and/or bridged) aromatic rings having substituted aliphatic chains, where at least two isocyanate-reactive amine groups are attached to the aliphatic chains rather than the aromatic rings. Araliphatic polyamines can have about 6-60 carbon atoms, such as about 6-22 carbon atoms. Non-limiting examples of araliphatic polyamines include aminoalkylbenzenes such as o-, m-, or p-xylylenediamine.

c) Aliphatic Polyamines

Aliphatic polyamines have a linear or branched, saturated or unsaturated, substituted or unsubstituted primary aliphatic chain, optionally having heteroatoms such as N, O, S, or Si present in the primary chain, where at least two isocyanate-reactive amine groups are attached to the primary chain or side chains or pendant moieties branching off the primary chain. Aliphatic polyamines can have about 60 carbon atoms or less, such as about 2-30 carbon atoms. Non-limiting examples of aliphatic diamines include primary diamines such as ethylene diamine, 1,3-propylene diamine, 2-methyl-pentamethylene diamine, 1,3-pentanediamine, neopentyl-diamine, hexamethylene diamine, 2,2,4- and 2,4,4-trimethyl-1,6-hexane diamine, imino-bis(propylamine), methylimino-bis(propylamine) (i.e., N-(3-aminopropyl)-N-methyl-1,3-propanediamine, N,N-bis(aminopropyl)methylamine), N,N-bis(aminopropyl)ethylamine, N,N-bis(aminopropyl)hexylamine, and N,N-bis(aminopropyl)octylamine; secondary diamines such as N,N'-diethylmaleate-2-methylpentamethylene diamine (Desmophen® NH 1220); primary/secondary diamines such as 2-(ethylamino)ethylamine, 3-(methylamino)propylamine, and N,N-dimethyldipropylenetriamine. Other aliphatic polyamines, such as fatty polyamines, alkylene polyamines, alkoxylated diamines, hydroxy polyamines, and condensed polyamines are disclosed in detail herein.

d) Alicyclic Polyamines

Alicyclic polyamines may have one or more carbon-based, saturated or hydrogenated, monocyclic or polycyclic (fused, spiro, and/or bridged) rings, optionally having substituted aliphatic chains on the rings or linking multiple rings, where at least two isocyanate-reactive amine groups are attached to the rings and/or the aliphatic chains. Alicyclic polyamines can have about 6-60 carbon atoms, such as about 6-30 carbon atoms. Non-limiting examples of alicyclic diamines include monocyclics such as 1,2-, 1,3-, or 1,4-diamino-cyclohexane, 1-methyl-2,6-diamino-cyclohexane, 1,3- or 1,4-bis(methylamino)-cyclohexane, 1,2-, 1,3-, or 1,4-bis(aminomethyl)cyclohexane, 1,2- or 1,4-bis(sec-butylamino)-cyclohexane, isophorone diamine, and N,N'-diisopropyl-isophorone diamine (Jefflink® 754); and polycyclics such as 2,2'-, 2,4'-, or 4,4'-diamino-dicyclohexylmethane, 3,3'-dimethyl-4,4'-diamino-dicyclohexylmethane (i.e., dimethyl dicykan), 3,3'-diethyl-5,5'-dimethyl-4,4'-diamino-dicyclohexylmethane, 3,3'-dichloro-4,4'-diamino-dicyclohexylmethane, 3,3'-diethyl-5,5'-dichloro-4,4'-diamino-dicyclohexylmethane, 3,3',5,5'-tetraethyl-4,4'-diamino-dicyclohexylmethane (a.k.a. 4,4'-methylene-bis(2,6-diethylaminocyclohexane)), 2,2'-dichloro-3,3',5,5'-tetraethyl-4,4'-diamino-dicyclohexylmethane, 3,3'-dichloro-4,4'-diamino-dicyclohexylmethane, 2,2',3,3'-tetrachloro-4,4'-diamino-dicyclohexylmethane, 3,3'-dichloro-2,2',6,6'-tetraethyl-4,4'-dicyclohexylmethane, 4,4'-bis(sec-butylamino)-dicyclohexylmethane (Clearlink® 1000), N,N'-dialkylamino-dicyclohexylmethane, 3,3'-dimethyl-4,4'-bis(sec-butylamino)-dicyclohexylmethane (Clearlink® 3000), N,N'-di(ethylmaleate-amino)-dicyclohexylmethane (Desmophen® NH 1420), N,N'-di(ethylmaleate-amino)-dimethyl-dicyclohexylmethane (Desmophen® 1520), 4,4'-diamino-dicyclohexylpropane, 2,5- or 2,6-bis(aminomethyl)norbornane, and bis(aminomethyl)tricyclodecane (TCD diamine), e) Heterocyclic Polyamines Heterocyclic polyamines may have one or more saturated or unsaturated, monocyclic or polycyclic (fused, spiro, and/or bridged) rings having one or more heteroatoms, such as O, N, and S, optionally having substituted aliphatic chains on the rings or linking multiple rings, where at least two isocyanate-reactive amine groups are attached to the rings and/or the aliphatic chains, or in part form the rings. Heterocyclic polyamines can have about 4-60 carbon atoms, such as about 4-30 carbon atoms, and include aziridines, azetidines, azolidines, pyridines, pyrroles, indoles, piperidines, imidazoles, imidazolines, piperazines, isoindoles, purines, morpholines, thiomorpholines, oxazolidines, thiazolidines, N-aminoalkylmorpholines, N-aminoalkylthiomorpholines, N-aminoalkylpiperazines, N,N'-diaminoalkylpiperazines, azepines, azocines, azonines, azecines, tetra-, di- and perhydro derivatives thereof, and mixtures of two or more thereof. Saturated 5- and 6-membered heterocyclic polyamines can comprise only N, O, and/or S in the hetero ring, such as piperidines, piperazines, thiomorpholines, morpholines, pyrrolidines, aminoalkyl-substituted derivatives thereof, and the like. The aminoalkyl substituents can be substituted on a nitrogen atom forming part of the hetero ring.

Non-limiting examples of heterocyclic diamines include piperazine, N-(aminoalkyl)piperazine, N-(aminoethyl)piperazine, N-(aminopropyl)piperazine, bis(aminoalkyl)piperazine, bis(aminoethyl)piperazine, bis(aminopropyl)piperazine, 2-, 3-, or 4-aminomethyl-piperidine, aminoethylpiperazine, aminopropylpiperazine, bis(piperidyl) alkane, 1,3-di(4-piperidyl)propane, 3-amino-pyrrolidine, homopiperazine, 2-methyl-piperazine, cis-2,6-dimethyl-piperazine, 2,5-dimethyl-piperazine, N-(2-imidazole) piperazine, histamine (i.e., 4-(β-aminoethyl)imidazole), N-(aminoethyl)imidazole, N-(aminopropyl)imidazole, and N-aminopropylmorpholine.

f) Triamines, Tetramines, and Higher Polyamines

Non-limiting examples of triamines include diethylene triamine, dipropylene triamine, N-(aminopropyl)ethylenediamine, N-(aminoethyl)butylenediamine, N-(aminopropyl)butylenediamine, N-(aminoethyl)hexamethylenediamine, N-(aminopropyl)hexamethylenediamine, 4-aminomethyloctane-1,8-diamine, (propylene oxide)-based triamines (a.k.a. polyoxypropylene triamines), trimethylolpropane-based triamines, glycerin-based triamines, 3-(2-aminoethyl)aminopropylamine (i.e., N-(2-aminoethyl)-1,3-propylenediamine, $N_3$-amine), N,N-bis(2-((aminocarbonyl)amino)ethyl)urea, N,N',N''-tris(2-aminoethyl)methanetriamine, N1-(5-aminopentyl)-1,2,6-hexanetriamine, 1,1,2-ethanetriamine, N,N',N''-tris(3-aminopropyl)methanetriamine, N1-(2-aminoethyl)-1,2,6-hexanetriamine, N1-(10-aminodecyl)-1,2,6-hexanetriamine, 1,9,18-octadecanetriamine, 4,10,16,22-tetraazapentacosane-1,13,25-triamine, N1-(3-((4-((3-aminopropyl)amino)butyl)amino)propyl)-1,2,6-hexanetriamine, di-9-octadecenyl-(Z,Z)-1,2,3-propanetriamine, 1,4,8-octanetriamine, 1,5,9-nonanetriamine, 1,9,10-octadecanetriamine, 1,4,7-heptanetriamine, 1,5,10-decanetriamine, 1,8,17-heptadecanetriamine, 1,2,4-butanetriamine, 1,3,5-pentanetriamine, N1-(4-((3-aminopropyl)amino)butyl)-1,2,6-hexanetriamine, 2,5-dimethyl-1,4,7-heptanetriamine, N1-6-aminohexyl-1,2,6-hexanetriamine, 6-ethyl-3,9-dimethyl-3,6,9-undecanetriamine, 1,5,11-undecanetriamine, 1,6,11-undecanetriamine, N,N-bis(aminomethyl)methanediamine, N,N-bis(2-aminoethyl)-1,3-propanediamine, methanetriamine, N1-(2-aminoethyl)-N-2-(3-aminopropyl)-1,2,5-pentanetriamine, N1-(2-aminoethyl)-1,2,6-hexanetriamine, 2,6,11-trimethyl-2,6,11-dodecanetriamine, 1,1,3-propanetriamine, 6-(aminomethyl)-1,4,9-nonanetriamine, 1,2,6-hexanetriamine N2-(2-aminoethyl)-1,1,2-ethanetriamine, 1,3,6-hexanetriamine, N,N-bis(2-aminoethyl)-1,2-ethanediamine, 3-(aminomethyl)-1,2,4-butanetriamine, 1,1,1-ethanetriamine, N1,N1-bis(2-aminoethyl)-1,2-propanediamine, 1,2,3-propanetriamine, and 2-methyl-1,2,3-propanetriamine (all saturated). Non-limiting examples of tetramines include triethylene tetramine (i.e., bis(aminoethyl)ethylenediamine), tetraethylene tetramine, tripropylene tetramine, N,N'-bis(3-aminopropyl) ethylenediamine (a.k.a. N$_4$-amine, N,N'-1,2-ethanediylbis-(1,3-propanediamine), 1,5,8,12-tetrazadodecane), bis(aminoethyl)propylenediamine, bis(aminoethyl)butylenediamine, bis(aminopropyl)butylenediamine, bis(aminoethyl)hexamethylenediamine, bis(aminopropyl)hexamethylenediamine. Illustrative examples of other higher polyamines include tetraethylene pentamine (also saturated). pentaethylene hexamine, polymethylenepolyphenylamine.

g) Fatty Polyamines

Fatty polyamines can have in the main carbon chain at least about 8 carbon atoms (including carbon atom(s) in the carboxylic acid group(s), if directly attached to the main carbon chain), such as 10, 12, 16, 18, 20, 22, 28, 30, 36, 40, 44, 50, 54, or 60 carbon atoms, or any numbers therebetween. The main carbon chain can be directed attached to at least one, such as two or more, isocyanate-reactive amine functionality, which can be primary and/or secondary. The fatty polyamines can be monomer diamines, dimer diamines or trimer triamines derived from fatty polyacids disclosed herein, using textbook techniques such as by reacting the dimerized fatty acids with ammonia to obtain the corresponding dimerized fatty nitriles which may then be hydrogenated to form the dimer diamines.

The fatty polyamines can have the formula R$_1$—(NH—R$_2$)$_x$—NH$_2$ where R$_1$ is a linear or branched alkyl group having about 8-40 carbon atoms, such as about 10-35 carbon atoms, or about 12-18 carbon atoms; R$_2$ is a divalent moiety having 1 to about 8 carbon atoms, such as about 2-6 carbon atoms, or about 2-4 carbon atoms; and x is about 1-6, such as about 1-4. R$_1$ and R$_2$ can be linear or branched, saturated or unsaturated, or combination thereof. R$_1$ can be chosen from linear decyl, dodecyl, hexadecyl and octadecyl, R$_2$ can be ethylene or propylene, and x is about 1-3. These fatty polyamines may be prepared by conventional methods, such as sequential cyanoethylation reduction reactions. Commercially available examples include those with R$_1$ being octadecyl, R$_2$ being propylene, and x being 1, 2 or 3 (tallow diamine, tallow triamine, and tallow tetramine, respectively), available from ExxonMobil Chemical Company of Houston, Tex.

h) Alkylene Polyamines

Alkylene polyamines are represented by the formula RHN—[R'—N(R)]$_x$—H, where each R is independently hydrogen, aliphatic, or hydroxy-substituted aliphatic group of up to about 30 carbon atoms; R' is alkylene moiety having about 1-10 carbon atoms, such as about 2-6 carbon atoms, or about 2-4 carbon atoms; n is about 1-10, such as about 2-7 or about 2-5. Such alkylene polyamines include methylene polyamines, ethylene polyamines, propylene polyamines, butylene polyamines, pentylene polyamines, etc. The higher homologs, such as those obtained by condensing two or more alkyleneamines, and related heterocyclic amines, such as piperazines and N-amino alkyl-substituted piperazines, are also included.

Alkylene polyamines such as ethylene polyamines can be a complex mixture of polyalkylene polyamines including cyclic condensation products. The term "polyalkylene polyamine" as employed herein is intended to include polyalkylene polyamines in pure or relatively pure form, mixtures of such materials, and crude polyalkylene polyamines, which may contain minor amounts of other compounds. Other useful types of polyamine mixtures are those resulting from stripping of the polyalkylene polyamine mixtures to leave, as residue, what is often termed "polyamine bottoms." In general, alkylene polyamine bottoms can be characterized as having less than 2%, usually less than 1% (by weight) material boiling below about 200° C. These alkylene polyamine bottoms include cyclic condensation products such as piperazine and higher analogs of diethylenetriamine, triethylenetetramine and the like. These alkylene polyamine bottoms may be reacted solely with the acylating agent or they may be used with other amines, polyamines, or mixtures thereof.

Specific examples of such polyamines are ethylenediamine, diethylenetriamine, triethylenetetramine, tris-(2-aminoethyl)amine, propylenediamine, dipropylenetriamine, tripropylenetetramine, tetraethylenepentamine, pentaethylenehexamine, hexaethyleneheptamine, N-(2-aminoethyl) piperazine, N,N-bis(2-aminoethyl)-ethylenediamine, diaminoethyl triaminoethylamine, and the like. The corresponding polypropylene polyamines and the polybutylene polyamines can also be employed. Still other polyamines can be recognized by those skilled in the art and the present disclosure can be used with such polyamines.

i) Condensate Polyamines

Polyamines can be condensation reaction products of at least one hydroxy compound with at least one polyamine reactant containing two or more primary and/or secondary amine groups. The hydroxy compound includes polyols and polyol amines disclosed herein. Polyol amines include aminoalcohols having two or more hydroxyl groups, and reaction products of monoamines with alkylene oxides (e.g., ethylene oxide, propylene oxide, butylene oxide, etc.) having about 2-20 carbon atoms, such as about 2-4 carbon atoms. Non-limiting examples of polyol amines include tri(hydroxypropyl)amine, tris(hydroxymethylaminomethane (THAM), 2-amino-2-methyl-1,3-propanediol, N,N,N',N'-tetrakis(2-hydroxypropyl)ethylenediamine, and N,N,N',N'-tetrakis(2-hydroxyethyl)ethylenediamine.

Any polyamines of the present disclosure may react with the polyols and polyol amines to form the condensate polyamines. Non-limiting examples include triethylenetetramine (TETA), tetraethylenepentamine (TEPA), pentaethylenehexamine (PEHA), and mixtures of polyamines such as the alkylene polyamine bottoms. The condensation reaction can be conducted at about 60-265° C., such as about 220-250° C., in the presence of an acid catalyst. Materials and conditions to form the condensate polyamines are described in U.S. Pat. No. 5,230,714, the disclosure of which is incorporated herein by reference.

k) Other Polyamines

Hydrazine and hydrocarbyl-substituted hydrazine may also be used as polyamines. At least one of the nitrogen atoms in the hydrazine may contain at least one hydrogen directly bonded thereto. There can be at least two hydrogen atoms bonded directly to hydrazine nitrogen, and both hydrogen atoms can be on the same nitrogen. Non-limiting examples of substituted hydrazines are methylhydrazine, N,N-dimethyl hydrazine, N,N'-dimethyl hydrazine, phenylhydrazine, N-phenyl-N'-ethylhydrazine, N-(p-tolyl)-N'-(n-butyl)-hydrazine, N-(para-nitrophenyl)-hydrazine, N-(para-nitrophenyl)-N-methylhydrazine, N,N'-di(p-chlorophenol)-hydrazine, and N-phenyl-N'-cyclohexylhydrazine.

j) Sterically Hindered Polyamines

Conventional polyamines can be fast reacting with isocyanates. In order to extend the pot-life of the composition and improve processability, polyamine reactivity may be moderated by sterically hinder the reactive amine groups. For example, 4,4'-bis-(sec-butylamino)-dicyclohexylmethane and N,N'-diisopropyl-isophorone diamine are secondary diamines having moderated reactivity.

One or more or all of the reactable amine groups within the polyamine compound can be sterically hindered, so that the polyamine compound can provide the combination of reduced reactivity toward isocyanate groups, and improved chemical stability toward actinic radiations such as UV light. Sterically hindered NCO group can have the following structure:

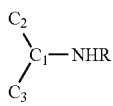

(35)

where $C_1$, $C_2$, and $C_3$ are independent tertiary (i.e., methine) or quaternary carbon atoms, and R is as defined above. One, two, or all three of $C_1$, $C_2$, and $C_3$ can be free of C—H bonds. $C_1$, $C_2$, and $C_3$ may in part form a substituted ring structure having about 4-30 carbon atoms. The ring structure may be saturated, unsaturated, aromatic, monocyclic, polycyclic (e.g., bicyclic, tricyclic, etc.), or heterocyclic having one or more O, N, or S atoms. The ring structure may have one, two, three, or more moieties of the above structure while the polyamine compound may have one, two, or more of such ring structures. For example, sterically hindered polyamine may have a structure of:

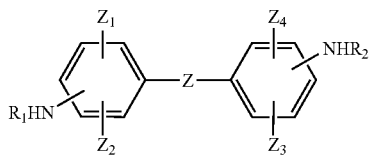

(36)

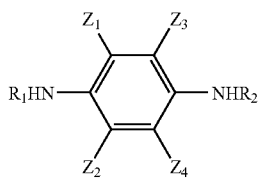

(37)

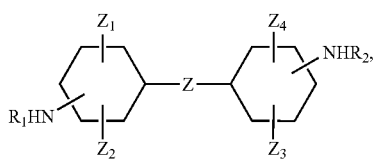

(38)

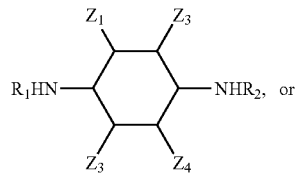

(39)

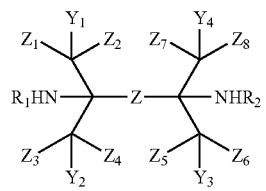

(40)

where $Z_1$ to $Z_8$ are independently chosen from halogenated or un-halogenated hydrocarbon moieties having about 1-20 carbon atoms, halogenated or un-halogenated organic moieties having at least one O, N, S, or Si atom and zero to about 12 carbon atoms, or halogens; $Y_1$ to $Y_4$ are independently chosen from hydrogen, halogenated or un-halogenated hydrocarbon moieties having about 1-20 carbon atoms, halogenated or un-halogenated organic moieties having at least one O, N, S, or Si atom and zero to about 12 carbon atoms, and halogens; Z is halogenated or un-halogenated hydrocarbon moieties having about 1-60 carbon atoms, or halogenated or un-halogenated organic moieties having at least one O, N, S, or Si atom and zero to about 60 carbon atoms. Z can have one of the following structures:

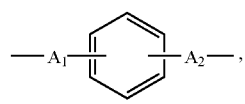

(41)

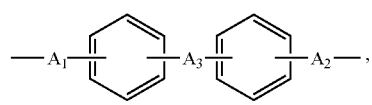

(42)

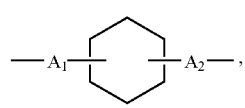

(43)

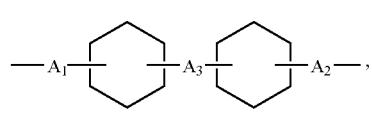

(44)

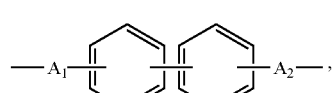

(45)

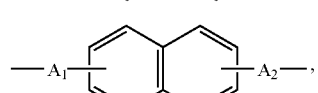

(46)

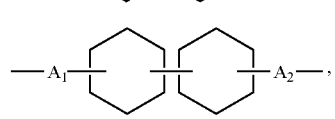

(47)

-continued

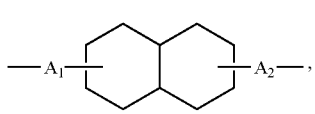
(48)

where $A_1$ to $A_3$ are independently chosen from halogenated or un-halogenated hydrocarbon moieties having about 1-36 carbon atoms, and halogenated or un-halogenated organic moieties having at least one O, N, S, or Si atom and zero to about 30 carbon atoms. Any one or more, or all of $Z_1$ to $Z_8$ can be hydrogen. As a non-limiting example, Z may be —$C(CH_3)_2$—. Other non-limiting examples include 1,4-durene diamine, 2,3,5,6-tetramethyl-1,4-diaminocyclohexane, and:

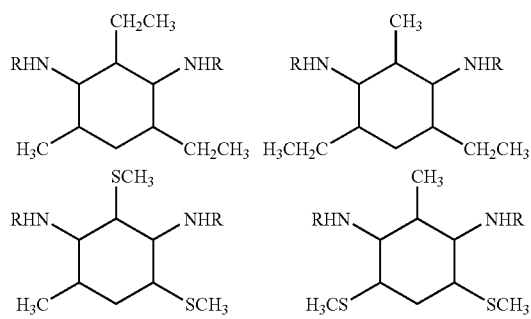

where R is the same or different, chosen from hydrogen and linear or branched $C_1$-$C_6$ alkyl groups, such as methyl, ethyl, propyl, butyl, pentyl, hexyl, iso-propyl, iso-butyl, sec-butyl, neo-pentyl, and maleate groups.

Sterically hindered polyamines can also have a generic structure of:

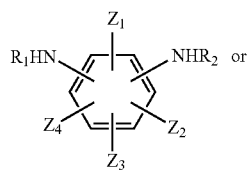
(49)

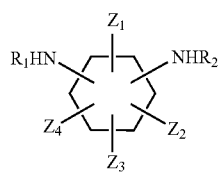
(50)

where $R_1$, $R_2$ and $Z_1$ to $Z_4$ are independently chosen from hydrogen and organic moieties having about 1-60 carbon atoms, such as about 1-20, about 1-12, or about 1-6 carbon atoms. Suitable organic moieties can be linear or branched, saturated or unsaturated, aliphatic, alicyclic, aromatic, or araliphatic, halogenated or otherwise substituted, optionally having one or more heteroatoms such as O, N, S, or Si, and include hydrocarbon moieties such as alkyl, alkyloxy, alkylthio, or alkylsilyl moieties. $NHR_1$ and $NHR_2$ can be in ortho, meta, or para positions with respect to one another. One or more of $Z_1$ to $Z_4$ can be $NHR_3$, where $R_3$ is analogous to $R_1$ and $R_2$.

In one example, $R_1$ and $R_2$ are both hydrogen, and at least one of $Z_1$ to $Z_4$, such as two or more thereof, is/are the organic moieties described above, having 2 or more carbon atoms, or being branched and having 3 or more carbon atoms. In another example, at least one of $R_1$ and $R_2$ can be the organic moiety other than hydrogen, having 2 or more carbon atoms, such as being branched and having 3 or more carbon atoms. In a further example, at least one of $R_1$, $R_2$, and $Z_1$ to $Z_4$ can have one or more primary or secondary amine groups, such as one or more primary amine end-groups distal to the ring structure. In yet another example, the sterically hindered polyamine can be regioselective; that is, at least a first amine group has a reactivity different from that of a second amine group, all else being equal. The regioselectivity may result from difference in steric interference around the two different amine groups (i.e., steric asymmetry). Scenarios which may result in regioselectivity include: a) the first amine is secondary, while the second amine is primary; b) the first amine is sterically hindered by one or more ortho-positioned organic moieties, on one side or both sides, while the second amine has none; or c) the first amine is sterically hindered by two or more ortho-positioned organic moieties on both sides, while the second amine has only one ortho-positioned organic moiety.

Sterically hindered dual- or multi-ring polyamines can have a generic structure of;

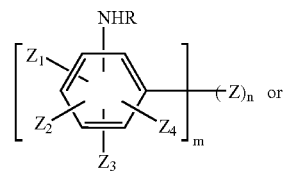
(51)

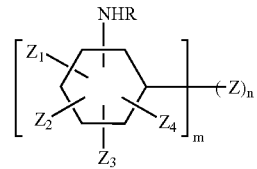
(52)

where R is the same or different on different rings, chosen from hydrogen and organic moieties having about 20 carbon atoms or less, such as 1-12 carbon atoms; $Z_1$ to $Z_4$, each being the same or different on different rings, are independently chosen from hydrogen, halides, and organic moieties having 1-12 or 1-6 carbon atoms; Z is a divalent or polyvalent organic moiety having a molecular weight of at least about 14, such as about 5,000 or less, or about 1,000 or less; m is 2 when n is 0, about 2-6 when n is 1, such as 2, 3, or 4. Organic moieties for R, Z, and $Z_1$ to $Z_4$ can be linear or branched, saturated or unsaturated, aliphatic, alicyclic, aromatic, or araliphatic, halogenated or otherwise substituted, optionally having one or more heteroatoms such as O, N, S, or Si, such as hydrocarbon moieties. Z may be as small as O or $CH_2$, or comprise polymeric chains such as polyhydrocarbon, polyether, polyester, polyamide, polycarbonate, polyacrylate, polysiloxane, and copolymer chains thereof. Alternatively, Z may comprise at least two ester and/or amide linkages.

In one example, R is hydrogen, at least one of $Z_1$ to $Z_4$, such as two or more thereof, is/are the organic moieties described above, such as having two or more carbon atoms, or branched having 3 or more carbon atoms, and is/are ortho to NHR. In another example, each NHR is an ortho- or meta-substituent with respect to Z. In a further example, at least one R is an organic moiety, such as having 2 or more carbon atoms, or branched having 3 or more carbon atoms. In yet another example, at least one of R and $Z_1$ to $Z_4$ has one or more primary or secondary amine groups, such as at least one primary amine end-group distal to the ring. In still another example, the sterically hindered polyamine is regioselective, having one of the following scenarios: i) a first NHR is secondary, while a second NHR is primary; ii) the first NHR is sterically hindered by one or more ortho-positioned organic moieties on one side or both sides, while the second NHR has none; or iii) the first NHR is sterically hindered by two or more ortho-positioned organic moieties one both sides, while the second NHR has only one-ortho-positioned organic moiety.

Certain sterically hindered polyamines described above can be obtained by reacting one or more ortho- or meta-isomers of cyclic amino acids or esters thereof, such as (organo)amino(organo)benzene (organo)acids (including aminobenzoic acids, aminobenzene organoacids, amino-organobenzoic acids, organo-aminobenzoic acids, amino-organobenzene organoacids, organo-aminobenzene organoacids, organo-amino-organobenzoic acids, and organo-amino-organobenzene organoacids), (organo)amino(organo) cyclohexane (organo)acids (including aminocyclohexane acids, aminocyclohexane organoacids, amino-organocyclohexane acids, organo-aminocyclohexane acids, amino-organocyclohexane organoacids, organo-aminocyclohexane organoacids, organo-amino-organocyclohexane acids, and organo-amino-organocyclohexane organoacids), and their respective esters (such as methyl esters, ethyl esters, propyl esters, isopropyl esters, butyl esters, isobutyl esters, t-butyl esters, pentyl esters, hexyl esters, and other linear and branched alkyl esters known to one skilled in the art), with one or more compounds having two or more active hydrogen functionalities (e.g., the various amine- and/or hydroxy-functional compounds and telechelics disclosed herein). Active hydrogen functional compounds can be chosen from alkanediols, alkanetriols, polyalkanediols, dihydroxy telechelics, and trihydroxy telechelics, such as those disclosed herein. Mechanisms of the condensation/transesterification reactions can be:

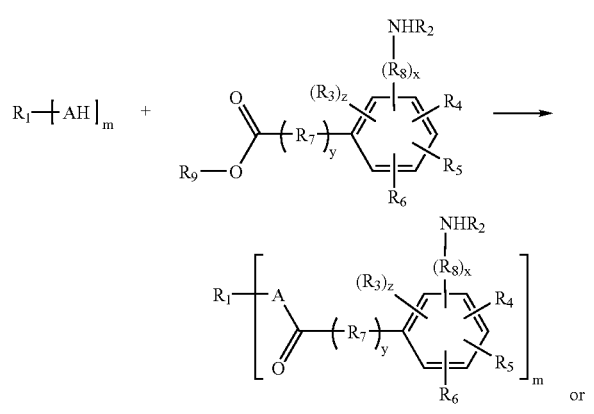

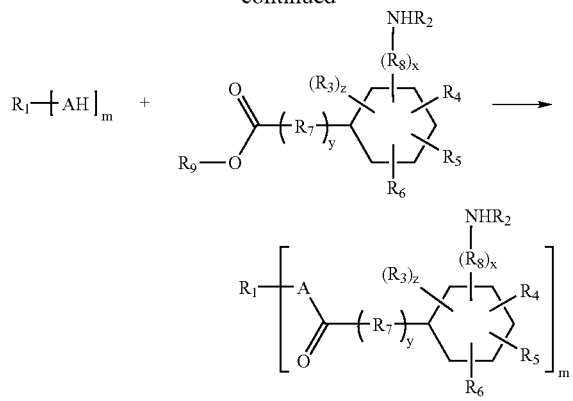

where $-(R_8)_x-NHR_2$ and $-(R_7)_y-COOR_9$ are ortho, meta, or para substituents on the cyclic rings; A is the same or different moieties chosen from O, S, and NR, R being hydrogen or organic moieties having about 1-20 carbon atoms, such as 1-12 carbon atoms; $R_1$ is a divalent or polyvalent organic moiety having at least one carbon or silicon atom, such as about 1,000 carbon or silicon atoms or less; $R_2$ is hydrogen or organic moiety having 1 to about 20 carbon atoms, such as 1-6 carbon atoms; $R_3$ to $R_6$ are independently chosen from hydrogen, halides, nitro, and organic moieties having about 1-20 carbon atoms, such as about 1-6 carbon atoms; $R_7$ is an organic moiety having at least one C, O, N, S, or Si atom, such as a divalent, linear or branched organic moiety having about 60 carbon atoms or less, or about 20 carbon atoms or less; $R_8$ is a divalent organic moiety having one carbon atom connecting $NHR_2$ to the cyclic ring, such as $-CH_2-$, $-CH(CH_3)-$, $-CH(CH_2CH_3)-$, or $-C(CH_3)_2-$; $R_9$ is chosen from hydrogen and organic moieties having about 1-20 carbon atoms, such as about 1-12 carbon atoms; m is at least 1, such as about 2-10, like 2, 3, 4, and any numbers therebetween; x, y, and z are independently 0 or 1. One or more of R, $R_1$ to $R_6$ and $R_9$ can have one or more heteroatoms chosen from O, N, S, and Si.

$R_1$ can be linear or branched, divalent or trivalent, substituted (such as halogenated) or unsubstituted, aliphatic, cyclic, alicyclic, aromatic, or araliphatic, include alkylene moieties having about 1-60, about 1-20, or about 1-12 carbon atoms, such as methylene, ethylene, propylene, butylene, pentylene, hexylene, heptylene, octylene, nonylene, decylene, undecylene, and dodecylene moieties. $R_9$ can be linear or branched, substituted (such as halogenated) or unsubstituted, aliphatic, cyclic, alicyclic, aromatic, or araliphatic, include alkyl moieties such as methyl, ethyl, propyl, isopropyl, butyl, sec-butyl, tert-butyl, pentyl, hexyl, cyclohexyl, heptyl, octyl, nonyl, decyl, undecyl, and dodecyl.

Non-limiting examples of suitable aromatic amino acids and esters thereof include 2-aminobenzoic acid, 2-amino-(3,4,5, or 6)-methylbenzoic acid, 5-nitro anthranilic acid, 2-amino-(3 or 5)-hydroxybenzoic acid, 2-amino-(3,4,5, or 6)-chlorobenzoic acid, 2-amino-6-bromo-5-methylbenzoic acid, 2-amino-phenylacetic acid, 2-amino-3-benzoylphenylacetic acid, 2-amino-3-(4-bromobenzoyl)phenylacetic acid, 3-aminobenzoic acid, 3-amino-4-methylbenzoic acid, 3-amino-4-methoxybenzoic acid, 3-amino-(2,4, or 6)-chlorobenzoic acid, 3-amino-phenylacetic acid, methyl-2-aminobenzoate, methyl-2-amino-5-bromobenzoate, methyl-2- amino-3,5-dibromobenzoate, ethyl-2-aminobenzoate, pentyl-2-aminobenzoate, 2-propenyl-2-aminobenzoate, cyclohexyl-2-aminobenzoate, methyl-2-methylaminobenzoate, methyl-2-methylaminobenzoate, sec-butyl-2-methylaminobenzoate, methyl-3-aminobenzoate, methyl-3-amino-4-methylbenzoate, methyl-3-amino-4-methoxybenzoate, ethyl-3-aminobenzoate, and mixtures thereof. Illustrative examples of cyclohexane analogs to the aminobenzoic acids include, but are not limited to, 2-aminomethyl-cyclohexane carboxylic acid and 3-aminomethyl-cyclcohexane carboxylic acid.

The sterically hindered polyamines can also be obtained by reacting the active hydrogen functional compound or telechelic with a substituted or unsubstituted oxazine dione (e.g., anhydrides), such as a benzoxazine dione or cyclohexane oxazine dione having the generic structures of:

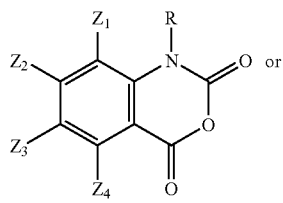
(53)

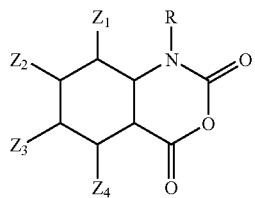
(54)

where R is chosen from hydrogen and organic moieties having about 1-20 carbon atoms, such as about 1-6 carbon atoms; $Z_1$ to $Z_4$ are independently chosen from hydrogen, halides, nitro groups, and organic moieties having about 1-20 carbon atoms, such as about 1-6 carbon atoms. One or more of R and $Z_1$ to $Z_4$ may contain one or more heteroatoms such as O, N, S, or Si, and/or may be partially or fully halogenated. Non-limiting examples include isatoic anhydride, N-methyl isatoic anhydride, 5-nitro-isatoic anhydride, 3-methyl-benzoxazine-2,4-dione, 3-phenyl-1,3-benzoxazine-2,4-dione, 3-(4-methylphenyl)-1,3-benzoxazine-2,4-dione, 1-[3-(perfluorooctyl)propyl]-(1H-benzo[d][1,3]oxazine-2,4-dione (F-Isatoic Anhydride available from Fluorous Technologies, Inc. of Pittsburgh, Pa.), and mixtures thereof.

The various reaction themes described above for preparing sterically hindered polyamines can be applied to other cyclic analogs where the benzene or cyclohexane rings of the above-mentioned reactants and reaction products are replaced by other saturated or unsaturated 4-membered or larger cyclic structures, including monocyclics, polycyclics (fused, spiro, and/or bridged), and heterocyclics, such as cyclopentane. In the case of saturated cyclic structures, the at least one amine-containing substitution and the at least one acid/ester-containing substitution may be directly attached to the same ring-member carbon atom, as in the case of 1-aminocyclopentane carboxylic acid.

The sterically hindered polyamines can further be prepared by reacting the amino acids or esters mentioned above with diamines and polyamines disclosed herein, such as alkanediamines, alkanetriamines, and the various polyamine telechelics. In this case, the reaction forms two or more amide linkages rather than ester linkages.

Polyol Telechelics

Any polyol telechelics available or known to one of ordinary skill in the art are suitable for use in compositions of the disclosure. Polyol telechelic such as α,ω-dihydroxy telechelics, include polyol polyhydrocarbons (such as polyol polyolefins), polyol polyethers, polyol polyesters (such as polyol polycaprolactones), polyol polyamides (such as polyol polycaprolactams), polyol polycarbonates, polyol polyacrylates (such as polyol polyalkylacrylates), polyol polysiloxanes, polyol polyimines, polyol polyimides, and polyol copolymers including polyol polyolefinsiloxanes (such as α,ω-dihydroxy poly(butadiene-dimethylsiloxane) and α,ω-dihydroxy poly(isobutylene-dimethylsiloxane)), polyol polyetherolefins (such as α,ω-dihydroxy poly(butadiene-oxyethylene)), polyol polyetheresters, polyol polyethercarbonates, polyol polyetheramides, polyol polyetheracrylates, polyol polyethersiloxanes, polyol polyesterolefins (such as α,ω-dihydroxy poly(butadiene-caprolactone) and α,ω-dihydroxy poly(isobutylene-caprolactone)), polyol polyesteramides, polyol polyestercarbonates, polyol polyesteracrylates, polyol polyestersiloxanes, polyol polyamideolefins, polyol polyamidecarbonates, polyol polyamideacrylates, polyol polyamidesiloxanes, polyol polyamideimides, polyol polycarbonateolefins, polyol polycarbonateacrylates, polyol polycarbonatesiloxanes, polyol polyacrylateolefins (such as α,ω-dihydroxy poly(butadiene-methyl methacrylate), α,ω-dihydroxy poly(isobutylene-t-butyl methacrylate), and α,ω-dihydroxy poly(methyl methacrylate-butadiene-methyl methacrylate)), polyol polyacrylatesiloxanes, polyol polyetheresteramides, any other polyol copolymers, as well as blends thereof. Other polyol telechelics can be derived from polyacid telechelics through reaction with polyols, aminoalcohols, and/or cyclic ethers, or derived from polyamine telechelics through reaction with hydroxy acids, cyclic esters, and/or cyclic ethers as disclosed herein.

The molecular weight of the polyol telechelics can be about 100-20,000, such as about 200, about 230, about 500, about 600, about 1,000, about 1,500, about 2,000, about 2,500, about 3,000, about 3,500, about 4,000, about 5,000, about 8,000, about 10,000, or any number therebetween. The polyol telechelics can have one or more hydrophobic and/or hydrophilic segments.

a) Polyol Polyhydrocarbons

An example of polyol polyhydrocarbons has a generic structure of:

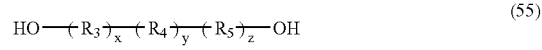
(55)

where $R_3$ to $R_5$ are independently chosen from linear, branched, cyclic (including monocyclic, aromatic, bridged cyclic, spiro cyclic, fused polycyclic, and ring assemblies), saturated, unsaturated, hydrogenated, and/or substituted hydrocarbon moieties having about 2-30 carbon atoms; x, y, and z are independently zero to about 200, and x+y+z=2. $R_3$ to $R_5$ can independently have the structure $C_nH_m$, where n is an integer of about 2-30, and m is zero to about 60. Any one or more of the hydrogen atoms in $R_3$ to $R_5$ may be substituted with halogens, cationic groups, anionic groups, silicon-based moieties, ester moieties, ether moieties, amide moieties, urethane moieties, urea moieties, ethylenically unsaturated moieties, acetylenically unsaturated moieties, aromatic moieties, heterocyclic moieties, hydroxy groups, amine groups, cyano groups, nitro groups, and/or any other organic moieties. One or more of $R_3$ to $R_5$ can have the structure $C_nH_{2n}$, n being an integer of about 2-20, and x+y+z is about 5-100.

Polyol polyhydrocarbons are hydrophobic in general, and provide reduced moisture absorption and permeability to the elastomer compositions of the present disclosure. Non-limiting examples of polyol polyhydrocarbons include α,ω-dihydroxy polyolefins such as α,ω-dihydroxy polyethylenes, α,ω-dihydroxy polypropylenes, α,ω-dihydroxy polyethylenepropylenes, α,ω-dihydroxy polyisobutylenes, α,ω-dihydroxy polyethylenebutylenes (with butylene content of at least about 25% by weight, such as at least about 50%), hydroxyl-terminated Kraton rubbers; α,ω-dihydroxy polydienes such as α,ω-dihydroxy polyisoprenes, partially or fully hydrogenated α,ω-dihydroxy polyisoprenes, hydroxyl-terminated liquid isoprene rubbers, α,ω-dihydroxy polybutadienes, partially and/or fully hydrogenated α,ω-dihydroxy polybutadienes; as well as α,ω-dihydroxy poly(olefin-diene)s such as α,ω-dihydroxy poly(styrene-butadiene)s, α,ω-dihydroxy poly(ethylene-butadiene)s, and α,ω-dihydroxy poly(butadiene-styrene-butadiene)s.

The polyol polyhydrocarbons can be polyol polydienes, which also include polyol poly(alkylene-diene)s, as well as blend thereof. Polyol polydienes can have $M_n$ of about 1,000-20,000, such as about 1,000-10,000 or about 3,000-6,000, and a hydroxyl functionality of about 1.6-10, such as about 1.8-6 or about 1.8-2. The diene monomers can be conjugated dienes, such as 1,3-butadiene, isoprene, 2,3-dimethyl-1,3-butadiene, and mixtures thereof. The polyol polydiene can be substantially hydrogenated to improve stability, such that at least about 90%, or at least about 95%, of the carbon-carbon double bonds in the polyol are hydrogenated.

Unhydrogenated, partially hydrogenated, and fully hydrogenated polydiene diols and copolydiene diols, among other polyol telechelics, are capable of imparting high resiliency in the compositions. The polydiene diol can be polybutadiene diol having 1,4-addition of about 30-70%, such as about 40-60%. The polybutadiene diol can have 1,2-addition of at least about 40%, such as about 40-60%, so that the hydrogenated polybutadiene diol remains liquid at ambient temperature. The polybutadiene diol can be more than about 99% hydrogenated, having $M_n$ of about 3,300, a hydroxyl functionality of about 1.92, and a 1,2-addition content of about 54%. The polydiene diol can be a polyisoprene diol having 1,4-addition of at least about 80% to reduce glass transition temperature and viscosity.

One group of copolydiene diols has a generic structure of:

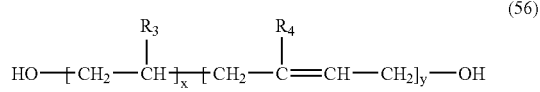

(56)

where $R_3$ is chosen from hydrogen, linear and branched alkyl groups (such as methyl), cyano group, phenyl group, halide, and mixture thereof; $R_4$ is chosen from hydrogen, linear and branched alkyl group (such as methyl), halide (such as chloride or fluoride), and mixture thereof; x and y are independently about 1-200. The y:x ratio can be about 82:18 to about 90:10. The copolydiene diol can be substantially hydrogenated (i.e., substantially all of the >C=CH— or >C=CH$_2$ moieties are hydrogenated into >CH—CH$_2$— or >C—CH$_3$ moieties, respectively). One example is hydrogenated poly(acrylonitrile-co-butadiene) diol, where $R_3$ is cyano group, and $R_4$ is hydrogen.

b) Polyol Polyethers

An example of the polyol polyethers has a generic structure of:

(57)

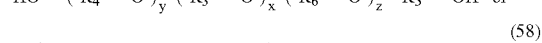

(58)

where $R_3$ to $R_6$ are independently chosen from linear, branched, or cyclic moieties having at least one carbon atom, such as about 60 carbon atoms or less; i is about 2-10, such as about 2-6; x is about 1-200, and y and z are independently zero to about 200. Any one or more of the hydrogen atoms in $R_3$ to $R_6$ may be substituted with halogens, cationic groups, anionic groups, silicon-based moieties, ester groups, ether groups, amide groups, urethane groups, urea groups, ethylenically unsaturated groups, acetylenically unsaturated groups, amine groups, hydroxyl groups, or any other organic moieties. $R_3$ to $R_6$ can independently have the structure $C_nH_m$, where n is an integer of about 1-30, and m is an integer of about 2-60. $R_3$ and $R_5$ can be identical. The number x can be about 2-70, such as about 5-50 or about 12-35. Alternatively, y+z is about 2-10, while x is about 8-50.

Commercial examples of polyol polyethers include, but are not limited to, polyoxyethylene diols, polyoxypropylene diols, α,ω-bis(2-hydroxypropyl)polyoxypropylenes (such as having $M_w$ of about 200-5,000), polyoxytetramethylene diols (i.e., polytetrahydrofurans, such as having $M_w$ of about 200-2,000), modified polyoxytetramethylene diols, poly(oxyethylene-oxypropylene)diols, α,ω-bis(3-hydroxypropyl)poly(oxyethylene-capped oxypropylene), poly(oxybutylene-oxypropylene-oxyethylene)diols, polyoxyalkylene diols initiated by bisphenol A or primary monools, tri-block polyol polyethers such as poly(oxypropylene-block-oxyethylene-block-oxypropylene)diols and poly(oxyethylene-block-oxypropylene-block-oxyethylene)diols, polyoxypropylene triols initiated by glycerin, trimethylolethane, or trimethylolpropane, polyoxypropylene tetraols initiated by pentaerythritol, ethylenediol, phenolic resin, or methyl glucoside, diethylenetriol-initiated polyoxypropylene pentaols, sorbitol-initiated polyoxypropylene hexaols, and sucrose-initiated polyoxypropylene octaols. Other suitable polyether polyols include those described in co-owned and co-pending application bearing Ser. No. 10/434,739, the disclosure of which is incorporated herein by reference in its entirety.

$R_3$ and $R_5$ can be the same linear, branched, or cyclic radicals having at least about 10 carbon atoms, such as at least about 18 carbon atoms, or at least about 30 carbon atoms, and y and z are both zero. The polyol polyether of the structure (57) thus becomes HO—[$R_3$—O]$_x$—$R_3$—OH. $R_3$ can be an alkylene moiety, while x is about 1-50, such as about 1.5-30. The polyether backbone can be prepared by acid-catalyzed polycondensation of suitable low molecular weight alkylene glycols such as dimer diols at elevated temperature (e.g., 150-250° C.). These polyol polyethers can be hydrophobic. When x is less than about 10, such as about 1.5-7, like about 2, about 4, or about 5, these polyol polyethers can be liquid at ambient temperature, having a viscosity at 25° C. of about 3,000-12,000 cP. The hydrophobicity of such polyether polyols can enhance hydrolysis resistance of the compositions and reduce moisture absorption. These and other polyol telechelics as described in U.S. Pat. No. 5,616,679 are incorporated herein by reference.

In the structure of (57), $R_5$ and $R_6$ can be identical, $R_4$ and $R_5$ can be the same or different alkylene groups having about 2-40 carbon atoms, such as about 2-20, about 2-10, or about 2-4 carbon atoms, $R_3$ can be the backbone of a dimer diol as disclosed herein below, x can be 1, and $40=(y+z)=1$. As such, the structure (57) becomes $HO-[R_4-O]_y-R_3-[O-R_5]_{z+1}-OH$. These polyol polyethers are hydrolysis-resistant, and typically have $M_w$ of about 600-3,000. The polyether backbone can be produced by adding cyclic ethers (i.e., alkylene oxides such as ethylene oxide, propylene oxide, butylenes oxide, tetrahydrofuran, methyl tetrahydrofuran, and mixtures thereof) onto a dimer diol. Other suitable cyclic ethers include the chiral cyclic ethers described in co-owned and co-pending application bearing the Ser. No. 10/434,739, which is incorporated by reference herein.

A blend of two polyol polyethers can be used to form the prepolymer, wherein the first polyol polyether has a first molecular weight of about 3,500-6,500, a first hydroxyl functionality of about 3 or less, and a first oxyethylene content of about 8-20% by weight, while the second polyol polyether has a second molecular weight of about 4,000-7,000, a second hydroxyl functionality of about 4-8, and a second oxyethylene content of about 5-15% by weight. The first polyol polyether can constitute about 70-98% by weight of the blend, and the second polyol polyether can constitute about 2-30% by weight of the blend. A mixture having about 25-95% by weight of this polyol polyether blend and about 5-75% by weight of at least a third polyol telechelic different from the first and second polyether polyols is also suitable to formulate a resilient elastomer composition.

In one example, the polyol telechelic comprises a polyether triol having $M_w$ of about 4,500-6,000 and an average hydroxyl functionality of about 2.4-3.5, such as about 2.4-2.7. In another example, the polyol polyether has a weight average unsaturation of about 0.03 meq/g or less, as measured by ASTM D-2849-69, such as about 0.02 meq/g or less, about 0.015 meq/g or less, even about 0.01 meq/g or less, and $M_w$ of about 1,000. In a further example, the polyol polyether comprises at least one random poly(oxyethylene-oxyalkylene) terminal block or polyoxyethylene terminal block, having oxyethylene moieties in the amount of about 12-30% by weight of the polyol polyether. Low level of average unsaturation of about 0.002-0.007 meq/g is achieved in the polyol polyether by using double metal cyanide catalysts when forming the polyether backbone. The polyol polyethers can also have a low polydispersity of about 1.2 or less.

The polyol polyether can have repeating branched oxyalkylene monomer units derived from branched diol monomers, chiral diol monomers, alkylated cyclic ethers, and/or chiral cyclic ethers, through homo-polymerization, co-polymerization, and/or ring-opening polymerization, optionally in combination with a second diol or cyclic ether. As a non-limiting illustration, the chiral diol may be 2-methyl-1,4-butanediol; the chiral cyclic ether may be 2-methyl-tetrahydrofuran; the second diol may be 1,4-butanediol (achiral); and the second cyclic ether may be tetrahydrofuran (achiral). Other chiral diols include 2,4-petanediol and 3-methyl-1,3-butanediol. Exemplary linear and branched oxyalkylene monomer units include, but are not limited to, $-O-CH_2-CH(CH_3)-(CH_2)_2-$, $-O-(CH_2)_3-$, $-O-(CH_2)_2-$, $-O-C(CH_3)_2-CH_2-$, $-O-(CH_2)_2-CH(CH_3)-CH_2-$, $-O-CH_2-CH(CH_3)-$, $-O-CH(CH_2CH_3)-CH_2-$, $-O-CH_2-CH(CH_3)-CH_2-$, $-O-(CH_2)_3-CH(CH_3)-$, $-O-CH_2-C(CH_3)_2-$, $-O-CH(CH_3)-CH_2-$, $-O-(CH_2)_5-$, $-O-CH_2-CH(CH_2CH_3)-$, $-O-CH(CH_3)-(CH_2)_3-$, $-O-(CH_2)_4-$, $-O-CH(CH_3)-(CH_2)_2-$, and $-O-(CH_2)_2-CH(CH_3)-$. The polyol polyether can be obtained by copolymerizing chiral diol/ether and achiral diol/ether at a molar ratio of about 85:15 to about 20:80. A non-limiting example of such polyether polyols is referred to as a modified PTMEG diol, or an α,ω-dihydroxy poly(tetrahydrofuran-co-methyltetrahydrofuran) ether.

c) Polyol Polyesters

An example of the polyol polyesters has a generic structure of:

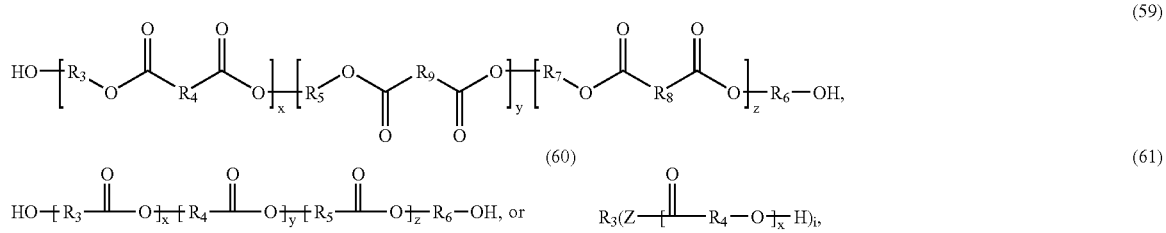

where $R_3$ to $R_9$ are independently chosen from linear, branched, and cyclic moieties having 1 to about 60 carbon atoms; Z is the same or different moieties chosen from $-O-$ and $-NH-$; i is about 2-10, such as about 2-6; x is about 1-200, and y and z are independently zero to about 200. The number x can be the same or different numbers. $R_3$ to $R_9$ can independently have the structure $C_nH_m$, where n is an integer of about 2-30, and m is an integer of about 2-60. Any one or more of the hydrogen atoms in $R_3$ to $R_9$ may be substituted with halogens, cationic groups, anionic groups, silicon-based moieties, ester groups, ether groups, amide groups, urethane groups, urea groups, ethylenically unsaturated groups, acetylenically unsaturated groups, amine groups, hydroxyl groups, or any other organic moieties. $R_3$ and $R_6$ can be identical, having a structure $C_nH_{2n}$, n being an integer of about 2-30, x+y+z is about 1-100, such as about 5-50.

The polyol polyester can have a crystallization enthalpy of at most about 70 J/g and $M_n$ of about 1,000-7,000, such as about 1,000-5,000. This polyol polyester can be blended with a polyol polyether having $M_n$ of about 500-2,500. The average hydroxyl functionality of the blend, which is the ratio of total number of hydroxyl groups in the blend to total number of telechelic molecules in the blend, can be about 2-2.1. The polyol polyester can have an ester content (number of ester bonds/number of all carbon atoms) of about 0.2 or less, such as about 0.08-0.17.

The polyester chain can be formed from condensation polymerization reaction of polyacids and/or anhydrides with excess polyols. Alternatively, the polyester chain can be formed at least in part from ring-opening polymerization of cyclic esters. The polyester chain can also be formed at least in part from polymerization of hydroxy acids, including those that structurally correspond to the cyclic esters. Obviously, the polyester chain can comprise multiple segments formed from polyacids, anhydrides, polyols, cyclic esters, and/or hydroxy acids, non-limiting examples of which are disclosed herein. Suitable reactants also include polyacid telechelics, polyol telechelics, and hydroxy acid polymers. In one example, at least one polyacid, anhydride, polyol, cyclic ester, or hydroxy acids having $M_w$ of at least about 200, such as at least about 400, or at least about 1,000, is used to form the polyester chain. In another example, the polyester chain has 1 to about 100 ester linkages, such as about 2-50, or about 2-20.

The polyol polyesters can be formed from the condensation of one or more polyols having about 2-18 carbon atoms, such as about 2-6 carbon atoms, with one or more polycarboxylic acids or their anhydrides having from about 2-14 carbon atoms. Non-limiting examples of polyols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monoallyl ether, glycerol monoethyl ether, diethylene glycol, 2-ethylhexanediol-1,4, cyclohexanediol-1,4, 1,2,6-hexanetriol, neopental glycol, 1,3,5-hexanetriol, 1,3-bis-(2-hydroxyethoxy)propane and the like. Cyclic ethers having about 2-18 carbon atoms may be used in place of or in addition to the polyols. Non-limiting examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid.

Examples of polyol polyesters include, without limitation, poly(ethylene adipate)diols, poly(butylene adipate)diols, poly(1,4-butylene glutarate)diols, poly(ethylene propylene adipate)diols, poly(ethylene butylene adipate)diols, poly(hexamethylene adipate)diols, poly(hexamethylene butylene adipate)diols, poly(hexamethylene phthalate)diols, poly(hexamethylene terephthalate)diols, poly(2-methyl-1,3-propylene adipate)diols, poly(2-methyl-1,3-propylene glutarate)diols, and poly(2-ethyl-1,3-hexylene sebacate)diols. Non-limiting examples of polyester polyols based on fatty polyacids or polyacid adducts, such as those disclosed herein, include poly(dimer acid-co-ethylene glycol) hydrogenated diols and poly(dimer acid-co-1,6-hexanediol-co-adipic acid) hydrogenated diols.

An example of the polyol polycaprolactones has a generic structure of:

(62)

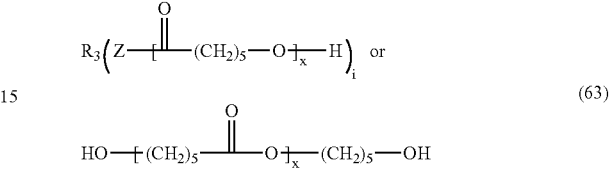

(63)

where $R_3$, $Z$, $i$, $x$ are as described above. The number x can the same or different, and can be about 5-100. Suitable polycaprolactone polyols include, but are not limited to, polyol-initiated and polyamine-initiated ring-opening polymerization products of caprolactone, and polymerization products of hydroxy caproic acid. Suitable polyol and polyamine initiators include any polyols and polyamines available to one of ordinary skill in the art, such as those disclosed herein, as well as any and all of the polyol telechelics and polyamine telechelics of the present disclosure. The caprolactone monomer can be replaced by or blended with any other cyclic esters and/or cyclic amides as disclosed herein.

Polyamine-initiated and polyol-initiated polycaprolactone polyols include, but are not limited to, bis(2-hydroxyethyl) ether initiated polycaprolactone polyols, 2-(2-aminoethylamino)ethanol initiated polycaprolactone polyols, polyoxyethylene diol initiated polycaprolactone polyols, propylene diol initiated polycaprolactone polyols, polyoxypropylene diol initiated polycaprolactone polyols, 1,4-butanediol initiated polycaprolactone polyols, trimethylolpropane-initiated polycaprolactone polyols, hexanediol-initiated polycaprolactone polyols, polytetramethylene ether diol initiated polycaprolactone polyols, bis(2-aminoethyl)amine initiated polycaprolactone polyols, 2-(2-aminoethylamino)ethylamine initiated polycaprolactone polyols, polyoxyethylene diamine initiated polycaprolactone polyols, propylene diamine initiated polycaprolactone polyols, polyoxypropylene diamine initiated polycaprolactone polyols, 1,4-butanediamine initiated polycaprolactone polyols, neopentyl diamine initiated polycaprolactone polyols, hexanediamine-initiated polycaprolactone polyols, polytetramethylene ether diamine initiated polycaprolactone polyols, and mixtures thereof.

d) Polyol Polyamides

An example of the polyol polyamides has a generic structure of:

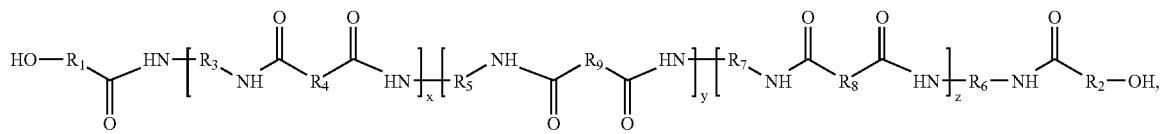

(64)

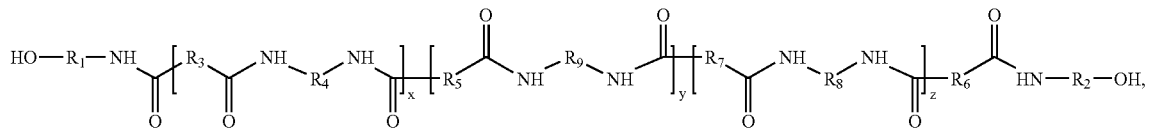

(65)

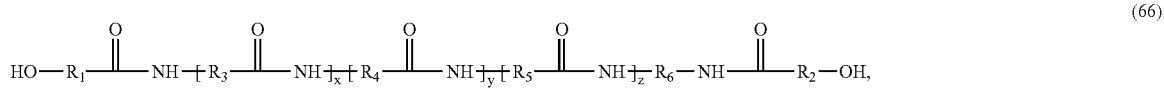

(66)

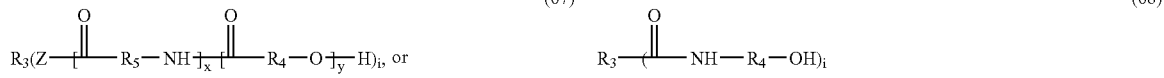

(67)

(68)

where $R_1$ and $R_2$ are independently chosen from aliphatic, alicyclic, araliphatic, and aromatic moieties; $R_3$ to $R_9$ are independently chosen from linear, branched, and cyclic moieties having 1 to about 60 carbon atoms; Z is the same or different moieties chosen from —O— and —NH—; i is about 2-10, such as about 2-6; x is the same or different numbers of about 1-200, and y and z are independently zero to about 200. $R_3$ can be a polymeric chain such as those disclosed herein. The number x can be the same or different numbers, and y is 1 or greater but less than x. $R_3$ to $R_9$ can independently have the structure $C_nH_m$, where n is an integer of about 2-30, and m is an integer of about 2-60. Any one or more of the hydrogen atoms in $R_1$ to $R_9$ may be substituted with halogens, cationic groups, anionic groups, silicon-based moieties, ester groups, ether groups, amide groups, urethane groups, urea groups, ethylenically unsaturated groups, acetylenically unsaturated groups, amine groups, hydroxyl groups, or any other organic moieties. $R_1$ and $R_2$ can be identical. $R_3$ and $R_6$ can be identical, having a structure of $C_nH_{2n}$, n being an integer of about 2-30, x+y+z is about 1-100, such as about 5-50. Polyol polyamides can be linear, branched, star-shaped, hyper-branched or dendritic.

Polyol polyamides of the structures (64), (66), and (67) can be formed by reacting the corresponding polyamine polyamides as described above with cyclic esters and/or hydroxy acids such as those disclosed herein. Using this reaction scheme, any and all of polyamine telechelics and polyamines such as those disclosed herein can be converted to polyol telechelics and/or polyols through the formation of two or more amide linkages, wherein with respect to a center point of the polyol telechelic, the nitrogen atom is of closer proximity than the carbon atom in each of these amide linkages. The reaction product can also contain polyol telechelics having terminal polyester block segments following the amide linkages. Polyol polyamides of the structures (65) and (68) can be formed by reacting polyacid polyamides (i.e., polyacid telechelics formed such as from polyamines and excess polyacids, with an equivalent ratio of polyamine to polyacid being less than 1, such as about 0.2-0.9) with any of the aminoalcohols or polyol amines disclosed herein. Using this reaction scheme, any and all polyacid telechelics and polyacids such as those disclose herein can be converted to polyol telechelics and/or polyols through the formation of two or more amide linkages, wherein with respect to a center point of the polyol telechelic, the carbon atom is of closer proximity than the nitrogen atom in each of these amide linkages.

An example of the polyol polycaprolactam has a generic structure of:

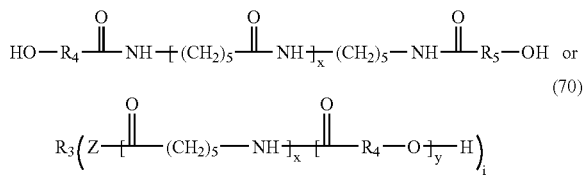

(69)

(70)

where $R_3$ to $R_5$, Z, i, x are as described above. The number x can be the same or different, and can be about 5-100. $R_4$ and $R_5$ can be identical, and can both be $(CH_2)_5$. Suitable polycaprolactam polyols include, but are not limited to, those having polyamide backbones and/or chains formed from polyol-initiated and/or polyamine-initiated ring-opening polymerization of caprolactam, and polymerization products of amino caproic acid.

e) Polyol Polycarbonates

An example of the polyol polycarbonates has a generic structure of:

(71)

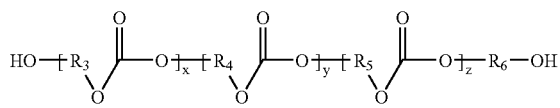

where $R_3$ to $R_6$ are independently chosen from linear, branched, cyclic, aliphatic, alicyclic, araliphatic, aromatic, and ether moieties having 1 to about 60 carbon atoms; x is about 1-200, and y and z are independently zero to about 200. $R_3$ to $R_6$ can independently have the structure $C_nH_m$, where n is an integer of about 2-30, and m is an integer of about 2-60. Any one or more of the hydrogen atoms in $R_3$ to $R_6$ may be substituted with halogens, cationic groups, anionic groups, silicon-based moieties, ester groups, ether groups, amide groups, urethane groups, urea groups, ethylenically unsaturated groups, acetylenically unsaturated groups, amine groups, hydroxyl groups, or any other organic moieties. $R_3$ and $R_6$ can be identical. $R_3$, $R_5$ and $R_6$ can all be identical. The polyol polycarbonate can be substantially free of ether linkages.

When y and z are both zero, the polyol polycarbonate can be substantially crystalline. Examples include polyphthalate carbonate)glycols, poly(hexamethylene carbonate)glycols, and polycarbonate glycols comprising Bisphenol A. When at least one of y and z is greater than zero, and at least one of $R_4$ and $R_5$ is different from $R_3$, the polyol polycarbonate becomes amorphous due to reduction in cohesive energy density, and displays lowered crystallinity, lowered hysteresis, and improved impact resistance as compared to crystalline polyol polycarbonates. Non-limiting examples of $R_3$ to $R_6$ include —$(CH_2)_n$— where n is about 1-16, such as hexamethylene (n=6); —$CH_2C_6H_{10}CH_2$— (1,4-cyclohexane dimethylene); —$C_6H_5C(CH_3)_2C_6H_5$— (bisphenol A); and —$(C_mH_{2m}O)_nC_mH_{2m}$— where m is about 1-6, and n is about 1-16, such as trioxyethylene (m is 2, n is 2). A non-limiting example of such amorphous polyol copolycarbonates is poly(hexamethylene carbonate-block-trioxyethylene carbonate-block-hexamethylene carbonate) diol. Other suitable polyol polycarbonates are described in U.S. Pat. Nos. 6,197,051, 6,177,522, 5,863,627, 5,859,122, 5,621,065, and 5,001,208, as well as in co-owned and co-pending U.S. Patent Application No. 20030078341, bearing Ser. No. 10/277,153. The disclosures these patents and applications are incorporated herein by reference in their entirety. In one example, the polyol polycarbonate can have at least one segment based exclusively or predominantly on 1,6-hexanediol, in combination with diaryl carbonate, dialkyl carbonate, dioxolanone, phosgene, bis-chlorocarbonate, and/or urea.

Other polyol polycarbonates can have the following structure:

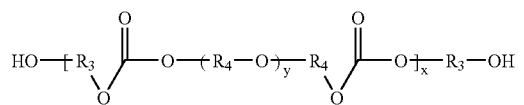

(72)

where $R_3$ is chosen from linear, branched, cyclic, aliphatic, alicyclic, araliphatic, and aromatic moieties having about 4-40 carbon atoms, and alkoxy moieties having about 2-20 carbon atoms; $R_4$ is chosen from linear, branched, cyclic, aliphatic, alicyclic, araliphatic, and aromatic moieties having about 2-20 carbon atoms, and organic moieties having about 2-4 linear carbon atoms in the main chain with or without one or more pendant carbon groups; x is the same or different numbers of about 2-50, such as about 2-35; and y is the same or different numbers chosen from 0, 1, and 2.

The polycarbonate chain can be produced by a number of different methods. With interfacial polymerization, polycarbonate chain can be made from polyols such as bisphenols (e.g., phosgene) in a two-phase reaction (i.e., water and immiscible organic solvent) with a phase transfer catalyst. Polycarbonate chain can also be made by transesterification between a polyol (or a blend of two or more different polyols, like 1,6-hexanediol) and a carbonate (aliphatic carbonate such as alkyl carbonate or alkylene carbonate, or aromatic carbonate, or a blend thereof, like ethylene carbonate), such as a diester of carbonic acid having a structure of R'O(CO)OR?, where R' and R? can be independently chosen from alkyl, aryl, aralkyl, alicyclic, cycloalkyl, and other organic moieties having about 1-20 carbon atoms (such as dialkyl carbonate and diphenyl carbonate). Polycarbonate backbone may further be synthesized from $CO_2$ and epoxide (such as cyclohexene oxide and propylene oxide) or oxetane, with the help of a catalyst. Alternatively, the polycarbonate backbone can be a condensation product of $CO_2$, dihalide, and dialkoxide or a combination of $K_2CO_3$ and polyol (such as diol). Polycarbonate diols can be synthesized using one or a blend of two or more cyclic diols. Other methods for producing the polycarbonate backbone include chloroformate process. Obviously, the polycarbonate backbone can comprise multiple segments formed from different polyols and carbonates. Suitable polyols can be any and all polyols disclosed herein, including the various polyol telechelics. Suitable carbonates include any and all carbonates available to one skilled in the art, such as linear, branched, cyclic, aliphatic, alicyclic, and/or saturated carbonates. In one example, at least one polyol or carbonate having $M_w$ of at least about 200, such as at least about 400 or at least about 1,000 is used to form the backbone.

f) Polyol Polyimines

Polyol polyimines include polyimines grafted with polymeric segments such as, without limitation, polyethylene glycol and methoxylated polyethylene glycol, and hyperbranched and dendritic macromolecules (e.g., dendrimers and tecto-dendrimers), such as those described in co-owned and co-pending U.S. patent application Ser. No. 10/456,295. Dendrimers may have hydroxyl, amidoethanol, and/or amidoethylethanolol as surface end-groups. Alternatively, polyol polyimines can be prepared from polyamine polyimines by reacting with cyclic esters, such as those disclosed herein.

g) Polyol Polyacrylates

An example of polyol polyacrylates has a generic structure of:

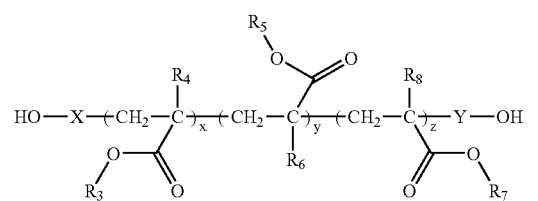

(73)

where $R_3$ to $R_8$ are independently chosen from hydrogen, aliphatic, alicyclic, aromatic, carbocyclic, heterocyclic, halogenated, and substituted moieties, each having about 20 carbon atoms or less; X and Y are optional, independently chosen from alkyl, aryl, mercaptoalkyl, ether, ester, carbonate, acrylate, halogenated, and substituted moieties; x is about 1-200, and y and z are independently zero to about 100. $R_3$ to $R_8$ can independently have the structure $C_nH_m$, where n is an integer of about 2-20, and m can be an integer of about 2-40. Any one or more of the hydrogen atoms in $R_3$ to $R_8$ may be substituted with halogens, cationic groups, anionic groups, silicon-based moieties, ester groups, ether groups, amide groups, urethane groups, urea groups, ethylenically unsaturated groups, acetylenically unsaturated groups, amine groups, hydroxyl groups, or any other organic moieties. $R_4$, $R_6$, and $R_8$ can independently be hydrogen or methyl group, while $R_3$, $R_5$, and $R_7$ can independently have a structure of $C_nH_{2n}$, n being an integer of about 2-16, x+y+z being about 1-100, such as about 5-50.

Suitable polyol polyalkylacrylates include, but are not limited to, those disclosed in the co-pending application bearing Ser. No. 10/640,532, which is incorporated herein by reference in its entirety. Non-limiting examples include α,ω-dihydroxy polymethylmethacrylates, α,ω-dihydroxy polybutylmethacrylates, and α,ω-dihydroxy polyethylhexylmethacrylates.

h) Polyol Polysiloxanes

An example of polyol polysiloxanes has a generic structure of:

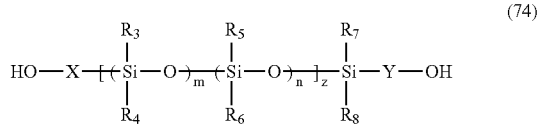 (74)

where $R_3$ to $R_8$ are independently chosen from hydrogen, aliphatic, alicyclic, aromatic, carbocyclic, heterocyclic, halogenated, and substituted moieties, such as alkyl or phenyl moieties, each having about 20 carbon atoms or less; X and Y are optional, independently chosen from alkyl, aryl, mercaptoalkyl, ether, ester, carbonate, acrylate, halogenated, and substituted moieties; in is about 1-200; n is zero to about 100; z is about 1-100. $R_3$ to $R_8$ can independently have the structure $C_nH_m$, where n is an integer of about 2-20, and m is an integer of about 2-40. Any one or more of the hydrogen atoms in $R_3$ to $R_8$ may be substituted with halogens, cationic groups, anionic groups, silicon-based moieties, ester groups, ether groups, amide groups, urethane groups, urea groups, ethylenically unsaturated groups, acetylenically unsaturated groups, hydroxy groups, hydroxyl groups, or any other organic moieties. In one example, $R_3=R_4$, $R_5=R_6$, and $R_7=R_8$.

Suitable polysiloxane polyols include, but are not limited to, those disclosed in the co-pending application bearing Ser. No. 10/407,641, which is incorporated herein by reference in its entirety. Non-limiting examples include bis(hydroxyalkyl)polydimethylsiloxanes, poly(dimethylsiloxane-co-diphenylsiloxane) diols, poly(dimethylsiloxane-co-methylhydrosiloxane) diols, and polydimethylsiloxane diols. Non-limiting examples of polyol copolysiloxanes include polysiloxaneether polyols obtained by copolymerizing polysiloxane diol and polyether diol and/or cyclic ether, such as poly(dimethylsiloxane-oxyethylene) diols (i.e., ethoxylated polydimethylsiloxane diols), and polysiloxaneester polyols or polysiloxaneamide polyols obtained by reacting polysiloxane diol with hydroxy acid or cyclic amide, respectively.

i) Fatty Polyol Telechelics

Fatty polyol telechelics include hydrocarbon polyol telechelics, adduct polyol telechelics, and various oleochemical polyol telechelics. Hydrocarbon polyol telechelics can have an all-carbon backbone of about 8-100 carbon atoms, such as about 10, about 12, about 18, about 20, about 25, about 30, about 36, about 44, about 54, about 60, and any numbers therebetween. Oleochemical polyol telechelics are often derived from natural fats and oils which, if not having hydroxyl groups already, can have double bonds and/or carboxyl groups that may be converted into hydroxyl groups. Double bonds on fatty acids can be epoxidized by hydrogen peroxide to form multiple oxirane functionalities. These epoxidized fats and oils can be liquid at ambient temperature, and can be used as phthalate-free, non-volatile, extraction and migration resistant plasticizers/stabilizers, as polymer building blocks for non-urethane compositions (e.g., linoleum, synthetic leather), or as crosslinking agents for hydroxyl- and/or carboxyl-terminated polymers (e.g., polyesters, polyurethane, polyacrylate resins). They can be reacted with low molecular weight mono- and/or polyfunctional alcohols, acids, and/or or hydroxy acids to form ether polyols and/or ester polyols, which may or may not contain oxirane groups (i.e., through incomplete or complete reactions, respectively). Fatty polyol telechelics derived as such can be liquid, of relatively low molecular weight, and may have reactive hydroxyl groups in the ester positions only (i.e., fatty acid polyol esters like glycerol monostearate), in the hydrocarbon chain only (i.e., fatty acid polyol esters of monofunctional alcohols), or both (i.e., fatty acid polyol esters such as ricinoleic acid monoglyceride). These fatty polyol telechelics can be free of triglyceride ester linkages.

One form of adduct polyol telechelics can be dimer diols, which can be aliphatic α,ω-diols having relatively high molecular weight. Dimer diols can be produced by polymerization (e.g., dimerization) of one or more monounsaturated and/or polyunsaturated fatty monoalcohols, such as palmitoleyl, oleyl, elaidyl, linolyl, linolenyl and/or erucyl alcohols. The resulting dimer diols can be mixtures having a major content (e.g., greater than about 50% by weight of the mixture) of dimer diols and relatively minor contents (e.g., less than about 30%) of the monomer alcohols, trimers, and/or higher oligomers.

Dimer diols can also be prepared from dimer diacids and/or esters thereof including dimethylesters and hydroxy acid methylesters, such as those disclosed herein, by means of hydrogenation or condensation with polyols (e.g., ethylene glycols) and/or polyacids (e.g., azelaic acids). The former can yield hydrocarbon polyol telechelics, whereas the later can yield polyol polyesters. Starting from a distilled dimer diacid, hydrogenation can produce dimer diols having a dimer content of greater than about 90%, such as greater than about 95% by weight. The resulting dimer diols may be unsaturated, partly hydrogenated, or completely hydrogenated (i.e., fully saturated). Likewise, castor oil can produce, through hydrolysis, esterification or transesterification, and hydrogenation, 12-hydroxystearyl alcohol having one primary and one secondary hydroxyl group and a relatively high molecular weight.

Non-limiting dimer diols can have one of the following structures:

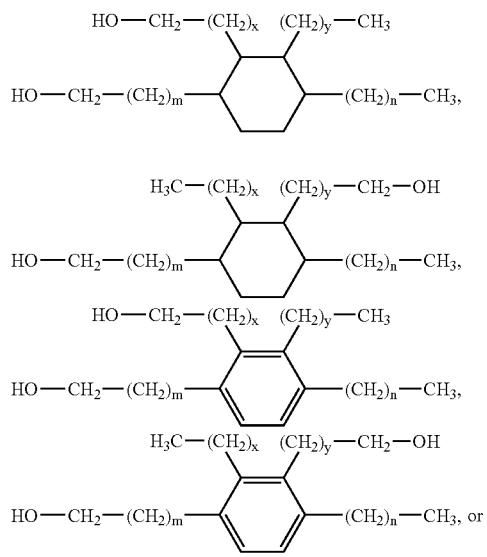

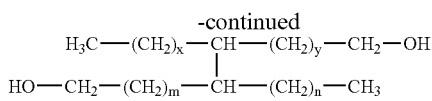

where x+y and m+n are both at least about 8, such as at least about 10, such as 12, 14, 15, 16, 18, 19, or greater.

Molecular weight of fatty polyol telechelics can be about 200-15,000, such as about 250-12,000, or about 500-5,000. Fatty polyol telechelics can be liquid at room temperature, having low to moderate viscosity at 25° C. (e.g., about 100-10,000 cP or about 500-5,000 cP). It is postulated that highly branched polyols in general has desirable resistance to hydrolysis. As such, the fatty polyol telechelics can be branched, such as with alkyl groups, thereby displaying improved chemical stability, improved color stability (i.e., reduced yellowing because of reduction or elimination of unsaturation), high mechanical strength and durability, suitable in forming soft segments, and in formulating solvent-free two pack fall solid polyurethane/polyurea compositions. Because of their fluidity, these fatty polyol telechelics can be used as reactive diluents in solvent-borne polyurethane/polyurea compositions to achieve higher solid content. Conventional volatile solvents such as xylene, butyl acetate, methoxy propylacetate, ethoxy propylacetate may still be necessary to improve compatibility of resin and polyisocyanate, avoid phase separation, and adjust viscosity, but the level of these non-reactive diluents can be significantly reduced.

j) Acid-Catalyzed Polyol Telechelics

Polyols and/or polyol telechelics of the present disclosure can be polymerized into new polyol telechelics through, for example, acid catalyzed dehydration. The condensation reaction can take place at elevated temperatures of at least about 150° C., and up to about 200-250° C., and under normal pressure. The acid catalysts include, but are not limited to, sulfuric acid, hydrochloric acid, methane sulfonic acid, methane disulfonic acid, butane sulfonic acid, perfluorobutane sulfonic acid, benzene sulfonic acid, benzene disulfonic acid, toluene sulfonic acid, naphthalene disulfonic acid, methionic acid, phosphoric acid, perchloric acid, boron trifluoride, zinc chloride, quinoline hydrochloride, alkali metal hydrogen sulfates, other organic sulfonic acids, other aromatic sulfonic acids, other acidic salts, other readily hydrolysable salts, other dissociating salts, acidic ion exchangers containing sulfonic acid group, and acidic aluminas. These catalysts can be used individually or in combination of two or more thereof, in a quantity of about 0.1-30%, such as about 0.2-2% or about 0.5-15%, by weight of the starting polyols and/or polyol telechelics. The condensation reaction takes about 2-20 hours, such as about 6-12 hours, until the theoretically calculated quantity of water is obtained in the water separator. The catalysts are hydrolyzed and precipitated out with aqueous alkali or ammonia. Solvents, unreacted starting materials, by-products such as ring ethers, and water are removed by azeotropic distillation, evaporation in vacuo, and/or other conventional means. The reaction product can be purified through distillation or fractional distillation.

The starting polyols and/or polyol telechelics include, but are not limited to, 1,5-pentanediol, 3-methyl-1,5-pentanediol, 1,6-hexanediol, 1,7-heptanediol, 1,8-octanediol, 1,9-nonanediol, 1,10-decanediol, dimer diols, and other aliphatic diols. In one example, one of these diols by weight of at least about 50% can be blended with one or more of the other diols as the starting material. The reaction product can have a structure of HO—[R—O—]$_n$H, where R is a linear or branched alkylene radical having about 5 carbon atoms or more, such as about 8, about 10, about 12, about 16, about 18, about 20, about 30, about 36, about 44, and about 54 carbon atoms or more; and n is more than 1, such as about 2 or more. The main chain of R can have at least about 5 carbon atoms, such as about 8 or about 10 carbon atoms or more. The terminal hydroxyl groups can be primary. For molecularly non-uniform polyol polyethers, the number n can be about 0.5-5, such as 1.5-5. For molecularly uniform polyol polyethers, the number n can be about 2-10, such as about 4-7. The reaction product can have a hydroxyl number of less than 750, such as about 600, about 450, about 250, or about 175 or less, or about 10-100, or any number therebetween. The reaction product can have an acid value of less than 5, such as about 1-3. The hydroxyl number is the milligrams of KOH equivalent to the quantity of acetic acid bound by 1 g of the reaction product during an acetylation reaction. The reaction product is boiled with acetic anhydride/pyridine and the acid formed is filtered with KOH solution. The acid value is a measure of the content of free organic acids in the reaction product. It indicates the number of milligrams of KOH used to neutralized 1 g of the reaction product. The reaction product can have a viscosity at 25° C. of about 3,000 cP or greater, such as about 3,000-12,000 cP, and a solubility in 100 ml of water at 20° C. of about 1 mg or less, such as about 0.1 mg or less.

k) Carbonate-Transesterified Polyol Telechelics

Polyol telechelics of the present disclosure, such as polyol polyhydrocarbons, polyol polyethers, fatty polyol telechelics (such as dimer diols), and/or acid-catalyzed polyol telechelics as described above can be randomly copolymerized into new polyol telechelics through transesterification with carbonate-forming compounds at temperatures of about 120-220° C., such as about 130-200° C., under pressures of about 0.1-200 mbar, such as about 0.1-100 mbar, over a period of about 6-20 hours. The reaction may be catalyzed by bases or transition metal compounds. By-products of the reaction can be moved via distillation.

The starting polyol telechelic can have a relatively low molecular weight, such as 150, 180, 300, 400, 500, 700, 800, 1,000, and any number therebetween. The starting polyol telechelic can be of a single molecular species, or a blend of two or more suitable polyol telechelics. One polyol telechelic can be present in an amount of 50-100% by weight. One or more aliphatic polyols as disclosed herein (e.g., $C_3$ to $C_{12}$ aliphatic polyols like 1,5-pentanediol, 3-methyl-1,5-pentanediol, 1,6-hexanediol, 1,7-heptanediol, 1,8-octanediol, 1,9-nonanediol, 1,10-decanediol), in an amount of 0-50% by weight, can be mixed with the polyol telechelic and then react with the carbonate-forming compound. Small quantities of trimethylolethane, trimethylolpropane, and/or pentaerythritol may be mixed in for branching. In one example, the starting polyol telechelic comprises at least one polyol polyether formed from 50-100 mole % of at least a first diol and 0-50 mole % of at least a second diol, both independently chosen from 1,5-pentanediol, 3-methyl-1,5-pentanediol, 1,6-hexanediol, 1,7-heptanediol, 1,8-octanediol, 1,9-nonanediol, 1,10-decanediol, diethylene glycol, triethylene glycol, tetraethylene glycol, dipropylene glycol, tetrapropylene glycol, other oligomer diols of ethylene oxide and/or propylene oxide, and other aliphatic diols. In another example, the starting polyol telechelic comprises at least one fatty polyol telechelic as disclosed herein.

The carbonate-forming compounds include, but are not limited to, diaryl carbonates, dialkyl carbonates, dicycloalkyl carbonates, diaryalkyl carbonates, dioxolanones, hexanediol bis-chlorocarbonates, phosgene and urea. Diaryl carbonates include diphenyl-, ditolyl-, dixylyl-, and dinaphthyl-carbonates. Dialkyl carbonates include those having linear or branched $C_1$ to $C_8$ alkyl, cyclic, or alicyclic groups, such as dimethyl-, diethyl-, dipropyl-, dibutyl-, diamyl-, and dicyclohexyl-carbonates. Dioxolanones include ethylene carbonate, propylene carbonate, butylene carbonate, glycerine carbonate, 4-chloro-1,3-dioxolan-2-one, 4-hydroxymethyl-1,3-dioxolan-2-one, 4-phenyl-1,3-dioxolan-2-one, 4-methoxymethyl-1,3-dioxolan-2-one, 4,4-dimethyl-1,3-dioxolan-2-one, other cyclic carbonates as disclosed herein, substituted (such as alkyl) cyclic carbonates. Others include hexane-1,6-diol bis-chlorocarbonate, phosgene, and urea. The carbonate-forming compound is used in a defined deficient quantity such that the desired molecular weight according to the following equation results:

$M_w$(reaction product)=$n \times M_w$(starting polyol telechelic)+(n−1)×26 where n is the number of moles of starting polyol telechelic or blend of polyol telechelic and aliphatic polyol; n−1 is the number of moles of carbonate-forming compound used; and 26 is the molecular weight of the carbonyl group minus 2.

The reaction product can be polyol polyethercarbonates having $M_w$ of about 500-12,000, such as about 700, about 1,000, about 2,000, about 2,500, about 3,000, about 5,000, about 6,000, or any number therebetween, in which a ratio of ether linkages to carbonate linkages is about 5:1 to about 1:5, such as about 3:1 to about 1:3, and the various alkylene units are arranged statistically, alternately, and/or blockwise. The polyol polyethercarbonates can have a hydroxyl number of about 30 or greater, such as about 50, about 60, about 75, about 80, about 100, or greater, or any number therebetween. Some of these polyol polyethercarbonates can be low-melting waxes, having a softening point of less than about 40° C., and a viscosity at 50° C. of about 8,500 or less, such as about 5,000, about 3,500, about 2,000, about 600, or less, or any number therebetween. Some of these polyol polyethercarbonates can be liquid at room temperature (e.g., 20-25° C.). These polyol polyethercarbonates can be high in hydrophobicity, hydrolysis resistance, and saponification resistance. Materials and methods used to produce such polyol polyethercarbonates are disclosed in U.S. Pat. Nos. 4,808,691 and 5,621,065, which are incorporated herein by reference.

l) Derivatized Polyol Telechelics

Polyol telechelics can be derived from corresponding polyacids and alkyl (such as methyl) esters thereof, such as through hydrogenation. Any carboxylic acid terminated polymers known and/or available to one skilled in the art, including the fatty polyacids and polyacid adducts disclosed herein, may be converted to polyol telechelics. Other polyol telechelics can be derived from suitable polymers, optionally having two or more functionalities such as amine, hydroxyl, carbonyl, etc., through reactions with polyols, aminoalcohols, hydroxy acids or esters thereof, cyclic ethers, and/or cyclic esters. For example, polyol telechelics can be derived from polyamine telechelics or other polyol telechelics via reactions with cyclic esters, hydroxy acids, and/or hydroxy esters, in which multiple amide linkages or esters linkages, respectively, are formed.

One example of polyetherester polyols have a generic structure of:

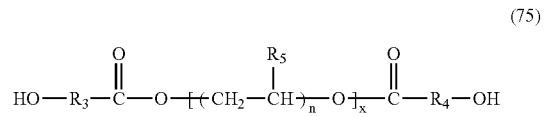

(75)

where $R_3$ to $R_4$ are independently chosen from hydrogen, alkyl, aryl, aralkyl, alicyclic, cycloalkyl, or alkoxy moieties having about 1-60 carbon atoms, such as about 1-20 carbon atoms; $R_5$ is a hydrogen, alkyl group (such as methyl), phenyl group, halide, or mixture thereof; n is about 1-12; and x is about 1-200. These polyetherester polyols can be obtained from polyol polyethers through means such as reaction with hydroxy acids or cyclic esters. Other polyetherester polyols can be formed from polyacid telechelics by reacting with polyols and/or cyclic esters.

One group of derivatized polyol telechelics can be prepared by adding cyclic ethers to the termini of an existing polyol telechelic. For example, the existing polyol telechelic can be any of the polyol telechelics disclosed herein, such as one or a blend of the fatty polyol telechelics, and the cyclic ethers can be one or more of those having about 2-14 carbon atoms, such as ethylene oxide, propylene oxide, butylene oxide, tetrahydrofuran, and cyclic ethers having 5 or more carbon atoms. Known methods may be used to add the cyclic ethers to the polyol telechelic. For example, the hydroxyl groups in the polyol telechelic can be converted to alcoholate by heating with alkali hydroxide (such as NaOH or KOH) at about 100-140° C., which is then mixed with the cyclic ether (such as those having a 3-membered ring) to initiate an anionic polymerization. Alternatively, the cyclic ether (such as those having a 5-membered ring) is subjected to a cationic ring-opening polymerization at about 0° C., in the presence of catalysts such as boron trifluoride ether salt, and then mixed with alkali salts of the polyol telechelic (such as disodium salt of the dimer diol) to terminate the polymerization and yield the derivatized polyol telechelic.

The resulting polyol telechelic can have a structure of HO—(Y—O)$_m$—X—O-(Z-O)$_n$—H, where X is the backbone of the starting polyol telechelic HO-Z-OH; Y is the organic moiety of cyclic ether

Z is the organic moiety of cyclic ether

m and n are the same or different numbers of 0 or more, and m+n is about 2-100, such as about 2-40. Y and Z can be the same or different, and can have 2 or more carbon atoms or 5 or more carbon atoms. Y and Z can independently have one or more heteroatoms such as O, S, N, and Si. The resulting polyol telechelic can have a hydroxyl number of about 200 or less, such as about 140 or less. The molecular weight of segment Z-O can be at least about 1% by weight of the $M_w$ of the polyol telechelic, the latter of which can be about 500-20,000, such as about 600, about 1,000, about 2,000, about 3,000, about 5,000, about 8,000, about 10,000, about 12,000, about 15,000, and any number therebetween. When certain cyclic ethers such as propylene oxide and butylene oxide are used, the hydroxyl groups of the resulting polyol telechelics may be secondary, which can be converted to primary for improved reactivity. These and other polyol telechelics as described in U.S. Pat. No. 6,252,037 are incorporated herein by reference.

m) Ethylenically and/or Acetylenically Unsaturated Polyol Telechelics

Any of the polyol telechelics disclosed herein above may comprise one, two, or a plurality of ethylenic and/or acetylenic unsaturation moieties. These unsaturation moieties can be used to form carbon-carbon and/or ionic crosslinks in combination with vulcanizing agents (i.e., radical initiators, polyisocyanates, co-crosslinking agents, curatives comprising ethylenic and/or acetylenic unsaturation moieties, and/or processing aids). These unsaturation moieties may be pendant along the backbone of the polyol telechelics, attached to pendant groups or chains branched off the backbone, and/or attached to the amine end-groups of the polyol telechelics.

For example, ethylenically and/or acetylenically unsaturated polyol polyhydrocarbons include, without limitation, those having high or low vinyl polyolefin backbones. These backbones can be formed from one or more diene monomers, optionally with one or more other hydrocarbon monomers. Exemplary diene monomers include conjugated dienes containing 4-12 carbon atoms, such as 1,3-butadiene, isoprene, chloroprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene, and the like; non-conjugated dienes containing 5-25 carbon atoms such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclononadienes such as 3-methylbicyclo-(4,2,1)-nona-3,7-diene, and the like, indenes such as methyl tetrahydroindene, and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, and the like; and tricyclodienes such as 3-methyltricyclo(5,2,1,0$^{2,6}$)-deca-3,8-diene and the like.

Non-limiting examples of vinyl polyolefin backbones are vinyl polybutadienes, vinyl polyisoprenes, vinyl polystyrenebutadienes, vinyl polyethylenebutadienes, vinyl poly(styrene-propylene-diene)s, vinyl poly(ethylene-propylene-diene)s, and fluorinated or perfluorinated derivatives thereof. High 1,2-vinyl content can be at least about 40%, such as 50%, 60%, 70%, 80%, 90%, or even greater. Low 1,2-vinyl content can be less than about 35%, such as 30%, 20%, 15%, 12%, 10%, 5%, or even less. The vinyl polyolefin backbone can have various combinations of cis-, trans-, and vinyl structures, such as having a trans-structure content greater than cis-structure content and/or 1,2-vinyl structure content, having a cis-structure content greater than trans-structure content and/or 1,2-vinyl structure content, or having a 1,2-vinyl structure content greater than cis-structure content or trans-structure content.

Other ethylenically and/or acetylenically unsaturated moieties that may be incorporated onto the backbone of the polyol telechelics include allyl groups and α,ω-ethylenically unsaturated $C_3$ to $C_8$ carboxylate groups. Non-limiting examples of such ethylenically unsaturated moieties include acrylate, methacrylate, fumarate, β-carboxyethyl acrylate, itaconate, and other unsaturated carboxylates disclosed herein. These unsaturated moieties can be attached to the hydroxyl groups on the polyol telechelics by forming ester linkages. The incorporation of these unsaturated moieties may take place before the formation of prepolymer, or after the prepolymer is reacted with stoichiometrically excessive amounts of polyamine and/or polyol curatives.

Ethylenically and/or acetylenically unsaturated polyol polyhydrocarbons can be liquid at ambient temperature, such as those having vinyl polybutadiene homopolymers or copolymers as backbones, and can have low to moderate viscosity, low volatility and emission, high boiling point (such as greater than 300° C.), and molecular weight of about 1,000 to about 5,000, such as about 1,800 to about 4,000, or about 2,000 to about 3,500.

Polyols

Polyols include, but are not limited to, unsaturated diols such as 1,3-bis(2-hydroxyethoxy)benzene, 1,3-bis[2-(2-hydroxyethoxy)ethoxy]benzene, N,N-bis(β-hydroxypropyl)aniline, 1,3-bis{2-[2-(2-hydroxyethoxy)ethoxy]ethoxy}benzene, hydroquinone-di(β-hydroxyethyl)ether, resorcinol-di(β-hydroxyethyl)ether; saturated diols such as ethylene glycol, diethylene glycol, polyethylene glycol, propylene glycol, dipropylene glycol, polypropylene glycol, 2-methyl-1,3-propanediol, 1,2-, 1,3-, 1,4-, or 2,3-butanediols, 2-methyl-1,4-butanediol, 2,3-dimethyl-2,3-butanediol, 1,5-pentanediol, 1,6-hexanediol, dimethylolcyclohexane, 1,3-bis(2-hydroxyethoxy)cyclohexane, 1,3-bis[2-(2-hydroxyethoxy)ethoxy]cyclohexane, 1,3-bis{2-[2-(2-hydroxyethoxy)ethoxy]ethoxy}cyclohexane; unsaturated triols such as castor oil (i.e., triricinoleoyl glycerol); saturated triols such as 1,2,4-butanetriol, 1,2,6-hexanetriol, trimethylolethane (i.e., 1,1,1-tri(hydroxymethyl)ethane), trimethylolpropane (i.e., 2,2-di(hydroxymethyl)-1-butanol), triethanolamine, triisopropanolamine; unsaturated tetraols such as 2,4,6-tris(N-methyl-N-hydroxymethyl-aminomethyl)phenol; saturated tetraols such as pentaerythritol (i.e., tetramethylolmethane), tetrahydroxypropylene ethylenediamine (i.e., N,N,N',N'-tetrakis(2-hydroxypropyl)-ethylenediamine); and other polyols such as mannitol (i.e., 1,2,3,4,5,6-hexanehexol) and sorbitol (an enantiomer of mannitol) (both saturated).

The polyols can be alkanediols such as, without limitation, ethylene glycol, 1-phenyl-1,2-ethanediol, 1,2- or 1,3-propanediol, 3-chloro-1,2-propanediol, 2-methyl-1,3-propanediol, 2,2-dimethyl-1,3-propanediol, 2,2-diphenyl-1,3-propanediol, 2-ethyl-2-methyl-1,3-propanediol, 2-n-butyl-2-ethyl-1,3-propanediol, 1,3-, 1,4-, or 2,3-butanediol, 2-methyl-1,4-butanediol, 1,1,4,4-tetraphenyl-1,4-butanediol, 2,2,4,4,-tetramethyl-1,3-cyclobutanediol, 1,5- or 2,4-pentanediol, 2-methyl-2,4-pentanediol, 1,6- or 2,5-hexanediol, 2-ethyl-1,3-hexnaediol, 2,5-dimethyl-2,5-hexanediol, 1,4-cyclohexanediol, 1,7-heptanediol, 1,8-octanediol, 1,12-dodecanediol, hydroquinone di(b-hydroxyethyl)ether, hydroquinone di(b-hydroxypropyl)ether, resorcinol di(b-hydroxyethyl)ether, resorcinol di(b-hydroxypropyl)ether, 2,2-bis(4-hydroxyphenyl)propane, and mixtures thereof. Fatty polyols include fatty diols and fatty triols such as 1,9,10-trihydroxyoctadecane.

The polyol may have a structure of:

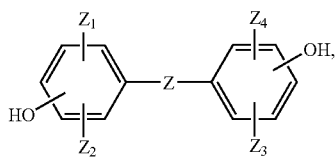 (76)

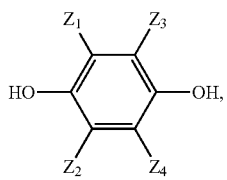 (77)

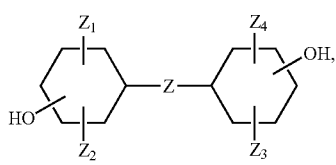 (78)

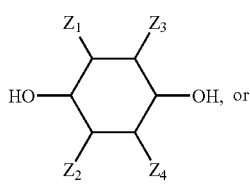 (79)

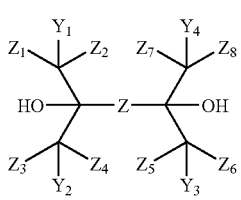 (80)

where $Z_1$ to $Z_8$ are independently chosen from halogenated or un-halogenated hydrocarbon moieties having about 1-20 carbon atoms, halogenated or un-halogenated organic moieties having at least one O, N, S, or Si atom and zero to about 12 carbon atoms, or halogens; $Y_1$ to $Y_4$ are independently chosen from hydrogen, halogenated or un-halogenated hydrocarbon moieties having about 1-20 carbon atoms, halogenated or un-halogenated organic moieties having at least one O, N, S, or Si atom and zero to about 12 carbon atoms, and halogens; Z is halogenated or un-halogenated hydrocarbon moieties having about 1-60 carbon atoms, or halogenated or un-halogenated organic moieties having at least one O, N, S, or Si atom and zero to about 60 carbon atoms. Z can have one of the structures (41)-(48) above. Other non-limiting examples include 1,4-durene diol and 2,3,5,6-tetramethyl-1,4-dihydroxycyclohexane.

Aminoalcohol Telechelics

As used herein, the term "aminoalcohol telechelic" refers to telechelic polymers having at least one terminal amine end-group and at least one terminal hydroxyl end-group. Any such aminoalcohol telechelics available to one of ordinary skill in the art are suitable for use in compositions of the present disclosure. These telechelics can be linear, branched, block, graft, monodisperse, polydisperse, regular, irregular, tactic, isotactic, syndiotactic, stereoregular, atactic, stereoblock, single-strand, double-strand, star, comb, dendritic, and/or ionomeric, and include homopolymers, random copolymers, pseudo-copolymers, statistical copolymers, alternating copolymers, periodic copolymer, bipolymers, terpolymers, quaterpolymers, as well as derivatives of any and all polyamine telechelics, polyol telechelics, and polyacids disclosed herein. Aminoalcohol telechelics can have any of the polymer or copolymer structures of the herein-described polyamine telechelics and polyol telechelics, such as polyhydrocarbons (such as polydienes), polyethers, polyesters (such as polycaprolactones), polyamides (such as polycaprolactams), polycarbonates, polyacrylates (such as polyalkylacrylates), polysiloxanes, and copolymers thereof.

The aminoalcohol telechelic can be reaction product of polyamine telechelic and cyclic ester, or blend of cyclic ester and cyclic amide. The polyamine telechelic can serve as base to open the cyclic ring structures. Any of the polyamine telechelics, cyclic esters, and cyclic amides as disclosed herein are suitable. The polyamine telechelics can have a molecular weight of about 1,000-5,000, such as about 2,000-4,000, having aliphatic primary amine end-groups, and include polyether polyamines such as diamines and triamines of polyoxyethylene, polyoxypropylene, and poly(oxyethylene-co-oxypropylene). Commercially available polyether polyamines include Jeffamine® D-2000 and D-3000. The cyclic esters and cyclic amides have a generic structure of:

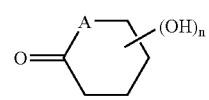 (81)

where A is O or N, n is 0 to about 4, such as about 2 or about 3. Commercially, caprolactone, caprolactone diols, and caprolactone triols are available under the trademark Tone® from Union Carbide Chemicals and Plastics Technology Corporation of Danbury, Conn.

The aminoalcohol telechelics can be in situ polymerization products formed during the synthesis of isocyanate-terminated prepolymer, in which the polyamine telechelic, the cyclic ester and/or amide, and polyisocyanate (such as uretdione dimers and/or isocyanurate trimers) are mixed together. An exothermic reaction can result in the prepolymer having a linear aliphatic backbone, with the chain structure of the polyamine telechelic on one side and linked to a first polyisocyanate molecule via a urea linkage, and a polycaprolactone chain on the other side and linked to a second polyisocyanate molecule via a urethane linkage. Methods of forming the prepolymer are detailed in U.S. Pat. No. 6,437,078, which is incorporated herein by reference.

Aminoalcohols

Aminoalcohols useful in the present disclosure include any and all monomers, oligomers, and polymers having at least one free isocyanate-reactive hydroxy group and at least one free isocyanate-reactive amine group. The hydroxy and amine groups may be primary or secondary, terminal or pendant groups on the oligomeric or polymeric backbone, and in the case of secondary or tertiary amine groups, may be embedded within the backbone. Aminoalcohols can be linear or branched, saturated or unsaturated, aliphatic, alicyclic, aromatic, or heterocyclic. The aminoalcohol can be R—[HN—(R'O)$_x$]$_y$—H, where R is hydrogen, hydrocarbyl or hydroxyhydrocarbyl group (such as —R'—OH) having about 1-12 carbon atoms, such as about 1-8 or about 1-4 carbon atoms; R' is a divalent hydrocarbyl moiety having about 2-30 carbon atoms; each x is independently about 1-15; and y is about 1-3. R and R' can independently be acyclic, alicyclic or aromatic. These aminoalcohols include alkanolamines, N-(hydroxyhydrocarbyl)amines, hydroxypoly(hydrocarbyloxy)amines, and hydroxypoly(hydroxyl-substituted oxyalkylene)amines, conveniently prepared by reaction of one or more epoxides with amines, and are also known as alkoxylated amines (when y is 1) or diamines (when y is 2), R' can be linear or branched alkylene having about 2-30 carbon atoms, such as about 4 or 6 carbon atoms or any number therebetween, like ethylene, propylene, 1,2-butylene, 1,2-octadecylene, etc. R can be methyl, ethyl, propyl, butyl, pentyl, or hexyl group. Non-limiting examples of these alkanolamines include monoethanolamine, diethanolamine, diethylethanolamine, ethylethanolamine, monoisopropanolamine, diisopropanolamine, butyldiethanolamine, etc. Non-limiting examples of hydroxyhydrocarbylamines include 2-hydroxyethylhexylamine, 2-hydroxyethyloctylamine, 2-hydroxyethylpentadecylamine, 2-hydroxyetholeylamine, 2-hydroxyethylsoyamine, 2-hydroxyethoxyethylhexylamine, and mixtures thereof.

The aminoalcohol can be hydroxy-containing polyamine, such as analogs of hydroxy monoamines, like alkoxylated alkylenepolyamines (e.g., N,N-(diethanol)ethylene diamines). Such polyaminoalcohols can be prepared by reacting one or more cyclic ethers such as those disclosed herein with the diamines and higher polyamines disclosed herein, such as alkylene polyamines, or with the various aminoalcohols, such as those disclosed herein, including primary, secondary, and tertiary alkanolamines, with a molar ratio of about 1:1 to about 2:1. Reactant ratios and temperatures for carrying out such reactions are known to those skilled in the art. Specific examples of hydroxy-containing polyamines include N-(2-hydroxyethyl)ethylenediamine, N,N'-bis(2-hydroxyethyl)ethylenediamine, 1-(2-hydroxyethyl)piperazine, mono(hydroxypropyl)-substituted tetraethylenepentamine, N-(3-hydroxybutyl)-tetramethylene diamine, etc. Higher homologs obtained by condensation of the above-illustrated hydroxy-containing polyamines through amine and/or hydroxyl groups are likewise useful. Condensation through amine groups can result in a higher amine accompanied by removal of ammonia while condensation through the hydroxyl groups can result in products containing ether linkages accompanied by removal of water.

Other examples of aminoalcohols include N-(2-hydroxyethyl)cyclohexylamine, 3-hydroxycyclopentylamine, parahydroxyaniline, 2-propanol-1,1'-phenylaminobis, N-hydroxyethylpiperazine, 2-aminoethanol, 3-amino-1-propanol, 1-amino-2-propanol, 2-(2-aminoethoxy)ethanol, 2-[(2-aminoethyl)amino]ethanol, 2-methyl aminoethanol, 2-(ethylamino)ethanol, 2-butylaminoethanol, diethanolamine, 3-[(hydroxyethyl)amino]-1-propanol, diisopropanolamine, bis(hydroxyethyl)-aminoethylamine, bis(hydroxypropyl)-aminoethylamine, bis(hydroxyethyl)-aminopropylamine, bis(hydroxypropyl)-aminopropylamine, hydroxy-functional amino acids as described herein, and mixtures thereof.

Polyacids

As used herein, the term "polyacids" encompasses diacids, triacids, tetracids, other higher acids, as well as acid anhydrides, dianhydrides, chlorides, esters, dimers, trimers, oligomers, polymers, and any other structures capable of forming at least two ester or amide linkages. Suitable organic polyacids include, but are not limited to, organic monomeric diacids having about 2-60 carbon atoms, such as branched or linear aliphatic dicarboxylic acids having about 2-44 carbon atoms, alkane dicarboxylic acids having about 6-22 carbon atoms, cyclic or cycloaliphatic dicarboxylic acids having about 6-44 carbon atoms, and aromatic dicarboxylic acids having about 8-44 carbon atoms. The polyacids can be aliphatic dicarboxylic acids and alicyclic dicarboxylic acids having para-, meta- and/or ortho-positioned dicarboxylic acid moieties.

Non-limiting examples of polyacids include unsaturated aliphatic dicarboxylic acids such as maleic acid, fumaric acid, itaconic acid, citraconic acid, and mesaconic acid; saturated aliphatic polycarboxylic acids such as oxalic acid, malonic acid, glyceric acid, dimethyl malonic acid, succinic acid, methylsuccinic acid, diglycolic acid, glutaric acid, 3-methylglutaric acid, 2,2- and 3,3-dimethylglutaric acid, adipic acid, 2,2,4- and 2,4,4-trimethyladipic acid, pimelic acid, suberic acid, azelaic acid, sebacic acid, undecanedioic acid, dodecanedioic acid, brassylic acid, tetradecanedioic acid, pentadecanedioic acid, heptadecanedioic acid, heptadecanedioic acid, octadecanedioic acid, heptadecanedicarboxylic acid, octadecanedicarboxylic acid, nonadecanedicarboxylic acid, and eicosanedicarboxylic acid; alicyclic dicarboxylic acids such as 1,1-cyclopropanedicarboxylic acid, 1,3-cyclopentanedicarboxylic acid, 1,2- and 1,4-cyclohexanedicarboxylic acid, 4,4'-dicaboxydicyclohexylmethane, 3,3'-dimethyl-4,4'-dicarboxydicyclohexylmethane, 4,4'-dicarboxydicyclohexylpropane, 1,4-bis(carboxymethyl)cyclohexane, 2,3-, 2,5-, and 2,6-norbornanedicarboxylic acid, tetrahydrophthalic acid, hexahydrophthalic acid, hexahydroterephthalic acid, hexahydroisophthalic acid, and hexahydronaphthalic acid; aromatic dicarboxylic acids such as phthalic acid, isophthalic acid, tributylisophthalic acid, terephthalic acid, nitrophthalic acid, 5-methylisophtalic acid, 2-methylterephtalic acid, 2-chloroterephtalic acid, naphthalic acid, diphenic acid, 4,4'-diphenyldicarboxylic acid, 4,4'-oxydibenzoic acid, and 1,3-phenylenedioxy diacetic acid; tricarboxylic acids, tetracarboxylic acids, and the like, such as hexanetricarboxylic acid, hexanetetracarboxylic acid, 1,2,3,4-cyclobutanetetracarboxylic acid, 2,2-dimethylcyclobutane-1,1,3,3-tetracarboxylic acid, 1,2,3,4-cyclopentanetetracarboxylic acid, cis,cis-1,3,5-trimethyl-cyclohexane-1,3,5-tricarboxylic acid, aconitic acid, 1,2,3-benzenetricarboxylic acid, trimellitic acid, trimesic acid, 2-methylbenzene-1,3,5-tricarboxylic acid, pyromellitic acid, 3,4,3',4'-biphenyltetracarboxylic acid, 2,3,3',4'-biphenyltetracarboxylic acid, and mellitic acid.

Non-limiting examples of acid anhydrides include aliphatic diacid anhydrides such as maleic anhydride, itaconic anhydride, and citraconic anhydride; aromatic diacid anhydrides such as phthalic anhydride. Non-limiting examples of acid dianhydrides include pyromellitic dianhydride, naphthalene-1,4,5,8-tetracarboxylic dianhydride, and 3,3,4,4-biphenyltetracarboxylic dianhydride. Non-limiting examples of carboxylic acid (co)polymers, which can have $M_n$ of about 1,000-15,000, include dicarboxy-terminated polybutadienes, poly(meth)acrylic acids, polyitaconic acids, copolymers of (meth)acrylic acid and maleic acid, copolymers of (meth)acrylic acid and styrene, dicarboxy-terminated poly(dimethylsiloxane-co-diacid), and dicarboxy-terminated poly(dimethylsiloxane-co-dimer acid).

The polyacid may further contain various moieties such as, but are not limited to, heterocyclic rings, nitro groups, amine groups, imine groups, carbonyl groups, hydroxyl groups, ether bonds, ester bonds, amide bonds, imide groups, urethane bonds, urea bonds, and/or ionic groups.

Non-limiting examples of ketodiacids are oxaloacetic acids, 2- and 3-oxoglutaric acid, and dimethyl-3-oxoglutaric acid. Non-limiting examples of heterocyclic diacids are dinicotinic acid, dipicolinic acid, lutidinic acid, quinolinic acid, and pyrazine-2,3-dicarboxylic acid. Ionic groups can be anionic groups, such as carboxylates, sulfonates, and phosphates. Non-limiting examples are alkali metal salts of sulfoisophthalic acid, such as sodium 3-sulfoisophthalate and potassium 3-sulfoisophthalate. Other useful polyacids include salts of tri- or tetrasulfonic acids, such as trisodium salt of naphthalene-1,3,6-trisulfonic acid, the trisodium salt of 8-tetradecyloxypyrene-1,3,6-trisulfonic acid, and the tetrasodium salt of pyrene-1,3,6,8-tetrasulfonic acid.

Fatty Polyacids

Fatty polyacids can be derived from monounsaturated and/or polyunsaturated fatty acids through reactions involving the double bonds, such as ozonolysis (e.g., forming azelaic acid from oleic acid), caustic oxidation (e.g., forming sebacic acid from ricinoleic acid or castor oil), and polymerization (e.g., dimerization). Polymeric fatty acids can be formed from a polymerization reaction of a saturated, ethylenically unsaturated, or acetylenically unsaturated fatty acid and at least one compound to provide a second acid moiety or a functional group convertible to the second acid moiety. Polymeric fatty acids may result from the polymerization of oils or free acids or esters thereof, via dienic Diels-Alder reaction to provide a mixture of dibasic and higher polymeric fatty acids. In place of these methods of polymerization any other method of polymerization may be employed, whether the resultant polymer possesses residual unsaturation or not.

Fatty acids can be long-chain monobasic fatty acids having a $C_6$ or longer chain, such as $C_{11}$ or longer or $C_{16}$ or longer, and $C_{24}$ or shorter, such as $C_{22}$ or shorter. Unsaturated fatty acids and esters thereof can be monounsaturated and/or polyunsaturated, monocarboxylic and/or polycarboxylic, and include, without limitation, oleic acid, linoleic acid, linolenic acid, palmitoleic acid, elaidic acid, erucic acid, hexadecenedioic acid, octadecenedioic acid, vinyl-tetradecenedioic acid, eicosedienedioic acid, dimethyl-eicosedienedioic acid, 8-vinyl-10-octadecenedioic acid, methyl, ethyl, and other esters (such as linear or branched alkyl esters) thereof, and mixtures thereof. Also dimerizable are fatty acid mixtures obtained in the hydrolysis of natural fats and/or oils, such as olive oil fatty acids, sunflower oil fatty acids, soybean fatty acids, corn oil fatty acids, canola fatty acids, cottonseed oil fatty acids, coriander oil fatty acids, tallow fatty acids, coconut fatty acids, rapeseed oil fatty acids, fish oil fatty acids, tall oil fatty acids, methyl, ethyl, and other esters thereof, and mixtures thereof.

The polymeric fatty acids can be adduct acid, such as adduct diacid formed between a conjugated ethylenically unsaturated fatty acid (e.g., linoleic acid, soybean oil fatty acid, tall oil fatty acid) and a short-chain unsaturated acid (e.g., acrylic acid, methacrylic acid, crotonic acid). Methods for producing such adduct acids are described, for example, in U.S. Pat. Nos. 5,136,055, 5,053,534, 4,156,095, and 3,753,968. Alternatively, the polymeric fatty acid can be obtained by hydroformylating an unsaturated fatty acid and then oxidizing it into fatty dicarboxylic acid. For example, oleic acid can be reacted with carbon monoxide and hydrogen to form 9(10)-formyloctadecanoic acid, which can then be oxidized to 9(10)-carboxyoctadecanoic acid.

Polymeric fatty acids may also be obtained in known manners (e.g., addition polymerization using heat and a catalyst) from one monobasic fatty acid or a blend of two or more monobasic fatty acids, the monobasic fatty acids being saturated, ethylenically unsaturated, or acetylenically unsaturated. The resulting polymeric fatty acids are often referred to in the art as dimers (i.e., dimerized fatty acids), trimers (i.e., trimerized fatty acids) and so forth (e.g., oligomeric fatty acids). Saturated monobasic fatty acids can be polymerized at elevated temperatures with a peroxidic catalyst such as di-t-butyl peroxide. Suitable saturated monobasic fatty acids include linear or branched acids such as caprylic acid, pelargonic acid, capric acid, lauric acid, myristic acid, palmitic acid, isopalmitic acid, stearic acid, arachidic acid, behenic acid, and lignoceric acid.

Ethylenically unsaturated monobasic fatty acids and esters thereof can be polymerized via non-catalytic polymerization at a higher temperature, or using catalysts such as acid or alkaline clays, di-t-butyl peroxide, boron, trifluoride and other Lewis acids, anthraquinone, sulfur dioxide and the like. Methods of dimerizing unsaturated fatty acids and their esters are described in U.S. Pat. No. 6,187,903, among others. Suitable monomers include linear or branched acids having at least one ethylenically unsaturated bond, such as about 2-5 of such bonds, like 3-octenoic acid, 11-dodecanoic acid, linderic acid, oleic acid, linoleic acid, linolenic acid, hiragonic acid, eleostearic acid, punicic acid, catalpic acid, licanoic acid, clupadonic acid, clupanodonic acid, lauroleic acid, myristoleic acid, tsuzuic acid, palmitoleic acid, gadoleic acid, cetoleic acid, nervonic acid, moroctic acid, timnodonic acid, arachidonic acid (i.e., eicosatetraenoic acid), nisinic acid, scoliodonic acid, and chaulmoogric acid.

Acetylenically unsaturated monobasic fatty acids can be polymerized by simply heating the acid. The polymerization of these highly reactive materials can occur in the absence of a catalyst. Any acetylenically unsaturated fatty acid, linear or branched, mono-unsaturated or poly-unsaturated, are useful monomers for the preparation of polymeric fatty acids. Suitable examples of such materials include 10-undecynoic acid, tariric acid, stearolic acid, behenolic acid and isamic acid.

Polymerization reaction of the monobasic fatty acids as described above, include so-called dimeric fatty acids, are commonly structural isomer mixtures containing a predominant proportion (about 45-95% by weight or greater) of aliphatic and alicyclic dimer diacids (such as $C_{36}$ or $C_{44}$ diacids), a small quantity (about 1-35% by weight) of trimer acids and higher polymeric fatty acids (such as $C_{54+}$ polyacids), and some (up to about 20% by weight) residual monomers (such as $C_{18}$ or $C_{22}$ branched chain monoacids). The ratio between the reactants in the disclosed process is known in the art as a topological ratio. Commercial products of these polymeric fatty acids can contain about 75-95% by weight of dimeric acids, about 4-22% by weight of trimeric acids, about 1-3% by weight of monomeric acid. The molar ratio of dimeric to trimeric acid can be about 5:1 to about 36:1. The relative ratios of monomer, dimer, trimer and higher polymer in un-fractionated dimer acid can be dependent on the nature of the starting materials and the conditions of polymerization and subsequent distillation.

Dimerized fatty acids may be "crude", i.e., obtained directly from dimerization without distillation, or refined to increase dimer concentration. Refined dimerized acids such as partially or fully hydrogenated dimer fatty acids can have a dimer content of about 95% by weight or greater, such as at least about 97%, a monomer content of about 1%, a trimer content of about 3%, an acid value of about 193-201, a saponification value of about 198, and an iodine value of about 95. Hydrogenated dimer fatty acids can reduce aesthetically unpleasing color. The degree of hydrogenation can correspond to an iodine value of about 110 or less, such as about 95 or less, according to ASTM D1959-97 or D5768-02. The fatty polyacids, such as the dimer diacids and diesters thereof can be substantially free of interesters, the presence of which may hinder subsequent polymerization reactions. Methods for reducing interester content in fatty polyacids include hydrolysis/extraction as disclosed in U.S. Pat. No. 6,187,903, which is incorporated herein by reference. The fatty polyacids or esters thereof can have an interester content of about 0.2% by weight or less, such as about 0.05% or less.

Dimer diacids may be unsaturated, partly hydrogenated, or completely hydrogenated (i.e., fully saturated). Non-limiting dimer diacids can have one of the following structures:

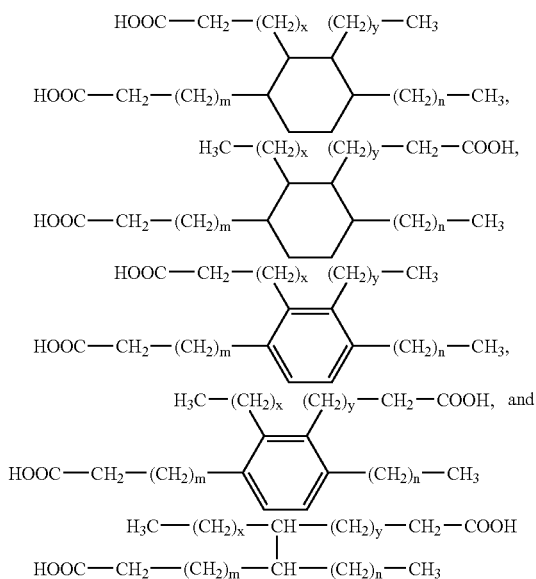

where R is the same or different moieties chosen from hydrogen, alkyl, aryl, aralkyl, alicyclic, cycloalkyl, and alkoxy groups; x+y and m+n are both at least about 8, such as at least about 10, such as 12, 14, 15, 16, 18, 19, or greater.

Fatty polyacids can have at least one divalent hydrocarbon radical having at least 30 carbon atoms, such as 36-180 carbon atoms, which can be linear, branched, cyclic, and/or substituted, such as monocycloaliphatic moiety having a 6-membered carbon ring (e.g., cyclohexene ring), bicycloaliphatic moiety having a 10-membered carbon ring, and substituted aliphatic moiety (e.g., halogenated aliphatic moiety such as fluoroaliphatic polyacids). Fatty polyacids such as dimer diacids can have an acid value of 150-250, such as 170-200 or 190-200, a saponification value of 170-210, and a viscosity at 25° C. of 50,000 cSt or less, such as 30,000 cSt or less, 10,000 cSt or less, 500 cSt or greater, like 600 cSt, 7,500 cSt, 8,500 cSt, 9,000 cSt, and any viscosity therebetween. Examples are available from HumKo Chemical of Memphis, Tenn. Fatty polyacids can be branched, such as with linear or branched alkyl groups. Fluid fatty polyacids can be used as reactive diluents in solvent-borne polyurethane/polyurea compositions to achieve higher solid content.

Polymeric fatty acids and other polyacids as described above, as well as methods to produce such polyacids can be found in U.S. Pat. Nos. 6,670,429, 6,310,174, 6,187,903, 5,545,692, 5,326,815, 4,937,320, 4,582,895, 4,536,339, and 4,508,652, among others. To form reactive polymers of the present disclosure, polymeric fatty acids or esters thereof can also be epoxidized, for example by reaction with peracetic acid, performic acid or with hydrogen peroxide and formic acid or acetic acid. Suitable epoxidized fatty acids and esters are described in British Patent Nos. 810,348 and 811,797. Dimer acids can be converted to dimer diols, dimer diamines, and/or dimer diisocyanates, all of which are suitable for the compositions of the present disclosure.

Amino Acids

Any and all amino acids known and/or available to one skilled in the art, which have at least one reactive amine group (such as primary amine group) and at least on acid group (such as carboxylic acid group), can be used in the present disclosure. Also useful are cyclic amides of the corresponding amino acids, and amino esters (such as methyl and ethyl esters) of the corresponding amino acids. Amino acids can be linear or branched, saturated or unsaturated, aliphatic, alicyclic, aromatic, or heterocyclic. Non-limiting examples of the aminocarboxylic acids can have about 2-18 carbon atoms, and include glycine, alanine, valine, leucine, isoleucine, phenylalanine, sarcosine, asparagine, glutamine, glucoseamine, melamine, tryptamine, kynurenine, tyrosine, guanidine, polyguanides, ethylglutamic acid, carboxyglutamic acid, aspartic acid, methylaspartic acid, 4-aminobutyric acid, anthranilic acid, 3-aminobenzoic acid, 4-aminobenzoic acid, 4-amino-2-salicylic acid, 4-aminomethylbenzoic acid, 2-aminoadipic acid, alloxanic acid, ω-aminoenanthic acid, ω-aminocaprylic acid, ω-aminopelargonic acid, ω-aminocapric acid, 11-aminoundecanoic acid, ω-aminolauric acid, 13-aminotridecanoic acid, ω-aminomyristic acid, 15-aminopentadecanoic acid, lactams thereof, amino esters thereof, and mixtures thereof.

Hydroxy Acids

Any and all hydroxy acids known and/or available to one skilled in the art, which have at least one reactive hydroxyl group and at least on acid group (such as carboxylic acid group), are suitable for use in the present disclosure. Also useful are cyclic esters of the corresponding amino acids, and hydroxy esters (such as methyl and ethyl esters) of the corresponding hydroxy acids Hydroxy acids can be linear or branched, saturated or unsaturated, aliphatic, alicyclic, aromatic, or heterocyclic. Non-limiting examples of the hydroxycarboxylic acids can have about 2-18 carbon atoms, and include benzilic acid, caffeic acid, ferulic acid, gallic acid, gentisic acid, isovanillic acid, mandelic acid, resorcylic acid, salicylic acid, tropic acid, vanillic acid, pamoic acid, malic acid, tartaric acid, citric acid, ascorbic acid, D,L-lactic acid, D-lactic acid, L-lactic acid, glycolic acid, hydroxy-functional amino acids as described above, and mixtures thereof. Also included are hydroxy acids of the corresponding cyclic compounds as disclosed herein, such as cyclic esters and cyclic anhydrides.

Cyclic Esters and Cyclic Amides

Any and all cyclic esters and cyclic amides known and/or available to one skilled in the art are suitable for use in the present disclosure. Also useful are amino acids and esters thereoof of the corresponding cyclic amides, and hydroxy acids and esters thereof of the corresponding cyclic esters. Cyclic esters and cyclic amides can be saturated or unsaturated, substituted or unsubstituted, and include lactones and lactams. Non-limiting examples of lactones can have about 4-20 carbon atoms, and include β-propiolactone, methyl propiolactone, bis(chloromethyl)propiolactone, β-butyrolactone, γ-butyrolactone, 3-hydroxy-γ-butyrolactone, 4-hydroxy-3-pentenoic acid lactone, hydroxymethyl-butyrolactone, α-angelicalactone, β-angelicalactone, 4-methyl-butyrolactone, γ-methyl-γ-butyrolactone, γ-hexalactone, γ-heptalactone, γ-octalactone, γ-nonalactone, γ-decalactone, γ-undecalactone, 3-methyl-γ-decalactone, γ-dodecalactone, β-valerolactone, γ-valerolactone, γ-hydroxy-valerolactone, mevalonic acid lactone, δ-valerolactone, methyl-δ-valerolactone, trimethoxyvalerolactone, δ-heptalactone, δ-octalactone, δ-nonalactone, δ-decalactone, δ-undecalactone, δ-dodecalactone, δ-tridecalactone, δ-tetradecalactone, ε-caprolactone, ε-caprolactone diol, ε-caprolactone triol, γ-methyl-ε-caprolactone, ε-methyl-ε-caprolactone, β,δ-dimethyl-εcaprolactone, β-methyl-ε-isopropyl-caprolactone, ε-decalactone, ε-undecalactone, ε-dodecalactone, γ-caprylolactone, γ-ethyl-γ-caprylolactone, ζ-enantholactone, ω-octalactone, ω-nonalactone, ω-decalactone, ω-undecanolactone, ω-laurolactone, ω-tridecalactone, ω-tetradecalactone, (ω-pentadecalactone, ω-hexadecalactone, ω-heptadecalactone, ω-octadecalactone, neptalactone, ambrettolide, 3-butylidenephthalide, 7-decen-1,4-lactone, 9-decen-5-olide, δ-2-decenolactone, δ-7-decenolactone, dihydroactinidiolide, dihydroambrettolide, 3,3-dimethyl-2-hydroxy-4-butanolide, 3,4-dimethyl-5-pentyl-2(5H)-furanone, γ-6-dodecenolactone, dihydrocoumarin, 5-ethyl-3-hydroxy-4-methyl-2(5H)-furanone, 5-(cis-3-hexenyl)dihydro-5-methyl-2(3H)-furanone, 3-hydroxy-4,5-dimethyl-2(5H)-furanone, 5-hydroxy-8-undecenoic acid δ-lactone, jasmolactone, massoia lactone, menthone lactone, β-methyl-γ-octalactone, mintlactone, γ-2-nonenolactone, δ-octadecalactone, 4,4-dibutyl-γ-butyrolactone, 6-hydroxy-3,7-dimethyloctanoic acid lactone, ω-6-hexadecenlactone, 5-hydroxy-2,4-decadienoic acid δ-lactone, octahydrocoumarin, 6-pentyl-α-pyrone, 3-propylidenephthalide, sclareolide, 4-vinyl-γ-valerolactone, 2,3-dimethyl-2,4-nonadien-4-olide, 2-buten-4-olide, 3,4-dimethyl-5-pentylidene-5H-furan-2-one, 3-decen-4-olide, 3-methyl-trans-5-decen-4-olide, 3-nonen-4-olide, α-oxo-β-ethyl-γ-butyrolactone, β-methyl-γ-nonalactone, cis-7-decen-4-olide, 2-hydroxy-3,3-dimethyl-γ-butyrolactone, hexahydro-3,6-dimethyl-2(3H)-benzofuranone, γ-thiobutyrolactone, and mixtures thereof.

Non-limiting examples of lactams can have about 4-20 carbon atoms, and include propiolactam, N-methyl-β-propiolactam, N-phenyl-β-propiolactam, butyrolactam, N-methyl-2-pyrrolidone, N-vinyl-2-pyrrolidone, N-phenyl-2-pyrrolidone, N-t-butyl-2-pyrrolidone, N-methyl-5-methyl-2-pyrrolidone, valerolactam, N-methyl-2-piperidone, N-carbethoxy-2-piperidone, 4-chloro-N-methyl-2-piperidine, 4-hydroxy-N-methyl-2-piperidine, N-vinyl-2-piperidone, N-phenyl-2-piperidone, N-acetyl-2-piperidone, N-t-butyl-2-piperidone, dimethyl-2-piperidone, caprolactam, N-methyl-ε-caprolactam, N-phenyl-ε-caprolactam, enantholactam, caprylolactam, undecanolactam, laurolactam, N-methyl-ω-laurolactam, N-vinyl-ω-laurolactam, halogenated derivatives thereof, and mixtures thereof.

Other cyclic compounds that can be blended with the cyclic esters and/or cyclic amides for copolymerization or other reactions include, without limitation, 1,4-dioxane-2-one, glycolide, lactides (i.e., D,L-lactide, D-lactide, and L-lactide), 1,4-dithiane-2,5-dione, cyclic oxalates such as ethylene oxalate, propylene oxalate, butylene oxalate, hexamethylene oxalate, and decamethylene oxalate, cyclic carbonates such as ethylene carbonate, vinylene carbonate, 1,2-propylene carbonate, 1,3-propylene carbonate, 2,2-dimethyl-trimethylene carbonate, 2,3-butylene carbonate, 1,2-butylene carbonate, 1,4-butylene carbonate, 1-isopropyl-2,2-dimethyl-1,3-propylene carbonate, neopentylene carbonate, 3-methyl-pentamethylene carbonate, hexamethylene carbonate, octamethylene carbonate, cyclic anhydrides such as adipic anhydride. Diacrylic acid and/or dimethacrylic acid may be added.

Isocyanate Reactants

Any one or blend of two or more isocyanate-functional compounds available to one of ordinary skill in the art may be suitable for use in compositions of the present disclosure. Isocyanate-functional compounds can be organic isocyanates in general, and may have an isocyanate functionality of about 1 (i.e., monoisocyanates), such as about 2 or greater (i.e., polyisocyanates). Polyisocyanates for use according to the disclosure can include monomers, dimers (such as uretdiones of identical polyisocyanates and isocyanate derivatives of dimer acids or dimer amines), trimers (such as isocyanurates of identical or different polyisocyanates, isocyanate derivatives of trimer acids or trimer amines), tetramers, oligomers (of same or different monomers, or isocyanate derivatives of oligomer polyacids or oligomer polyamines), adducts (such as uretdiones of different polyisocyanates and isocyanate derivatives of adduct polyacids or adduct polyamines), polymers (such as isocyanate derivatives of polymer polyacids or polymer polyamines), polyisocyanate-terminated prepolymers, low-free-isocyanate prepolymers, quasi-prepolymers, isomers thereof, modified derivatives thereof, and combinations thereof. Structure of the isocyanate reactant can partially or fully be substituted, unsubstituted, saturated, unsaturated, hydrogenated, aliphatic, alicyclic, cyclic, polycyclic, aromatic, araliphatic, heteroaliphatic, and/or heterocyclic.

Suitable polyisocyanates may have the generic structure of $R(NCO)_n$, where n is about 2-4; R comprises one or more linear or branched, substituted or unsubstituted, saturated or unsaturated moieties having about 2-60 carbon atoms, such as aliphatic moieties of about 4-30 or about 6-20 carbon atoms, cyclic or alicyclic moieties of about 6-40 or about 6-30 carbon atoms, aromatic or araliphatic moieties of about 6-30 or about 6-18 carbon atoms, and mixtures thereof. When multiple cyclic or aromatic moieties are present, linear and/or branched aliphatic hydrocarbon moieties having about 1-20 or about 1-10 carbon atoms can be present as spacers separating adjacent ring structures. The cyclic or aromatic moieties may be substituted at 2-, 3-, 4- and/or other available positions. Any available hydrogen atoms in the polyisocyanate can also be substituted. Substituent moieties include, but are not limited to, linear or branched aliphatic hydrocarbons; halogens; organic moieties having one or more heteroatoms such as N, O, S, P, and/or Si (e.g., cyano, amine, silyl, hydroxyl, acid, ether, ester, etc.); or a mixture (such as isomeric or racemic mixtures) thereof. Also included are, for example, oligoisocyanates and polyisocyanates which can be prepared from the diisocyanates or triisocyanates listed or mixtures thereof by coupling by means of urethane, allophanate, urea, biuret, uretdione, amide, isocyanurate, carbodiimide, uretonimine, oxadiazinetrione, and/or iminooxadiazinedione structures.

Exemplary polyisocyanates include, without limitation, aromatic diisocyanates such as p-phenylene diisocyanate ("PPDI," i.e., 1,4-phenylene diisocyanate), m-phenylene diisocyanate ("MPDI," i.e., 1,3-phenylene diisocyanate), o-phenylene diisocyanate (i.e., 1,2-phenylene diisocyanate), 4-chloro-1,3-phenylene diisocyanate, toluene diisocyanate ("TDI"), 2,2'-, 2,4'-, and 4,4'-biphenylene diisocyanates, 3,3'-dimethyl-4,4'-biphenylene diisocyanate ("TODI"), 3,3'-dimethoxy-4,4'-biphenylene diisocyanate (i.e., 3,3'- dimethoxy-4,4'-diisocyanato-diphenyl), 2,2'-, 2,4'-, and 4,4'-diphenylmethane diisocyanates ("MDI"), 2,2'-, 2,4'-, and 4,4'-diphenyldimethylmethane diisocyanates, 2,2'-, 2,4'-, and 4,4'-diphenylethane diisocyanates, 2,2'-, 2,4'-, and 4,4'-stilbene diisocyanates, 3,3'-dimethyl-4,4'-diphenylmethane diisocyanate, 1,4- and 1,5-naphthalene diisocyanates ("NDI"), anthracene diisocyanate, tetracene diisocyanate, mixtures of MDI and PMDI, and mixtures of TDI and PMDI; araliphatic diisocyanates such as 1,2-, 1,3-, and 1,4-xylene diisocyanates ("OXDI," "MXDI," "PXDI"), m-tetramethylxylene diisocyanate ("m-TMXDI"), and p-tetramethylxylene diisocyanate ("p-TMXDI"); aliphatic diisocyanates such as ethylene diisocyanate, 1,2- and 1,3-propylene diisocyanates, 1,2-, 1,3-, and 1,4-tetramethylene diisocyanates, 1,5-pentamethylene diisocyanate, 2-methyl-1,5-pentamethylene diisocyanate, 1,6-hexamethylene diisocyanate ("HDI") and isomers thereof, 2,4-dimethyl-hexamethylene diisocyanate ("DMHDI") and isomers thereof, 2,2,4-trimethyl-hexamethylene diisocyanate ("TMDI") and isomers thereof, 1,7-heptamethylene diisocyanate and isomers thereof, 1,8-octamethylene diisocyanate and isomers thereof, 1,9-novamethylene diisocyanate and isomers thereof, 1,10-decamethylene diisocyanate and isomers thereof, 1,12-dodecane diisocyanate and isomer thereof, bis(isocyanatomethyl)cyclohexane (i.e., 1,4-cyclohexane-bis(methylene isocyanate)), 2,4'- and 4,4'-bis(isocyanatomethyl) dicyclohexanes, isocyanatomethylcyclohexane isocyanate, isocyanatoethylcyclohexane isocyanate, and lysine alkyl ($C_{1-10}$) ester diisocyanate; alicyclic diisocyanates such as 1,3-cyclobutane diisocyanate, 1,2-, 1,3-, and 1,4-cyclohexane diisocyanates, 2,4- and 2,6-methylcyclohexane diisocyanates ("HTDI," i.e., 2,4- and 2,6-hexahydrotoluene diisocyanates), 2,2'-, 2,4'-, and 4,4'-dicyclohexylmethane diisocyanates ("$H_{12}$MDI," i.e., bis(isocyanatocyclohexyl)-methane), 2,4'- and 4,4'-dicyclohexane diisocyanates, 1,3-, 1,4- and 1,5-tetrahydronaphthalene diisocyanates, and isophorone diisocyanate ("IPDI," i.e., 1-isocyanato-3,3,5-trimethyl-5-isocyanatomethylcyclohexane); monomeric unsaturated triisocyanates such as 2,4,4'-diphenylene triisocyanate, 2,4,4'-diphenylmethane trisocyanate, and 4,4',4"-triphenylmethane triisocyanate; monomeric saturated triisocyanates such as 1,3,5-cyclohexane triisocyanate, triisocyanate of HDI, and triisocyanate of TMDI; dimerized uretdiones of unsaturated polyisocyanates such as uretdione of toluene diisocyanates, and uretdione of diphenylmethane diisocyanates; dimerized uretdiones of saturated polyisocyanates such as uretdione of hexamethylene diisocyanates; trimerized isocyanurates of unsaturated polyisocyanates such as trimer of diphenylmethane diisocyanate, trimer of tetramethylxylene diisocyanate, and isocyanurate of toluene diisocyanates; and trimerized isocyanurates of saturated polyisocyanates such as isocyanurate of isophorone diisocyanate, isocyanurate of hexamethylene diisocyanate, and isocyanurate of trimethyl-hexamethylene diisocyanates.

The following polyisocyanates are also useful for the present disclosure: perchlorinated, monochlorinated and unchlorinated aromatic diisocyanates and triisocyanates (such as are disclosed in U.S. Pat. No. 3,277,138); isocyanates derivable by dehydration and rearrangement of 1-amino-cyclohexanecarbohydroxamic acid hydrohalides (such as are disclosed in U.S. Pat. No. 3,703,542); diisocyanato-urethanes (such as are described in U.S. Pat. No. 3,813,380); polymethylene diisocyanates (such as are described in U.S. Pat. Nos. 2,394,597, 3,465,024 and 3,840,572); isocyanates derivable by heating the cyclic nitrile sulfites of U.S. Pat. No. 3,268,542 (e.g., 3-hydroxy- or 3-nitro-1,4-diisocyanato benzene, 4-bromo-1,3,5-triisocyanato benzene and 2,2'-stilbene diisocyanate); ethylenically-unsaturated diisocyanates derivable by heating the cyclic nitrile sulfites of U.S. Pat. No. 3,560,492 (e.g., transvinylenediisocyanate); isocyanate-functional polymers derivable by heating the homo- and copolymers of ethylenically unsaturated cyclic nitrile carbonates and oxalates (such as are disclosed in U.S. Pat. Nos. 3,480,595, 3,652,507 and 3,813,365, e.g., the thermoplastic polyisocyanate formed upon heating a copolymer of styrene and p-vinylbenzonitrile carbonate and/or acrylonitrile carbonate); heteroaliphatic and heterocyclic isocyanates derivable from amine compounds in which acyclic and cyclic hydrocarbyl moieties are interrupted by or linked through —O—, —S—, —N(R)—, —N=, or other heteroatoms (non-limiting examples including β-ethoxy-N-amylamine, β-phenoxyethylamine, β-methylthio-ethylamine, di-a-aminopropyl)-ether, 3-amino-diphenylether, di-(β-aminoethyl)-sulfide, ethyl-3-aminophenylsulfide, 2-aminothiophene, 1-furyl-2-aminopropane, 2-thenylamine, 2,4-diamino-5-phenylthiazole, 3,5-diaminopyridine, and 2,4'-diaminodiphenylsulfide); isocyanates derivable from polyaminehydrocarbons (such as are prepared by ammonolysis of chlorinated polyolefins under pressure in polar solvents such as ethanol or dimethylformamide); and isocyanates derivable from acetate esters of mono- and poly-hydroxamic acids or from dihydroxamic acids and their metal salts (the processes of which are disclosed in U.S. Pat. Nos. 3,465,024 and 2,394,597, respectively). The process of preparing isocyanates by heating cyclic nitrile carbonates is disclosed in detail in U.S. Pat. No. 3,507,900. A process for making difunctional cyclic nitrile carbonates by the reaction of dihydroxamic acids and phosgene is disclosed in U.S. Pat. No. 3,825,554. Isocyanates can be converted from the polyamines and polyamine telechelics disclosed herein by known methods such as those found in Synthetic Organic Chemistry (1953), Wagner and Zook, Wiley, N.Y., N.Y., pp. 460-1.

Other suitable polyisocyanates include, for example, polymeric polyisocyanates and modified polyisocyanates (i.e., polyisocyanates containing carbodiimide groups, urethane groups, allophanate groups, isocyanurate groups, urea groups, biuret groups, or other groups known to one skilled in the art), such as, without limitation, polyphenylene polymethylene polyisocyanate ("PMDI," i.e., polymeric MDI, or polyphenyl-polymethylene polyisocyanates, as are obtained by aniline-formaldehyde condensation and subsequent phosgenation and described, for example, in GB-874430 and GB-848671), m- and p-isocyanatophenylsulfonyl isocyanates according to U.S. Pat. No. 3,454,606, perchlorinated aryl polyisocyanates (as are described in U.S. Pat. No. 3,277,138), polyisocyanates containing carbodiimide groups (as are described in U.S. Pat. Nos. 3,152,162, 4,077,989, 4,088,665, 4,294,719, and 4,344,855, such as carbodiimide-modified liquid MDI), norbornane diisocyanates according to U.S. Pat. No. 3,492,301, polyisocyanates containing allophanate groups (as are described in GB-994890, and in U.S. Pat. Nos. 3,832,311 and 3,769,318), polyisocyanates containing isocyanurate groups (as are described in GB-843841, GB-1091949, GB-1267011, and U.S. Pat. No. 3,738,947), polyisocyanates containing urethane groups (as are described, for example, in GB-1303201 and in U.S. Pat. Nos. 3,394,164 and 3,644,457), polyisocyanates containing acylated urea groups according to U.S. Pat. No. 3,517,039, polyisocyanates containing biuret groups (as are described in U.S. Pat. Nos. 3,124,605 and 3,201,372, and in GB-889050), polyisocyanates prepared by telomerisation reactions (as are described in U.S. Pat. No. 3,654,106), polyisocyanates containing ester groups (as are mentioned in GB-965474, GB-1072956, GB-1086404, and in U.S. Pat. No. 3,567,763), reaction products of the above-mentioned isocyanates with acetals according to U.S. Pat. No. 3,120,502, and polyisocyanates containing polymeric fatty acid esters according to U.S. Pat. No. 3,455,883. These disclosures are incorporated by reference herein. It is possible to use the distillation residues containing isocyanate groups that are formed in the commercial preparation of isocyanates, optionally dissolved in one or more of the above-mentioned polyisocyanates. It is also possible to use any desired mixtures of the above-mentioned polyisocyanates and isomers thereof.

One or more or all of the reactable isocyanate groups within the polyisocyanate compound can be sterically hindered, so that the polyisocyanate compound provide the combination of reduced reactivity toward active hydrogen groups such as primary and secondary amines, and improved chemical stability toward actinic radiations such as UV light. Sterically hindered NCO group can have the following structure:

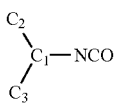
(82)

where $C_1$, $C_2$, and $C_3$ are independent tertiary (i.e., methine) or quaternary carbon atoms. One, two, or all three of $C_1$, $C_2$, and $C_3$ can be free of C—H bonds. $C_1$, $C_2$, and $C_3$ may in part form a substituted ring structure having about 4-30 carbon atoms. The ring structure may be saturated, unsaturated, aromatic, monocyclic, polycyclic (e.g., bicyclic, tricyclic, etc.), or heterocyclic having one or more O, N, or S atoms. The ring structure may have one, two, three, or more moieties of the structure (8), while the polyisocyanate compound may have one, two, or more of such ring structures. For example, the polyisocyanate may have a structure of:

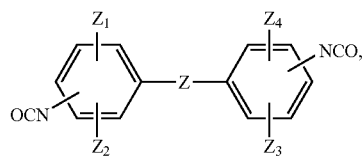
(83)

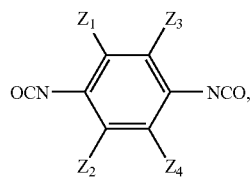
(84)

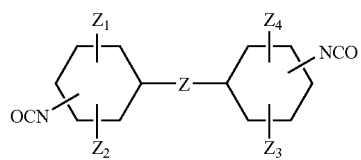
(85)

-continued

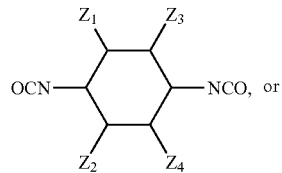
(86)

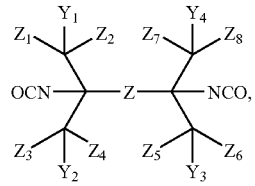
(87)

where $Z_1$ to $Z_8$ are independently chosen from halogenated or unhalogenated hydrocarbon moieties having about 1-20 carbon atoms, halogenated or unhalogenated organic moieties having at least one O, N, S, or Si atom and zero to about 12 carbon atoms, and halogens; $Y_1$ to $Y_4$ are independently chosen from hydrogen, halogenated or unhalogenated hydrocarbon moieties having about 1-20 carbon atoms, halogenated or unhalogenated organic moieties having at least one O, N, S, or Si atom and zero to about 12 carbon atoms, and halogens; Z is halogenated or unhalogenated hydrocarbon moieties having about 1-60 carbon atoms, or halogenated or unhalogenated organic moieties having at least one O, N, S, or Si atom and zero to about 60 carbon atoms. Z can have one of the structures (41)-(48) above. Other examples of sterically hindered polyisocyanates include, without limitation, 1,4-durene diisocyanate ("DDI," i.e., 2,3,5,6-tetramethyl-1,4-diisocyanatobezene) and 2,3,5,6-tetramethyl-1,4-diisocyanatocyclohexane. Elastomer compositions comprising DDI as described in U.S. Publication No. 2003/0135008 are incorporated herein by reference.

The polyisocyanate can have NCO groups of different reactivity, i.e., being regioselective. Reactants having high regioselectivity in general can enable efficient use in consecutive reactions such as polymerization steps and crosslinking. They can provide cost advantages by reducing waste of functional groups (i.e., reduction in unreacted reactants), provide handling advantages by reducing volatile "leftover" molecules, and provide performance advantages by enabling controlled architecture in the reaction products (e.g., reduced polydispersity). Regioselective polyisocyanates can be asymmetric in structure, having at least two sterically different NCO groups, one being more sterically interfered than the other. The more sterically interfered NCO group can be directly attached to a tertiary carbon atom, or be one methine carbon atom away from either a quaternary carbon atom or two tertiary carbon atoms. The less sterically interfered NCO group can be at least two carbon atoms away from either a quaternary carbon atom or two tertiary carbon atoms, and can be attached directly to a methylene carbon or a methine carbon. Regioselective polyisocyanates can have a structure of:

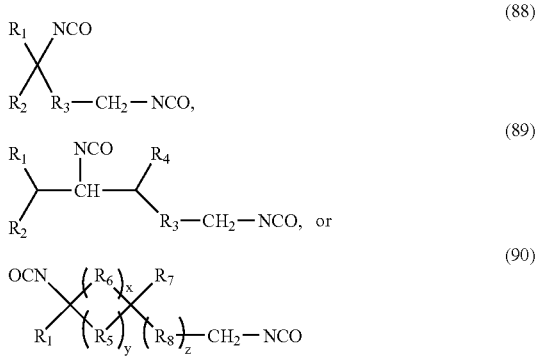

where $R_1$, $R_2$, and $R_4$ are independent organic moieties having about 1-20 carbon atoms, such as linear or branched aliphatic hydrocarbon moieties having about 1-12 carbon atoms, like $C_1$ to $C_8$ alkyl groups; $R_3$ is organic moieties having about 2-20 carbon atoms, such as linear or branched aliphatic hydrocarbon moieties having about 2-12 carbon atoms, like $C_2$ to $C_9$ alkylene moiety; $R_5$ and $R_6$ are the same or different organic moieties having about 1-20 carbon atoms, such as linear or branched aliphatic hydrocarbon moieties having about 1-8 carbon atoms, like $C_1$ to $C_4$ alkylene moieties; $R_7$ is organic moieties having zero to about 20 carbon atoms, such as hydrogen or linear or branched aliphatic hydrocarbon moieties having about 1-12 carbon atoms, like $C_1$ to $C_8$ alkyl groups; $R_8$ is organic moieties having about 1-20 carbon atoms, such as linear or branched aliphatic hydrocarbon moieties having about 1-12 carbon atoms, like $C_1$ to $C_8$ alkylene moiety; and x, y, and z are independently 0 or 1. The regioselective polyisocyanates can be saturated aliphatic or alicyclic. Non-limiting examples include 1,4-diisocyanato-4-methylpentane, 1,5-diisocyanato-5-methylhexane, 1,6-diisocyanato-6-methylheptane, 1,5-diisocyanato-2,2,5-trimethylhexane, 1,7-diisocyanato-3,7-dimethyloctane, 3(4)-isocyanatomethyl-1-methylcyclohexyl isocyanate (which is generally present as a mixture of the 3- and 4-isocyanatomethyl isomers), 3(4)-isocyanatomethyl-1-1,3(4)-dimethylcyclohexane isocyanate (which is generally present as a mixture of the 3-methyl-3-isocyanatomethyl and 4-methyl-4-isocyanatomethyl isomers), 3-isocyanatomethyl-1,2-dimethyl-3-ethyl-cyclopentane isocyanate, 3-(2-isocyanatoethyl)-1,2,2-trimethylcyclopentane isocyanate, 4-(4-isocyanatobut-2-yl)-1-methylcyclohexyl isocyanate, and 3-(4-isocyanatobut-1-yl)-1-n-butyl-cyclohexane isocyanate.

In certain polyisocyanates, the NCO groups initially have about the same reactivity, but the reaction of a first NCO group with an active hydrogen functionality can induce a decrease in the reactivity of a second NCO group. Non-limiting examples of such polyisocyanates include polyisocyanates whose NCO groups are coupled via a delocalized electron system, such as tolidine diisocyanate, tolylene 2,4-diisocyanate (2,4-TDI), tolylene 2,6-diisocyanate (2,6-TDI), diphenylmethane-2,4'-diisocyanate (2,4'-MDI), phenylene-1,3- and 1,4-diisocyanate, naphthylene-1,5-diisocyanate, triisocyanatotoluene, and biphenyl diisocyanate.

Other polyisocyanates include 1,7-diisocyanato-4-isocyanatomethylheptane, 1,8-diisocyanato-4-isocyanatomethyloctane, 2-butyl-2-ethylpentamethylene diisocyanate, 2-isocyanatopropylcyclohexyl isocyanate, isophorone diisocyanate (IPDI), 4-methylcyclohexane-1,3-diisocyanate (HTDI), dicyclohexylmethane-2,4'-diisocyanate, and those disclosed in U.S. Pat. No. 4,808,691, column 12, line 17 to column 13, line 39, which are incorporate herein by reference.

Polyisocyanates can be derived from the fatty polyacids of the present disclosure. The fatty polyisocyanates can have the same hydrocarbon structures as the fatty polyacids, except that each COOH group is replaced by an NCO group. For example, dimer diacids can be used to form saturated and/or unsaturated dimer diisocyanates. Dimer diisocyanates may be linear, branched (such as with linear or branched alkyl groups), cyclic, and/or substituted, and can be unsaturated, partly hydrogenated, or completely hydrogenated (i.e., fully saturated). Non-limiting dimer diisocyanates can have one of the following structures:

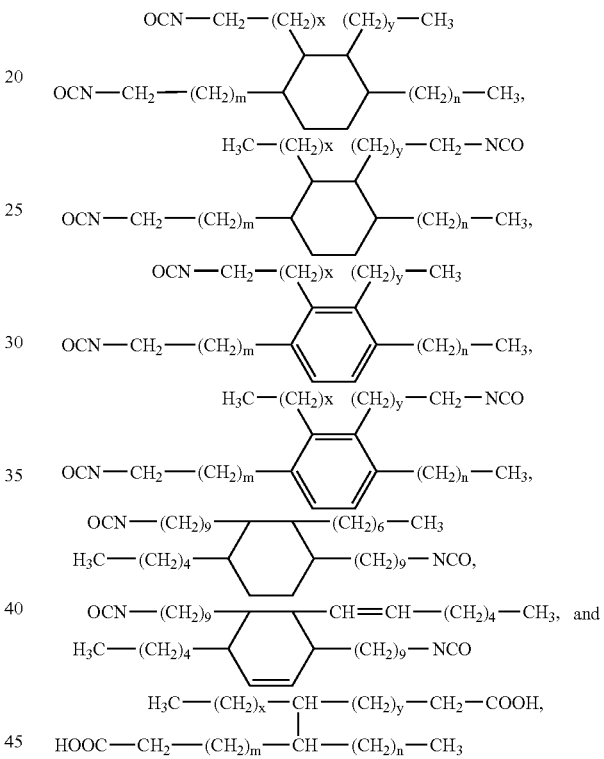

where R is the same or different moieties chosen from hydrogen, alkyl, aryl, aralkyl, alicyclic, cycloalkyl, and alkoxy groups; x+y and m+n are both at least about 8, such as at least about 10, such as 12, 14, 15, 16, 18, 19, or greater.

Fatty polyisocyanates can have at least one divalent hydrocarbon radical having at least 30 carbon atoms, such as 36-180 carbon atoms, which can be linear, branched, cyclic, and/or substituted, such as monocycloaliphatic moiety having a 6-membered carbon ring (e.g., cyclohexene ring), bicycloaliphatic moiety having a 10-membered carbon ring, and substituted aliphatic moiety (e.g., halogenated aliphatic moiety such as fluoroaliphatic polyisocyanates). Fatty polyisocyanates such as dimer diisocyanates are water insensitive, have controllable reactivity and low toxicity when compared to other aliphatic polyisocyanates. The fatty polyisocyanates can have a % NCO content of 20% or less, 15% or less, 10% or less, 5% or greater, or any amounts therebetween, such as 6-9%, 12-16%, 13-15%, or 13.6-14.3%. The fatty polyisocyanates can have a molecular weight of 250 or greater, such as 500 or greater or 600 or greater, and up to about 15,000, such as about 500-10,000. Fatty polyisocyanates can be liquid at room temperature, having low to moderate viscosity at 25° C. (e.g., about 100-10,000 cP or about 500-5,000 cP). Other dimer diisocyanates are described in, for example, Kirk-Othmer Encyclopedia of Chemical Technology 1979, volume 7, $3^{rd}$ edition, p. 768-782, John Wiley and Sons, Inc., the disclosure of which is entirely incorporated herein by reference.

Curatives

Any and all of the compounds having two or more isocyanate-reactive functionalities as disclosed herein may be used as curatives to cure prepolymers into thermoplastic or thermoset compositions. These curatives can be polyamines, polyols, aminoalcohols, polyamine telechelics, and polyol telechelics, and aminoalcohol telechelics. To further improve the shear resistance of the resulting elastomers, trifunctional curatives, tetrafunctional curatives, and higher functionality curatives can be used to increase crosslink density. Other curatives include those disclosed in U.S. Pat. No. 4,808,691, from column 9, line 24 to column 12, line 16, in U.S. Pat. No. 5,484,870, from column 2, line 47 to column 3, line 41, which are incorporated herein by reference.

The curative can be a modified curative blend as disclosed in co-pending U.S. Patent Publication No. 2003/0212240, bearing Ser. No. 10/339,603, which is incorporated by reference herein in its entirety. For example, the curative may be modified with a freezing point depressing agent to create a curative blend having a slow onset of solidification and storage-stable pigment dispersion. A number of curatives have relatively high freezing points, e.g., hexamethylene diamine (105.8° F.), diethanolamine (82.4° F.), triethanolamine (69.8° F.), diisopropanolamine (73.4° F.), and triisopropanolamine (111.2° F.). Such curatives may be blended with one or more amine-based freezing point depressing agents such as, without limitation, ethylene diamine, 1,3-diaminopropane, dimethylaminopropylamine, tetraethylene pentamine, 1,2-propylenediamine, diethylaminopropylamine, 2,2,4-trimethyl-1,6-hexanediamine, and 2,4,4-trimethyl-1,6-hexanediamine.

The freezing point depressing agent can be added in an amount sufficient to reduce the freezing point of the curative blend by a suitable amount to prevent loss of pigment dispersion, but not adversely affect the physical properties of the resulting golf ball, such as about 5% by weight or greater of the total blend, about 8%, about 10%, about 12%, about 14%, or any amount therebetween or even greater. After freezing and subsequent thawing, the modified curative blend can have a pigment dispersion of greater than 0 on the Hegman scale, such as about 1, about 2, about 3, about 4, about 5, about 6, about 7, or some level therebetween or even greater.

Curatives comprising one or more ethylenic and/or acetylenic unsaturation moieties can be used to incorporate these moieties into the resulting material for subsequent crosslinking, as described herein below. Such unsaturated moieties include allyl groups and α,β-ethylenically unsaturated $C_3$ to $C_8$ carboxylate groups. Non-limiting examples of curatives comprising allyl groups include trimethylolpropane monoallyl ether, N-methylolacrylamide, glyceryl-α-allyl ether, 1,1-dihydroxymethylcyclohex-3-ene, 1,2-dihydroxymethylcyclohex-4-ene, and the like. Curatives comprising (meth)acryloyl groups include esters of (meth)acrylic acids with diols or polyols. Non-limiting examples include 2-hydroxyethyl, 2- or 3-hydroxypropyl or 2-, 3- or 4-hydroxybutyl (meth)acrylates and mixtures thereof. Monools comprising (meth)acryloyl groups or reaction products substantially composed of such alcohols that are obtained by esterification of n-hydric alcohols with (meth)acrylic acid are suitable. Mixtures of various alcohols can be used, such that n stands for an integer or a statistical average of greater than about 2 to about 10, preferably about 2 to about 4, and more preferably about 3. Per mole of the polyols mentioned, (n–0.6) to (n–2.2), (n–0.8) to (n–1.2), or (n–1) moles of (meth)acrylic acids can be used. These compounds or product mixtures include the reaction products of:

(i) triols such as glycerol, trimethylolpropane and/or pentaerythritol; low-molecular-weight alkoxylation products of such alcohols (e.g., ethoxylated or propoxylated trimethylolpropane more specifically the addition product of ethylene oxide to trimethylolpropane having an OH number of 550); or mixtures of at least triols with diols (e.g., ethylene glycol or propylene glycol), and (ii) (meth)acrylic acid in the stated molar ratio. Said compounds have a molecular weight of 116 to 1000, such as 116 to 750 or 116 to 158.

Furthermore, the reaction products of said monols comprising (meth)acryloyl groups with, for example, e-caprolactone can also be used. Such products can be obtained, for example, as Tone® M-100, M-101, and M-201 monomers from Dow Chemical. These compounds have a molecular weight of 230 to 3000, such as 230 to 1206 or 344 to 572.

(Meth)acryloyl alcohols also include urethane (meth) acrylates that contain (meth)acryloyl groups and free hydroxyl groups, such as reaction products of urethane (meth)acrylates with diols, optionally mixed with polyols. Aliphatic, cycloaliphatic and/or aromatic diols can be used as diols, for example ethylene glycol, the isomeric propanediols, butanediols, pentanediols, hexanediols, heptanediols, octanediols, nonanediols and cyclohexanedimethanol, hydrogenated bisphenol-A and derivatives of the above mentioned diols substituted with one or more $C_1$-$C_6$-alkyl groups. Also suitable are diols containing ester groups, ether groups such as (3-hydroxy-2,2-dimethylpropyl)-3-hydroxy-2,2-dimethylpropionate or diethylene glycol, dipropylene glycol, and tripropylene glycol. Non-limiting examples are neopentyl glycol, 2,2-dimethyl-1,3-propanediol, 2-ethyl-1,3-hexanediol, 2,5-dimethyl-1,6-hexanediol, 2,2,4-trimethyl-1,3-pentanediol, and 3-hydroxy-2,2-dimethylpropyl 3-hydroxy-2,2-dimethylpropionate. The diols may also be used in the form of their alkoxylation products (ethylene oxide, propylene oxide, and $C_4$-ether units). The use of polyester diols is also possible. These include the reaction products of dicarboxylic acids and/or their anhydrides, ethylenically unsaturated dicarboxylic acids and/or their anhydrides, and lactones (such as e-caprolactone) with the above mentioned diols. Also suitable is cc,co-dihydroxypolyacrylates (for example, Tegomer® BD 1000 from Goldschmidt).

Polyurea Compositions

The compositions of the disclosure may comprise at least one polyurea formed from the well-known one-shot method or prepolymer method. In the latter, polyamine telechelic is reacted with excess polyisocyanate to form polyurea prepolymer, which is then reacted with curative to form the polyurea. Prepolymer to curative ratio can be as high as 1:0.9 or 1:0.95, such as when primary polyamine curatives are used, or as low as 1:1.1 or 1:1.05, such as 1:1.02, such as when secondary polyamine curatives are used. Curative includes polyamines, polyols, polyacids, aminoalcohols, aminoacids, and hydroxy acids, especially those disclosed herein, as well as epoxy-functional reactants, thio-containing reactants, and any other isocyanate-reactive compounds and materials. The polyurea composition can be castable, thermoplastic, thermoset, or millable.

The content of reactable isocyanate moieties in the polyurea prepolymer, expressed as % NCO by weight, can be manipulated to control such factors as curing rate, hardness of the resulting material, and the like. All else being the same, the hardness of the resulting material can increase as the % NCO of the prepolymer increases, and can be greater in polyamine cured compositions than in polyol cured compositions. The polyurea prepolymer can be low-melting (such as being fluid at about 125° C.) or fluid at ambient temperature. The % NCO by weight in the prepolymer can be less than about 30%, such as about 15%, about 11%, about 9%, about 7%, or even less, or at least about 2%, such as about 3% or about 4% or greater, or any percentage therebetween, such as about 5-11%, about 6-9.5%, about 3-9%, about 2.5-7.5%, or about 4-6.8%.

In forming the polyurea prepolymer, polyamine telechelics as disclosed herein can be used alone or in combination of two or more thereof to react with excess isocyanate. Prepolymers with higher % NCO (e.g., 14%) can be converted to prepolymers with lower % NCO (e.g., 10%) by further reacting with one or more other polyamines, polyols, polyamine telechelics, and/or polyol telechelics (e.g., polyamine polyamides, polyol polysiloxanes). The polyamine telechelic can have one amide linkage, two amide linkages, one or more segments having multiple amide linkages, or a polyamide backbone. When a plurality of amide linkages is present, one or more of them can conjoin consecutive repeating units or alternating repeating units. Polyurea prepolymers may contain a content of free isocyanate monomers by about 10% and up to about 20% of the total weight, which can be stripped down to about 1% or less, such as about 0.5% or less.

When forming a saturated prepolymer, such as for use in highly light-stable compositions, saturated polyisocyanates being aliphatic, alicyclic, and/or heteroaliphatic can be used alone or in combinations of two or more thereof. Araliphatic polyisocyanates, alone or in mixtures of two or more thereof, may also be used to form relatively light-stable materials. Without being bound to any particular theory, it is believed that the direct attachment of the NCO moieties to aliphatic side chains without conjugation with the aromatic rings prevents the araliphatic polyisocyanates from, or diminishes their ability in, forming extended conjugated double bonds, which may give rise to discoloration (e.g., yellowing). The sterically hindered polyisocyanates are useful in forming highly or relatively light-stable materials. Without being bound to any particular theory, it is believed that the steric hinderance around the N atom tends to rotate it out of plane, thereby reducing its absorbance of UV wavelengths and achieving desired light-stability. Moreover, one or more of the NCO groups in the sterically hindered polyisocyanates can be attached to tertiary or quaternary carbon atoms that are substantially free of C—H bonds, thus eliminating or reducing the occurrence of UV-induced oxidation at the carbon atoms, and in turn slowing degradation or discoloration. The saturated polyisocyanates, the araliphatic polyisocyanates, and the sterically hindered polyisocyanates may be used alone or in any combinations of two or more thereof.

Polyurethane Compositions

The compositions of the disclosure may comprise at least one polyurethane, such as the reaction product of at least one polyurethane prepolymer and at least one curative, of which the polyurethane prepolymer is the reaction product of at least one polyol telechelic and at least one polyisocyanate. Prepolymer to curative ratio can be 1:0.9 to 1:1.1, such as 1:0.95, 1:1.05, or 1:1.02. One or more of the polyol telechelic, the polyisocyanate, and the curative can be chosen from those disclosed herein, can be saturated, and the resulting polyurethane can be saturated. Polyurethane prepolymers can have free isocyanate monomers by about 10% and up to about 20% of the total weight, which can be stripped down to about 1% or less, such as about 0.5% or less.

The polyurethane composition can be castable, thermoplastic thermoset, or millable. The % NCO by weight in the prepolymer can be less than about 30%, such as about 15%, about 11%, about 9%, about 7%, or even less, or at least about 2%, such as about 3% or about 4% or greater, or any percentage therebetween, such as about 5-11%, about 6-9.5%, about 3-9%, about 2.5-7.5%, or about 4-6.8%. In forming the polyurethane prepolymer, polyol telechelics as disclosed herein can be used alone or in combination of two or more thereof to react with excess isocyanate. Prepolymers with higher % NCO (e.g., 14%) can be converted to prepolymers with lower % NCO (e.g., 10%) by further reacting with one or more other polyamines, polyols, polyamine telechelics, and/or polyol telechelics (e.g., polyamine polyamides, polyol polysiloxanes). The polyol telechelic can have one or two amide linkages, one or more segments having multiple amide linkages, or a polyamide backbone. When a plurality of amide linkages is present, one or more of them can conjoin consecutive repeating units or alternating repeating units.

Crosslinkable polyurethanes can be formed from polyol telechelics, curatives, and stoichiometrically deficient amounts of polyisocyanate such as diisocyanate. Any one or more the reactants can have one or more aliphatic, non-benzenoid >C═C< moieties for crosslinking. Such polyurethanes can have rubber elasticity and wear resistance and strength, and can be millable. Polyol telechelics of low crystallizability, such as those having linear or branched side chains and those formed by random copolymerization (e.g, polyol polyethers, polyol polyesters, polyol polyetheresters, and others as disclosed herein), can be used to form such polyurethanes. Non-limiting examples include polyethylene propylene adipate polyols, polyethylene butylene adipate polyols, polytetramethylene ether glycols (such as those having $M_w$ of about 2,000), tetrahydrofuran (THF)-alkyl glycidyl ether random copolymers, and other polyol polyesters based on adipic acid and diols like ethanediol, butanediol, methylpropanediol, hexanediol. Polyol telechelics can be incorporated with ethylenic and/or acetylenic unsaturation moieties as disclosed above, such as by reacting them with α,β-ethylenically unsaturated carboxylic acids, and then crosslinked using vulcanizing agents as disclose herein. Alternatively, the polyurethanes are substantially free of ethylenic Formulations comprising such polyurethane materials and optional additives such as vulcanizing agents, fillers, plasticizers, light stabilizers, and others as disclosed herein, can form golf ball portions such as cover layers by extrusion, transfer molding, compression molding, and/or injection molding. Hemispherical cup can be preformed, such as by compression molding at ambient temperature. The cup halves can then be compression molded over subassemblies such as cores into inner cover layer or dimpled outer cover layer at elevated temperature (e.g., 320° F.) and under increased pressure (e.g., 800 psi), during which the formulation is crosslinked. After a period of time (e.g., 2.5 minutes) the molds are cooled (e.g., 10 minutes with tap water or 1 minute with tap water and then 4 minutes with chilled water) and the molded objects are released from the molds.

Properties of crosslinkable polyurethanes include Mooney viscosity at 100° C. of 40-70 (e.g., 50, 60, 65, or therebetween), tensile strength of 2,000 psi (e.g., 3,000 psi, 4,000 psi, 5,000 psi, or therebetween), tear strength of 300-600 lb/in (e.g., 400 lb/in, 500, lb/in, or therebetween), brittle point of −70° F. or lower (e.g., −80° F., −90° F., or lower), material hardness of 25 Shore A to 60 Shore D (e.g., 55 Shore D), elongation at break of 100-700% (e.g., 300%, 400%, 500%, 600%, or therebetween), Bashore rebound of 40-70% (45%, 55%, or therebetween), and abrasion index (ASTM D-1630) of 300 or greater. Other crosslinkable compositions and components thereof are disclosed in U.S. Pat. Nos. 6,103,852 and 6,008,312, and in U.S. Publication No. 2002/0115813, which are incorporated herein by reference.

Poly(urethane-co-urea) Compositions

The compositions of the disclosure may comprise at least one poly(urethane-co-urea) formed from poly(urethane-co-urea) prepolymer and curative. Prepolymer to curative ratio can be as high as 1:0.9 or 1:0.95, such as when primary polyamine curatives are used, or as low as 1:1.1 or 1:1.05, such as 1:1.02, such as when secondary polyamine curatives are used. Curative includes polyamines, polyols, polyacids, aminoalcohols, aminoacids, and hydroxy acids, especially those disclosed herein, as well as epoxy-functional reactants, thio-containing reactants, and any other isocyanate-reactive compounds and materials.

Poly(urethane-co-urea) prepolymer refers to isocyanate-functional prepolymer having at least one urethane linkage and at least one urea linkage in the backbone. Such a prepolymer is distinct from polyurethane prepolymer, polyurea prepolymer, and blends thereof. The poly(urethane-co-urea) prepolymer can be formed by reacting excess isocyanate with a blend of at least one polyamine telechelic and at least one polyol telechelic. Molar ratio of polyol telechelic to polyamine telechelic in the blend can be about 0.5:1 to about 10:1, such as about 0.6:1 to about 7:1. Examples of blend include polyether polyols such as polyoxytetramethylene diol and polyether polyamines such as polyoxypropylene diamine.

The poly(urethane-co-urea) composition can be castable, thermoplastic, thermoset, or millable. The % NCO by weight in the prepolymer can be less than about 30%, such as about 15%, about 11%, about 9%, about 7%, or even less, or at least about 2%, such as about 3% or about 4% or greater, or any percentage therebetween, such as about 5-11%, about 6-9.5%, about 3-9%, about 2.5-7.5%, or about 4-6.8%. Prepolymers with higher % NCO (e.g., 14%) can be converted to prepolymers with lower % NCO (e.g., 10%) by further reacting with one or more other polyamines, polyols, polyamine telechelics, and/or polyol telechelics (e.g., polyamine polyamides, polyol polysiloxanes).

The poly(urethane-co-urea) prepolymer can be formed by reacting excess isocyanate with an aminoalcohol telechelic (or a blend of two or more thereof), optionally mixed with at least one polyamine reactant and/or at least one polyol reactant. The poly(urethane-co-urea) prepolymer can also be formed by reacting excess isocyanate with a polyamine reactant having at least one urethane linkage in the backbone, or with a polyol reactant having at least one urea linkage in the backbone. Polyamine reactants include any one or more polyamine telechelics and polyamines disclosed herein. Polyol reactants include any one or more polyol telechelics and polyols disclosed herein. The poly(urethane-co-urea) prepolymer can further be formed in situ from a mixture of at least one polyisocyanate, at least one cyclic compound such as cyclic ether, and at least one telechelic chosen from polyamine telechelics, polyol telechelics, and aminoalcohol telechelics as disclosed herein.

Acid-Functionalized and Ionomerized Compositions

The reactive compositions of the present disclosure can be covalently incorporated or functionalized with ionic groups or precursor groups thereof, which can impart desirable properties to the resulting polymer materials. The term "ionic group or precursor group thereof" means a group either already in an anionic or cationic form or else, by neutralization with a reagent, readily converted to the anionic or cationic form respectively. The term "neutralize" as used herein for converting precursor groups to ionic groups refers not only to neutralization using true acids and bases but also includes quaternarization and ternarization. Illustrative of precursor anionic groups (and neutralized form) are acid groups like carboxylic group —COOH(—COO⁻), sulfonic group —SO$_2$OH(—SO$_2$O⁻), and phosphoric group (i.e., =POOH or =POO⁻); illustrative of precursor cationic groups (and neutralized form) are =N(=N—$^?$), =P(=P—$^?$), and =S(=S—$^?$).

Without being bound to any particular theory, it is believed that acid functional moieties or groups can improve adhesion of the resulting material to other components or layers in the golf ball, while strong electrostatic interactions among cationic and/or anionic groups form ionic aggregates, which may afford desired mechanical and optical properties such as cut and abrasion resistance and transparency. More than one type of ionic group or precursor group thereof may be incorporated into the reactive composition of the present disclosure. Acid and/or ionic functionalization of the reactive compositions is disclosed, for example, in U.S. Pat. Nos. 6,610,812, 6,207,784, 6,103,822, and 5,661,207.

The precursor groups of ionic groups can be incorporated into the isocyanate-reactive telechelic (including polyamine telechelics, polyol telechelics, and aminoalcohol telechelics), the isocyanate, and/or the curative before, during, or after the prepolymer formation or the curing reaction. They can be neutralized to corresponding ionic groups before, during, or after the prepolymer formation or the curing reaction. For example, the acid groups may be neutralized to form the corresponding carboxylate anion, sulfonate anion, and phosphate anion by treatment with inorganic or organic bases. Cationic precursor groups such as tertiary amine, phosphine, and sulfide groups can be neutralized by neutralization or quaternarization of the tertiary amine, or reacting the phosphine or sulfide with compounds capable of alkylating the phosphine or sulfide groups.

Suitable inorganic bases used for partial or total neutralization may include ammonia, oxides, hydroxides, carbonates, bicarbonates and acetates. Cation for the inorganic base can be ammonium or metal cations such as, without limitation, Group IA, IB, IIA, IIB, IIIA, IIIB, IVA, IVB, VA, VB, VIA, VIB, VIIB and VIIIB metal ions, which include, without limitation, lithium, sodium, potassium, magnesium, zinc, calcium, cobalt, nickel, tin, iron, copper, manganese, aluminum, tungsten, zirconium, titanium and hafnium. Suitable organic bases used for partial or full neutralization can be hindered organic tertiary amines such as tributylamine, triethylamine, tripropylamine, triethylene diamine, dimethyl cetylamine and similar compounds. Primary or secondary amines may be used, such as if the neutralization takes place after the polymer is formed, because the amine hydrogen can react with the isocyanate groups thereby interfering with the polyurea or polyurethane polymerization. One of ordinary skill in the art is aware of additional appropriate chemicals for neutralization.

At least a portion of the ionic groups can be covalently incorporated into the isocyanate-reactive telechelic before prepolymer formation. Suitable acid functional isocyanate-reactive telechelics may have any molecular weight, such as 1,500, an acid number (calculated by dividing acid equivalent weight to 56,100) of at least about 5, such as at least about 10, at least about 25, at least about 30, or at least about 50, may be about 420 or less, such as about 200 or less, about 150 or less, about 100 or less, and an acid functionality of greater than 1, such as 1.4 or greater. In the case of polyol telechelics, the hydroxyl number of the polyols may be at least about 10, such as at least about 20, at least about 50, or at least about 65, may be about 840 or less, such as about 300 or less, about 200 or less, about 150 or less. The polyol telechelics may also have a hydroxyl functionality (average number of hydroxyl groups per polyol molecule) of greater than 1, about 2 or greater, like 1.8, and up to about 4. The acid functional telechelic can be liquid or wax at ambient temperature, and can have a viscosity at 60° C. of less than 5,000 cP, or 3,000 cP or less, such as 2,700 cP or less.

Ionic groups or precursor groups thereof may be incorporated into the monomers comprised in the telechelic. Monomers containing one or more ionic groups or precursor groups thereof can be, but are not limited to, cyclic ethers or diol monomers used to form polyether chains or segments, cyclic esters, diol monomers or polycarboxylic acids (such as lithium neutralized sulfonated isophthalic acid, tricarboxylic acids, or higher acids) used to form polyester chains or segments, cyclic amides, diamine monomers or polycarboxylic acids used to form polyamide chains or segments, cyclic siloxanes used to form polysiloxane chains or segments, (meth)acrylic acids used to form poly(meth)acrylic chains or segments, and fatty polyacids having three or more carboxylic acid functionalities and isocyanate-reactive derivatives thereof. Alternatively, the ionic groups or precursor groups thereof may be incorporated into the telechelic via the likes of addition or condensation reactions between suitable functional groups. For example, unsaturated carboxylic acids such as (meth)acrylic acids and unsaturated fatty acids as disclosed herein may react with unsaturation in the telechelic, thereby forming pendant carboxylic acids along the telechelic chain.

Other methods of incorporating acid groups into the telechelic reactant are disclosed, for example, in U.S. Patent Application No. 2002/0183443, which is incorporated by reference herein in its entirety. For example, dimethylolpropionic acid (DMPA) can provide acid groups by reacting with a starting polyol and a diisocyanate to form an isocyanate-terminated prepolymer at a temperature that permits the reaction of the hydroxyl groups with excess isocyanate without consuming all of the acid groups. Mono- or polycarboxylic acids or mono- or polyanhydrides (such as those disclosed herein, like hexanedioic acid) can provide acid groups by reacting with the starting polyols in the absence of an isocyanate, under reaction conditions that permit the reaction of the anhydride with the hydroxyl groups of the polyol, but are mild enough to prevent further reaction of the residual carboxylic acids with hydroxyl groups. Examples of such isocyanate-free acid functional polyol telechelics include Lexorez® 1405-65 and 4505-52, both available from Inolex Chemical Company of, Philadelphia, Pa.(. These acid functional polyol telechelic and other polyols as disclosed herein can further react with mono- or polycarboxylic acids or mono- or polyanhydrides (such as those disclosed herein, like aromatic anhydrides such as trimellitic anhydride, pyromellitic dianhydride, and phthalic anhydride, or alicyclic anhydrides such as hexahydrophthalic anhydride and (2,5-dioxotetrahydrol)-3-methyl 3-cyclohex-ene-1,2 dicarboxylic anhydride) to form additional acid functional polyol telechelics.

At least a portion of the ionic groups can be covalently incorporated into the isocyanate before prepolymer formation. Isocyanates having at least one acid functional group may be formed by reacting a isocyanate and an acid functional group containing compound as described in U.S. Pat. Nos. 4,956,438 and 5,071,578, the disclosures of which are incorporated herein by reference.

The acid groups may also be incorporated during a post-polymerization reaction, wherein the acid functional groups are introduced or attached to the polyurea, the polyurethane, or the poly(urethane-co-urea). Moreover, the acid functional polyurea, polyurethane, or poly(urethane-co-urea) made by ways of copolymerization as described above may be further incorporated with additional acid functional groups through such post-polymerization reactions. Suitable agents to incorporate acid functional groups and methods for making are described at least in U.S. Pat. No. 6,207,784, the disclosure of which is incorporated by reference herein. One of ordinary skill in the art would be aware of other ways to prepare the acid functional polymer composition. For example, a combination of the means for acid functionality incorporation as described above may be used as described in U.S. Pat. No. 5,661,207, the disclosure of which is incorporated by reference herein.

Composition Additives

Additional materials may be incorporated into any of the reactive compositions of the present disclosure, or any one or more of the reactive subcomponents thereof. These additives include, but are not limited to, catalysts to alter the reaction rate, fillers to adjust density and/or modulus, processing aids or oils (such as reactive or non-reactive diluents) to affect rheological and/or mixing properties, reinforcing materials, impact modifiers, wetting agents, viscosity modifiers, release agents, internal and/or external plasticizers, compatibilizing agents, coupling agents, dispersing agents, crosslinking agents, defoaming agents, surfactants, lubricants, softening agents, coloring agents including pigments and dyes, optical brighteners, whitening agents, UV absorbers, hindered amine light stabilizers, blowing agents, foaming agents, and any other modifying agents known or available to one of ordinary skill in the art. One or more of these additives are used in amounts sufficient to achieve their respective purposes and desired effects. For example, wetting additives may be added to the modified curative blends of the disclosure to more effectively disperse pigments. Suitable wetting agents are available from Byk-Chemle and Crompton Corporation, among others.

a) Catalysts

One or more catalysts may be employed to alter the reaction rate between the prepolymer and the curative for the reactive compositions. In polyurethane compositions, positive catalysts (i.e., promoters) are typically used to speed up the reaction between isocyanate groups and hydroxyl groups. In polyurea compositions, negative catalysts (i.e., inhibitors) may be used to slow down the typically fast reaction between isocyanate groups and amine groups. The same catalyst may be a promoter in a polyurethane system and an inhibitor in a polyurea system. Suitable catalysts include, but are not limited to, bismuth catalysts; zinc catalysts such as zinc octoate; cobalt catalysts such as cobalt (II) octoate; zirconium catalysts such as zirconium (IV) acetoacetonate and zirconium (IV) acetylacetone-2,4-pentanedione; tin catalysts such as dibutyltin dilaurate (DABCO® T-12), dibutyltin diacetate (DABCO® T-1), dibutyltin maleate, dioctyltin dilaurate, dibutyltin di-2-ethylhexoate, tin(II) ethylhexoate, tin(II) laurate, tin(II) octoate, dibutyltin oxide, tin(II) chloride, tin(IV) chloride, dibutyltin dimethoxide (FASCAT®-4211), dibutyltin dibutoxide (FASCAT® 4214), dioctyltin diisooctylmercaptoacetate (FORMEZ® UL-29), dibutyltin diisooctylmercaptoacetate, dimethyltin diisooctylmercaptoacetate, dibutyltin dilaurylmercaptide, dioctyltin dilaurylmercaptide, dimethyltin dilaurylmercaptide, stannous octoate (DABCO® T-9), butyl stannoic acid, dimethyl-bis[1-oxonedecyl)oxy]stannane (FORMEZ® UL-28), and 1,3-diacetoxytetrabutylstannoxane; titanium catalysts such as 2-ethylhexyl titanate, tetraisopropyl titanate, tetrabutyl titanate, and tetrakis-2-ethylhexyl titanate; amine catalysts such as triethylenediamine (DABCO® 33-LV), triethylamine, tributylamine, and N-methylmorpholine; organic acids such as acetic acid, adipic acid, azelaic acid, and oleic acid; delayed catalysts such as phenol-blocked 1,8-diaza-bicyclo(5,4,0)undecene-7 (Polycat™ SA-1/10), Polycat™ SA-1, Polycat™ SA-2, Polycat™ SA-102, Polycat™ 8154, Polycat™, and the like. These catalysts can be used alone or in combinations of two or more thereof.

Delayed action catalysts can also be used. These catalysts display their catalytic activity at a later time point in the reaction. They can be heat-activated, when external heating and/or internal heat from the exothermal reaction elevate the temperature of the reaction mixture to or above the activation temperature of the catalyst. One group of the delayed action catalyst is cyclic amidines, which can have a generic structure of:

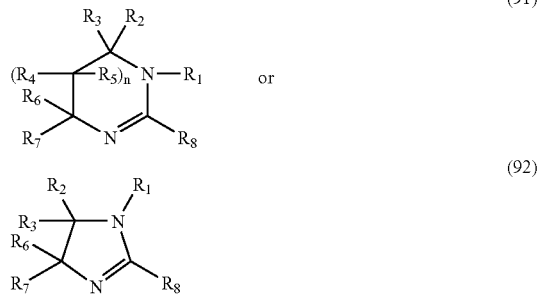

where n=0 or 1; $R_1$ to $R_7$ are independently chosen from hydrogen and linear or branched aliphatic, alicyclic, araliphatic, and aromatic moieties, such as $C_1$-$C_4$ linear or branched alkyl, $C_5$-$C_{10}$ cycloalkyl, $C_7$-$C_{13}$ aralkyl, and $C_6$-$C_{18}$ aryl moieties, or at least one of $R_2/R_3$, $R_4/R_5$, $R_6/R_7$, $R_2/R_4$ and $R_2/R_6$ is a $C_1$-$C_5$ alkylene moiety; $R_8$ is chosen from hydrogen and linear or branched aliphatic, alicyclic, araliphatic, and aromatic moieties having 1-36 carbon atoms, optionally substituted by one or more of OH, COOH, OR, $NR_9R_{10}$, or comprising at least one (up to about 10) of keto, amide, and ester moieties, or —CH(R)—[OCH$_2$—CH(R)]$_p$—H, where p is 1-40, R is chosen from linear or branched $C_1$-$C_{20}$ alkyl, cycloalkyl, aryl, and aralkyl moieties (e.g., $C_1$-$C_{15}$ alkyl, $C_6$-$C_{19}$ aryl), $R_9$ and $R_{10}$ are independently chosen from hydrogen and linear or branched aliphatic, alicyclic, araliphatic, and aromatic moieties (e.g., $C_1$-$C_{12}$ linear or branched alkyl, $C_6$-$C_8$ cycloalkyl) or $R_9/R_{10}$ is a $C_4$-$C_6$ alkylene moiety. Alternatively, these cyclic amidines can be used as blocking agent to block isocyanate functionalities in the prepolymer, allowing the isocyanate-blocked prepolymer to be thoroughly blended with the curative, and then de-blocking the prepolymer to enable the cure. This mechanism can be used in curing of polyurea composition to slow down reaction and extend potlife. These and other cyclic amidines as disclosed in U.S. Pat. No. 4,698,426 are incorporated herein by reference.

The catalyst can be added in an amount sufficient to catalyze the reaction of the components in the reactive mixture, such as about 0.001-5% by weight of the composition, about 0.005-1%, about 0.05% or greater, or about 0.5% or greater. Use of low levels of tin catalysts, such as about 0-0.04%, may require high temperatures to achieve a suitable reaction rate, which can result in degradation of the prepolymer. Greater amounts of catalysts may allow reduction in process temperatures with comparable cure, and allow reduction in mixing speeds. Unconventionally high amounts of catalysts can be about 0.01-0.55%, about 0.05-0.4%, or about 0.1-0.25%.

Diluents

As used herein, the term "diluent" refers to any compound or composition that can reduce viscosity, reduce reaction exotherm, and/or impart or enhance properties such as flame retardancy, processability, compatibility, and moisture resistance, without adversely affecting the qualitative or physical properties of the resulting polymer. Diluents are distinct from solvents in that diluents remain within the polymer post-cure, while solvents are evaporated off post-cure. Diluent can be linear or branched, aliphatic, alicyclic, aromatic, or araliphatic, saturated or unsaturated, substituted or unsubstituted, halogenated or halogen-free, and/or hydrophobic or hydrophilic, and include within its scope plasticizer materials. Diluents can be reactive or substantially unreactive. Diluent can be substantially water insoluble. Diluent can be added at any time before, during, or after prepolymer preparation, e.g., separately or as a mixture with one or more reaction components prior to prepolymer preparation, in amount sufficient to reduce the viscosity of the prepolymer to about 1,000-4,000 cP at temperatures of about 125° C. or less. Diluents can have a viscosity of about 50 cP or less at 25° C. Diluents can have a boiling point of greater than 90° C.

The diluent can be used individually or in blends of two or more thereof, and can comprise at least about 0.05% by weight of the prepolymer or the total reactive composition, such as 2%, 3%, 4%, 5%, 6%, 10%, 15%, 18%, 20%, 35%, 50%, 60%, 70%, or greater or any amount therebetween. Suitable diluent can be chosen according to parameters such as compatibility with the composition and desired properties of the final polymer. For example, ester diluents tend to be compatible with polyester-based prepolymers. Reactive diluents can react with one or more functionalities of one or more ingredients in the composition. For example, epoxy and carbonate diluents can react with ingredients having amine groups and/or hydroxyl groups, while ethylenically unsaturated diluents can react with ingredients having ethylenic unsaturation.

Suitable diluents include those described in U.S. Pat. Nos. 3,773,697, 5,929,153, 3,929,700 and 3,936,410, and 4,343,925 (column 9, line 37 to column 13, line 62), the disclosures of which are incorporated herein by reference. Non-limiting examples of diluents include phosphates, esters, epoxies, carbonates, ethers, alkoxylated alcohols, fatty telechelics, such as:

a) cyclic carbonates which can be substituted (with groups such as alkyl, hydroxyalkyl, halogen, etc.) or unsubstituted, and can be prepared such as reacting a compound having an oxirane group (e.g., cyclic ether such as propylene oxide) with carbon dioxide, having a structure of:

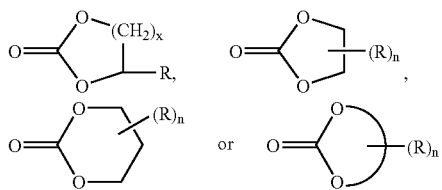

where x is about 1-9, such as 1 or 2; n is 1 to about 40, such as 1, 2, 3, or even integers of about 4-20, like 4 or 6; R is the same or different moieties independently chosen from hydrogen, linear or branched hydrocarbon groups (such as alkyl, aryl, cyclic, saturated, or unsaturated) having about 1-20 carbon atoms, such as about 1-18, about 1-6, or about 1-3 carbon atoms, linear or branched hydroxyalkyl groups having about 1-20 carbon atoms, such as about 1-18, about 1-6, or about 1-3 carbon atoms, linear or branched alkoxyalkylene or polyalkoxyalkylene, linear or branched haloalkyl groups having about 1-20 carbon atoms, such as chloromethyl, linear or branched —$C_mH_{2m+1}$ or —$C_mH_{2m}OH$ where m is about 1-8, and linear or branched —$(CH_2)_mH$ or —$(CH_2)_mOH$ where m is about 1-2, linear or branched alkoxy groups such as methoxyl and ethoxyl, aryloxy groups such as phenoxyl, including 5-membered cyclic carbonates such as ethylene carbonate, propylene carbonate, butylene carbonate, isobutylene carbonate, styrene carbonate, phenylethylene carbonate, butyl soyate carbonate, butyl linseed carbonate, and glycerin carbonate, fatty acid carbonates like oleic acid 8,9-carbonate, succinic acid glyceryl carbonate monoester, glutaric acid glyceryl carbonate monoester, 9,10-dihydroxystearic acid carbonate, and 6-membered cyclic carbonates such as cyclic trimethylolpropane carbonate and those disclosed in U.S. Pat. Nos. 4,501,905 and 4,440,937, which are incorporated herein by reference, with suitable examples available under the tradename Jeffsol® from Huntsman Corporation, Austin, Tex.;

b) phosphorus-containing compounds including phosphites (e.g., triaryl phosphites like triphenyl- and tritolyl phosphite, dialkyl phosphites like diisopropyl-, dibutyl-, bis(2-ethylhexyl)-, bis(tridecyl)-, and dioleyl phosphites, trialkyl phosphites like tris(2-ethylhexyl)-, triisopropyl-, tributyl-, tris(2-chloroethyl)-, and triisooctyl phosphites, cyclic phosphate esters and cyclic phosphonate esters (e.g., those disclosed in U.S. Pat. No. 5,030,674, column 3, line 63 to column 4, line 55, which is incorporated by reference herein), and phosphate esters (e.g., trialkyl phosphates like triethyl-, tributyl-, tris(2-ethylhexyl)-, tricresyl-, trioctyl-, 2-ethylhexyldiphenyl phosphate, isodecyldiphenyl phosphate, cresyldiphenyl phosphate, p-t-butylphenyldiphenyl phosphate, triphenyl phosphate, trixylyl phosphate, trixylenyl phosphate, phenyldicresyl phosphate, xylenyldicresyl phosphate, cresyldixylenyl phosphate, tributoxy ethylphosphate, chloroalkyldiphosphate esters, trichloroethyl phosphate, and tris(isopropyl)chlorophosphate, chlorinated biphenyl phosphate, chlorinated diphosphate, phosphonates such as chlorinated polyphosphonate, alkyloxylated fatty alcohol phosphate esters such as oleth-2 phosphate, oleth-3 phosphate, oleth-4 phosphate, oleth-10 phosphate, oleth-20 phosphate, ceteth-8 phosphate, ceteareth-5 phosphate, ceteareth-10 phosphate, PPG ceteth-10 phosphate, some of which are available from Albemarle Corporation of Baton Rouge, La., Great Lakes Chemical Corporation of West Lafayette, Ind., and Rhodia Inc. of Cranbury, N.J.;

c) epoxies such as butylepoxy stearate, octylepoxy stearate, epoxybutyl oleate, epoxidized butyl oleate, epoxidized soybean oil, epoxidized linseed oil, epoxidized alkyl oil, epoxidized alkyl oil alcohol ester, mono-, di-, and polyglycidyl ethers of castor oil and other fatty polyols and fatty polyol telechelics like those disclosed herein, mono-, di-, and polyglycidyl esters of fatty polyacids and dimer acids like those disclosed herein, such as Heloxy® and Cardura® by Resolution Performance Products of Houston, Tex.;

d) alkyl and/or aryl esters, diesters, triesters, dialkyl or diaryl diesters, trialkyl or triaryl triesters of such acids and anhydrides as acetic acid, hexanoic acid, adipic acid, azelaic acid, benzoic acid, citric acid, dimer acids, fumaric acid, isobutyric acid, isophthalic acid, lauric acid, linoleic acid, maleic acid, maleic anhydride, melissic acid, myristic acid, oleic acid, palmitic acid, phthalic acid, ricinoleic acid, sebacic acid, stearic acid, succinic acid, 1,2-benzenedicarboxylic acid, and the like, and mixtures thereof, where the alkyl group can independently be linear or branched alkyl having about 1-20 carbon atoms, $H_3CO(CO)(CH_2)_n(CO)OCH_3$ where n is an integer of about 1-10 or about 8-20, such as methyl 2-ethylhexanoate, butyl acetate, methyl laurate, methyl linoleate, isopropyl myristate, butyl oleate, methyl palmitate, butyl ricinoleate, methyl stearate, dibenzoate esters, di(aminobenoate) esters, 2-ethylhexylbenzoate, dimethyl adipate, diisopropyl adipate, dibutyl adipate, di-2-ethylhexyl adipate, dicapryl adipate, di-n-decyl adipate, and diisodecyl adipate, polypropylene adipate, heptyl nonyl adipate, dimethyl azelate, dimethyl sebacate, dibutyl sebacate, di-2-ethylhexyl sebacate, dimethyl glutarate, dimethyl succinate, diethyl succinate, dibutyl fumarate, dioctyl fumarate, di-n-butyl maleate, butyl octyl phthalate, butylcyclohexyl phthalate, butyllauryl phthalate, butylcoconutalkyl phthalate, heptylnonyl phthalate, octyldecanoyl phthalate, octyldecyl phthalate, isooctylisodecyl phthalate, dimethyl phthalate, diethyl phthalate, di-n-butyl phthalate, diisobutyl phthalate, di-2-ethylhexyl phthalate, dihexyl phthalate, bis(3,5,5-trimethylhexyl)phthalate, dicyclohexyl phthalate, diheptyl phthalate, di-n-octyl phthalate, diisooctyl phthalate, dinonyl phthalate, diisononyl phthalate, diisodecyl phthalate, dicapryl phthalate, dilauryl phthalate, diundecyl phthalate, ditridecyl phthalate, diphenyl phthalate, dimethoxyethyl phthalate, butylbenzyl phthalate, butylphenylmethyl phthalate, $C_7/C_9$ alkylbenzyl phthalate, isodecylbenzyl phthalate, texanolbenzyl phthalate, 7-(2,6,6,8-tetramethyl-4-oxa-3-oxo-nonyl)benzyl phthalate, bis(diethyleneglycolinonomethylether)phthalate, dimethylglycol phthalate, triethyl citrate, acetyltriethyl citrate, tributyl citrate, acetyltributyl citrate, tricapryl trimellitate, trioctyl trimellitate, triisononyl trimellitate, tridecyl trimellitate, triisodecyl trimellitate, heptylnonyl trimellitate, methylphthalyl ethylene glycolate, ethylphthalyl ethylene glycolate, butylphthalyl ethylene glycolate, glycerol triacetate, benzphenol, and mixtures thereof (e.g., about 20% by weight of dimethyl succinate, 21% by weight of dimethyl adipate and about 59% by weight of dimethyl glutarate);

e) mono-, di-, or polyesters of fatty acids having about 8 or more carbon atoms with di-, tri-, or polyhydric alcohols, such as glycerin monostearate, glycerin 12-hydroxy stearate, glycerin distearate, diglycerin monostearate, tetraglycerin monostearate, glycerin monolaurate, diglycerin monolaurate, and tetraglycerin monolaurate;

f) diesters of α,ω-diols where the acid can be linear or branched chain alkanoic acid having about 1-6 carbon atoms or aromatic acid and the diol can be linear of branched chain aliphatic diol, such as diethylene glycol dibenzoate, dipropylene glycol dibenzoate, polyethylene glycol dibenzoate, 2,2,4-trimethyl-1,3-pentanediol diisobutyrate (TXIB available from Eastman Chemical Company of Kingsport, Tenn.) and diethylene glycol dibenzoate, 2,2,4-trimethyl-1,3-pentanediol monoisobutyrate benzoate, g) mono- and di-alkyl (such as $C_1$-$C_6$) glycol ethers of alkylene and polyalkylene glycols, and analogs of such glycol ethers as some of the polyol telechelics disclosed herein, such as monomethyl diethylene glycol, monoethyl dipropylene glycol, and monomethyltripropylene glycol;

h) alkoxylated alcohols, such as nonyl phenols alkoxylated with about 1-50 (such as about 7-12) moles of an alkoxylating agent or mixture of alkoxylating agents having about 1-6 (such as about 2-4) carbon atoms, alkoxylated bisphenol A like ethoxylated bisphenol A, and propoxylated trimethylolpropane, some of which are available from Stepan Company of Northfield, Ill.;

i) fatty telechelics such as fatty polyamine telechelics and fatty polyol telechelics disclosed herein, some of which can be liquid at ambient temperature, like castor oil, soy and linseed oils;

j) compounds and mixtures having ethylenic unsaturation, such as polyesters of unsaturated carboxylic acids (e.g., tripropylene glycol diacrylate, Bisphenol A diglycidylether diacrylate, 1,6-Hexanediol diacrylate, 1,4-butanediol dimethacrylate, ethyleneglycol dimethacrylate, polyethylene glycol dimethacrylate, diethylene glycol dimethacrylate, urethane dimethacrylate, tetraethylene glycol dimethacrylate, triethylene glycol dimethacrylate, trimethylolpropane trimethacrylate, pentacrythritol triacrylate, and trimethylolpropane triacrylate), bismaleimides (e.g., N,N'-m-phenylenedimaleimide), polyamides of unsaturated carboxylic acids, esteramides of unsaturated carboxylic acids, allyl esters of cyanurates (e.g., triallyl cyanurate), allyl esters of isocyanurates (e.g., triallyl isocyanurate), allyl esters of aromatic acids (e.g., triallyl trimaletate and triallyl trimellitate), liquid vinyl polydienes (e.g, liquid vinyl polybutadiene homopolymers and copolymers having molecular weight of about 1,000 to about 5,000, such as about 1,800 to about 4,000, or about 2,000 to about 3,500, like 90% high vinyl polybutadiene having a molecular weight of about 3,200, 70% high vinyl 1,2-polybutadiene having a molecular weight of about 2,400, and 70% high vinyl poly(butadiene-styrene) copolymer having a molecular weight of about 2,400), mono- and polyunsaturated polycarboxylic acids and anhydrides, monoesters, polyesters, monoamides, polyamides, esteramides, and polyesteramides thereof (e.g., citraconic acid, itaconic acid, fumaric acid, maleic acid, mesaconic acid, aconitic acid, maleic anhydride, itaconic anhydride, citraconic anhydride, poly(meth)acrylic acid, polyitaconic acid, copolymers of (meth)acrylic acid and maleic acid, copolymers of (meth)acrylic acid and styrene, and fatty acids having a $C_6$ or longer chain, such as hexadecenedioic acid, octadecenedioic acid, vinyl-tetradecenedioic acid, eicosedienedioic acid, dimethyl-eicosedienedioic acid, 8-vinyl-10-octadecenedioic acid, anhydrides thereof, methyl, ethyl, and other linear or branched alkyl esters thereof, amides thereof, esteramides thereof, and mixtures thereof), unsaturated oils, polyester diol reaction product of o-phthalic acid and diethylene glycol, and mixtures thereof;

k) other miscellaneous compounds including alkoxy alkyl esters such as methoxy propylacetate and ethoxy propylacetate, pyrrolidones such as N-methyl-2-pyrrolidone and N-vinyl-pyrrolidone, monohydroxylated polybutadienes, silicones such as dimethicone copolyol esters, dimethiconol esters, and silicone carboxylates, aromatic petroleum condensate, partially hydrogenated terphenyls, guerbet esters, cyclic esters, cyclic ethers, and/or cyclic amides such as those disclosed herein; and l) mixtures of two or more compounds chosen from a)-k).

Fillers

As used herein, the term "filler" refers to any compound or composition or mixture thereof that can be used to vary certain properties of selected portions of the golf ball, including density or specific gravity, flexural modulus, tensile modulus, tear strength, moment of inertia, hardness, abrasion resistance, weatherability, volume, weight, etc. The fillers can be in the forms of nano-scale or micro-scale powders, fibers, filaments, flakes, platelets, whiskers, wires, tubes, or particulates for homogenous dispersion. Suitable fillers for golf balls may be solid or hollow, and include, for example, metal (or metal alloy) powder, metal oxide and salts, ceramics, particulates, carbonaceous materials, polymeric materials, glass microspheres, and the like or blends thereof. Non-limiting examples of metal (or metal alloy) powders include bismuth, brass, bronze, cobalt, copper, inconel, iron, molybdenum, nickel, stainless steel, titanium, aluminum, tungsten, beryllium, zinc, magnesium, manganese, and tin. Non-limiting examples of metal oxides and salts include zinc oxide, iron oxide, aluminum oxide, titanium dioxide, magnesium oxide, zirconium oxide, tungsten trioxide, zirconium oxide, tungsten carbide, tungsten oxide, tin oxide, zinc sulfide, zinc sulfate, zinc carbonate, barium sulfate, barium carbonate, calcium carbonate, calcium metasilicate, magnesium carbonate, and silicates. Non-limiting examples of carbonaceous materials include graphite and carbon black. Examples of other useful fillers include precipitated hydrated silica, boron, clay, talc, glass fibers, aramid fibers, mica, diatomaceous earth, regrind (typically recycled core material mixed and ground to 30 mesh particle size), high Mooney viscosity rubber regrind, and mixtures thereof. Examples of polymeric materials include, but are not limited to, hollow spheres or microspheres of chemically or physically foamed thermoplastic or thermosetting polymers, such as epoxies, urethanes, polyesters, nucleated reaction injection molded polyurethanes or polyureas.

The selection of fillers is in part dependent upon the type of golf ball desired, i.e., one-piece, two-piece, multi-component, or wound. Fillers may be used to modify the weight of any portion of the golf ball. The filler can be inorganic, having a density of greater than 4 g/cc, and can be present in amounts of 5-65 wt. % of the polymer components included in the golf ball portion.

Blowing and/or Foaming Agents

The compositions may be foamed by the addition of at least one physical or chemical blowing or foaming agent. Foamed polymer allows one to adjust the density or mass distribution of the ball to adjust the angular moment of inertia, and, thus, the spin rate and performance of the ball. Blowing or foaming agents useful include, but are not limited to, organic blowing agents such as azobisformamide, azobisisobutyronitrile, diazoaminobenzene, N,N-dimethyl-N,N-dinitrosoterephthalamide, N,N-dinitrosopentamethyl-enetetramine, benzenesulfonylhydrazide, benzene-1,3-disulfonylhydrazide, diphenylsulfon-3-3, disulfonylhydrazide, 4,4'-oxybisbenzene sulfonylhydrazide, p-toluene sulfonylsemicarbizide, barium azodicarboxylate, butylaminenitrile, nitroureas, trihydrazinotriazine, phenyl-methyl-uranthan, p-sulfonylhydrazide, peroxides, and inorganic blowing agents such as ammonium bicarbonate and sodium bicarbonate. A gas, such as air, nitrogen, carbon dioxide, etc., can also be injected into the composition during the injection molding process as a blowing agent.

Additionally, foamed compositions may be formed by blending microspheres to the compositions either during or before molding. Polymeric, ceramic, metal, and glass microspheres are useful, and may be solid, hollow, filled, or unfilled. Microspheres up to about 1,000 microns in diameter can be useful. Furthermore the use of liquid nitrogen for foaming, as disclosed in U.S. Pat. No. 6,386,992, which is incorporated by reference herein, may produce highly uniform foamed compositions for use in the present disclosure.

Light Stabilizers

The compositions may comprise one or more light stabilizers to prevent significant yellowing from any unsaturated components contained therein, and to prevent cover surface fractures due to photo-degradation. As used herein, "light stabilizer" may be understood to include hindered amine light stabilizers, ultraviolet (UV) absorbers, and antioxidants. The light stabilizing component can be used in compositions having a difference in yellowness (? Y) of about 12 or greater following one-hour exposure to QUV test per ASTM G 154-00a at an irradiance power of 1.00 W/m²/nm, such as about 15 or greater. Light stabilizers can be used in visible layers, such as the outer cover layer, or any internal layer when the outer layer(s) are translucent or transparent.

Suitable UV absorbers include Uvinul® DS49 (disodium 2,2'-dihydroxy-4,4'-dimethyoxy-5,5'-disulfobenzophenone) and Uvinul® DS50 (2,2',4,4'-tetrahydroxy-benzophenone) by BASF Corporation; Tinuvin® 328 (2-(2'-hydroxy-3',5'-di(t-amylphenyl)benzotriazole), Tinuvin® 571 (2-(2H-benzotriazol-2-yl)-6-dodecyl-4-methylphenol), Tinuvin® P (2-(2-hydroxy-5-methylphenyl)benzotriazole), and CGL 1545 (experimental triazine derivative) by Ciba Specialty Chemicals Corporation; Sanduvor® PR-25 (dimethyl-4-methoxybenzylidenemalonate) by Clariant Corporation; Cyasorb® UV-2337 (2-(2'-hydroxy-3',5'-di(t-amylphenyl)benzotriazole), Cyasorb® UV-1164 (2-(4,6-bis(2,4-dimethylphenyl)-1,3,5-triazin-2-yl)-5-octyloxyphenol), and Cyasorb® UV-3638 (2,2'-(1,4-phenylene)-bis(4-3,1-benzoxazin-4-one)) by Cytec Industries; Quercetin® (3,3',4',5,7-pentahydroxy flavone) by EM Industries; UV-Chek® AM-300 (2-hydroxy-4-n-octyloxy-benzophenone) and UV-Chek® AM-340 (2,4-di(t-butylphenyl)-3,5-di(t-butyl)-4-hydroxybenzoate) by Ferro Corporation; Maxgard® DPA-8 (2-ethylhexyl-2-cyano-3,3-diphenylacrylate) by Garrison Industries; Givsorb® 2 (propanedione), Givsorb® 13, Givsorb® 14, and Givsorb® 15 by Givaudan-Roure Corporation; Norbloc® 6000 (2-(2'-hydroxy-5'-(2-hydroxyethyl)benzotriazole) and Norbloc® 7966 (2-(2'-hydroxy-5'-methacryloxyethylphenyl)-2H-benzotriazole) by Jessen Pharmaceuticals. Suitable light stabilizers include, but are not limited to, Tinuvin® 622LD (dimethyl succinate polymer with 4-hydroxy-2,2,6,6-tetramethyl-1-piperidine ethanol) and Tinuvin® 765 (bis(1,2,2,6,6-pentamethyl-4-piperidinyl)sebacate) by Ciba Specialty Chemicals Corporation; Sanduvor® 3070 (hindered amine) by Clariant Corporation; Cyasorb® UV-3581 (3-dodecyl-1-(2,2,6,6-tetramethyl-4-piperidylpyrrolidin-2,5-dione) by Cytec Industries. For aromatic and unsaturated formulations, the UV absorber can be Tinuvin® 328, and the hindered amine light stabilizer can be Tinuvin® 765, among others. Light stabilizer for saturated formulations can be Tinuvin® 292, among others. In addition, Tinuvin® 213 and 770, and antioxidants such as Irganox® 1010 (tetrakis(3,5-di(t-butyl-hydroxyhydrocinnamate))methane) and Irganox® 1135 ($C_{7-9}$-branched alkyl ester of 3,5-di(t-butyl-4-hydroxyhydrocinnamic acid) by Ciba Specialty Chemicals Corporation and Sandostab® P-EPQ (aryl phosphonite) by Clariant Corporation, are also applicable.

Light stabilizers can be used alone or in combinations of two or more thereof, or in combination with coloring agents such as dyes and pigments, as well as optical brighteners, in golf ball compositions disclosed herein. Pigments may be fluorescent, autofluorescent, luminescent, or chemoluminescent, and include white pigments such as titanium oxide and zinc oxide. These coloring agents may be added in any amounts that will achieve their desired purpose.

Freezing Point Depressants

Multi-functional curing agents can be used in the compositions of the present disclosure. The multi-functional curing agent can include, or be modified with, at least one compatible freezing point depressant including triols such as trimethylolpropane, tetraols such as N,N,N',N'-tetrakis(2-hydroxylpropyl)ethylenediamine, primary diamines such as 3,3'-dimethyl-4,4'-diaminodicyclohexylmethane and 4,4'-diaminodicyclohexylmethane, among others.

Vulcanizing Agents

When the composition of the present disclosure comprise ethylenic and/or acetylenic unsaturation moieties, one or more vulcanizing agents, such as radical initiators, polyisocyanates, co-crosslinking agent, curatives comprising ethylenic and/or acetylenic unsaturation moieties, cis-to-trans catalysts, organosulfur compounds, and/or processing aids, can be added to the composition, which can then be crosslinked at elevated temperature under increased pressure. Radical initiators include sulfur-based compounds such as element sulfur and thiazole accelerators, carbon-carbon initiators such as those disclosed in co-owned and co-pending application bearing Ser. No. 10/614,325, which are incorporated herein by reference, and various peroxides including, but are not limited to, diacyl peroxides, ketone peroxides, peroxydicarbonates, peroxyesters, alkyl aralkyl peroxides, diaraylkyl peroxides, dialkyl peroxides, hydroperoxides, and peroxyketals. Non-limiting examples of dialkyl peroxides include di-t-amyl peroxide, di-t-butyl peroxide, t-butyl cumyl peroxide, di-cumyl peroxide (DCP), di(2-methyl-1-phenyl-2-propyl) peroxide, t-butyl 2-methyl-1-phenyl-2-propyl peroxide, di(t-butylperoxy)-diisopropylbenzene, 2,5-dimethyl-2,5-di(t-butylperoxy)hexane, 2,5-dimethyl-2,5-di(t-butylperoxy)hexyne-3,1,1-di(t-butylperoxy)-3,3,5-trimethylcyclohexane, 4,4-di(t-butylperoxy)-n-butylvalerate, and mixtures thereof. DCP is the most commonly used peroxide in golf ball manufacturing. Di(t-butylperoxy)-diisopropylbenzene can provide higher crosslinking efficiency, low odor and longer scorch time, among other properties. DCP can be blended with di(t-butylperoxy)-diisopropylbenzene. In the pure form, the radical initiator or a blend thereof can be used in an amount of 0.25-10, 0.25-5, or 0.5-2.5 phr by weight of the elastomer.

Polyisocyanates as disclosed herein can be used to crosslink reactive compositions comprising urethane and/or urea linkages. Isocyanate group can react with urethane linkage to form allophanate linkage having a general structure of:

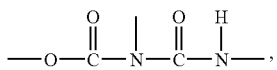

or react with urea linkage to form biuret linkage having a general structure of:

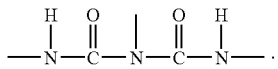

Polyisocyanate crosslinked compositions can have a material hardness of 70 Shore A to 60 Shore D. Sulfur or peroxide cured compositions can have a material hardness of 25-85 Shore A.

Suitable co-crosslinking agents all have di- or polyunsaturation and at least one readily extractable hydrogen in the α position to the unsaturated bonds. Useful co-crosslinking agents include, but are not limited to, mono- or polyfunctional unsaturated carboxylate metallic compounds, polyesters of unsaturated carboxylic acids, polyamides of unsaturated carboxylic acids, esteramides of unsaturated carboxylic acids, bismaleimides, allyl esters of cyanurates, allyl esters of isocyanurates, allyl esters of aromatic acids, mono- and polyunsaturated polycarboxylic acids, anhydrides of mono- and polyunsaturated polycarboxylic acids, monoesters and polyesters of mono- and polyunsaturated polycarboxylic acids, monoamides and polyamides of mono- and polyunsaturated polycarboxylic acids, esteramides and polyesteramides of mono- and polyunsaturated polycarboxylic acids, liquid vinyl polydienes, and mixtures thereof. Unsaturated carboxylate metallic compounds are Type I co-crosslinking agents. They differ from all others, which are Type II co-crosslinking agent, in their effect on the curing characteristics of the system. Type I co-crosslinking agents generally form relatively more reactive free radicals which increase both cure rate and the state of cure of the system, and form ionic crosslinks primarily. Type II co-crosslinking agents form relatively less reactive and more stable free radicals and increase primarily the state of cure of the elastomer, and primarily form carbon-carbon crosslinks. The co-crosslinking agent can be present in the amount of at least about 0.1 parts per one-hundred parts by weight of the base rubber (phr), such as about 0.5 phr, 1 phr, 2 phr, 6 phr, 8 phr, 10 phr, 15 phr, 20 phr, 25 phr, 30 phr, or 40 phr, and up to about 80 phr, such as up to about 60 phr. The amount of carbon-carbon-crosslinks in the resulting thermoset material can be no less than the amount of ionic crosslinks.

Unsaturated carboxylate metallic compounds can have one or more α,β-unsaturated carboxylate functionalities such as acrylates and methacrylates. The compounds can have one or more metal ions associated with one or more of the unsaturated carboxylate functionalities, such as Zn, Ca, Co, Fe, Mg, Ti, Ni, Cu, etc. Metallic compounds of difunctional unsaturated carboxylates include, without limitation, zinc diacrylate (ZDA), zinc dimethacrylate (ZDMA), calcium diacrylate, and a blend thereof. Metallic compounds of polyfunctional unsaturated carboxylates include reaction products of a) mono-basic unsaturated carboxylic acids such as acrylic acid and/or methacrylic acid, b) di-basic and/or polybasic carboxylic acids having mono- or polyunsaturation, and/or anhydrides thereof, such as those disclosed herein below, and c) divalent metal oxide. Examples of such metallic compounds and their synthesis are disclosed in U.S. Pat. No. 6,566,483, the entirety of which is incorporated herein by reference.

Unsaturated carboxylic acids can be condensed with polyamines (forming polyamides), polyols (forming polyesters), or aminoalcohols (forming esteramides). Non-limiting examples of unsaturated carboxylic acid condensates include tripropylene glycol diacrylate, Bisphenol A diglycidylether diacrylate, 1,6-Hexanediol diacrylate, 1,4-butanediol dimethacrylate, ethyleneglycol dimethacrylate, polyethylene glycol dimethacrylate, diethylene glycol dimethacrylate, urethane dimethacrylate, tetraethylene glycol dimethacrylate, triethylene glycol dimethacrylate, trimethylolpropane trimethacrylate, pentaerythritol triacrylate, and trimethylolpropane triacrylate.

Non-limiting example of bismaleimide include N,N'-m-phenylenedimaleimide (HVA-2, available from Dupont). Non-limiting examples of allyl esters include triallyl cyanurate (Akrosorb® 19203, available from Akrochem Corp. of Akron, Ohio), triallyl isocyanurate (Akrosorb® 19251, also available from Akrochem Corp.), and triallyl trimaletate (TATM, available from Sartomer Company of Exton, Pa.). Non-limiting examples of mono- or polyunsaturated polycarboxylic acids and derivatives thereof include citraconic acid, itaconic acid, fumaric acid, maleic acid, mesaconic acid, aconitic acid, maleic anhydride, itaconic anhydride, citraconic anhydride, poly(meth)acrylic acid, polyitaconic acid, copolymers of (meth)acrylic acid and maleic acid, copolymers of (meth)acrylic acid and styrene, and fatty acids having a $C_6$ or longer chain, such as hexadecenedioic acid, octadecenedioic acid, vinyl-tetradecenedioic acid, eicosedienedioic acid, dimethyl-eicosedienedioic acid, 8-vinyl-10-octadecenedioic acid, anhydrides thereof, methyl, ethyl, and other linear or branched alkyl esters thereof amides thereof esteramides thereof, and mixtures thereof.

Liquid vinyl polydienes are liquid at ambient temperature, such as liquid vinyl polybutadiene homopolymers and copolymers, and can have low to moderate viscosity, low volatility and emission, high boiling point (such as greater than 300° C.), and molecular weight of about 1,000 to about 5,000, such as about 1,800 to about 4,000, or about 2,000 to about 3,500. Non-limiting examples of liquid vinyl polydienes include 90% high vinyl polybutadiene having a molecular weight of about 3,200, 0 (70% high vinyl 1,2-polybutadiene having a molecular weight of about 2,400, and 70% high vinyl poly(butadiene-styrene) copolymer having a molecular weight of about 2,400.

The cis-to-trans catalyst or organosulfur compound, such as halogenated compound, can be one having cis-to-trans catalytic activity or a sulfur atom (or both), and can be present in the polymeric composition by at least about 2.2 phr, such as less than about 2.2-5 phr. Useful compounds of this category include those disclosed in U.S. Pat. Nos. 6,525,141, 6,465,578, 6,184,301, 6,139,447, 5,697,856, 5,816,944, and 5,252,652, the disclosures of which are incorporated by reference in their entirety.

The halogenated organosulfur compound may include pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; the metal salts thereof, and mixtures thereof. The metal salt may be zinc, calcium, potassium, magnesium, sodium, and lithium. Pentachlorothiophenol is commercially available from Strucktol Company of Stow, Ohio, and zinc pentachlorothiophenol is commercially available from eChinachem of San Francisco, Calif.

Processing acids for the crosslinkable compositions include, without limitation, organic acids, metal salts thereof, esters thereof (such as linear or branched $C_1$ to $C_8$ alkyl esters), and alcohols derived from such organic acids, which can be non-volatile and non-migratory. Any of the fatty acids, fatty alcohols, fatty esters, and metal cations disclosed herein can be used. For example, the processing aid can be one or more aliphatic, mono-functional, saturated, mono-unsaturated, or poly-unsaturated organic acids having about 36 carbon atoms or fewer, such as 6-26, 6-18, or 6-12 carbon atoms, and/or metal salts thereof. Metal cations can be one or more alkali metal, transition metal, or alkaline earth metal cations, or a combination of such cations. Non-limiting examples of the organic acids include caproic acid, caprylic acid, capric acid, lauric acid, stearic acid, behenic acid, erucic acid, oleic acid, and linoleic acid. Non-limiting examples of the metal cations include lithium, sodium, potassium, magnesium, calcium, barium, and zinc. Agents other than organic acids/salts may be used, as long as they also exhibit ionic array plasticizing and ethylene crystallinity suppression properties. The processing aids can be added in an amount sufficient to enhance the resilience of the crosslinkable elastomer, and/or substantially eliminate crystallinity therein. The amount can be at least about 0.1% by weight of the total amount of the elastomer and processing aid, such as 1%, 5%, 15%, 20%, 35%, 40%, and up to 50%. Alternatively, the amount of the processing aids can be 0.25-150 phr by weight of the elastomer or blend of elastomers. Other processing aids for crosslinkable compositions include those disclosed in U.S. Pat. No. 5,141,978, which are incorporated herein by reference.

Moisture Scavengers

Moisture scavengers can be low-viscosity, reactive, non-reactive, include isocyanate-containing compounds such as monomeric compounds like p-tolune sulfonyl isocyanate (PTSI from VanDeMark Inc. of Lockport, N.Y.) and polymeric compounds like polymeric methylene diphenyl diisocyanate (PAPI® MDI from Dow Chemical), oxazolidines, oxazolanes, orthoformates such as trimethyl- and triethyl orthoformates, orthoacetates such as trimethyl- and triethyl orthoacetates, alkyl (linear or branched $C_1$ to $C_{12}$ alkyls) esters of toluene sulfonic acid such as methyl p-toluene sulfonate (MTS), and vinyl silanes. These moisture scavengers can be used alone or in combination thereof or in combinations with other moisture scavengers such as calcium oxide and molecular sieves. Amount of the moisture scavengers can be about 10 phr or less, such as about 5 phr or less, and can be about 0.01 phr or greater, such as about 0.05 phr or greater, or about 0.1 phr or greater. Various light stabilizers, UV absorbers, photoinitiators, and silane crosslinkers are all readily available.

Fragrance Components

As used herein, a material or component is regarded as odorous when its odor threshold is greater than 0.029 mg/m$^3$ in air. A fragrance or masking component may be added to compositions comprising such odorous materials or components, in an amount of at least 0.01% by weight of the composition, such as 0.03%, 0.08%, 0.5%, 1%, 1.2%, 1.5%, or any amounts therebetween. Suitable fragrance components include, but are not limited to, Long Lasting Fragrance Masks #59672, #46064, and #55248, Non-Descript Fragrance Mask #97779, Fresh and Clean Fragrance Mask #88177, and Garden Fresh Fragrance Mask #87473, available from Flavor and Fragrance Specialties of Mahwah, N.J. Other non-limiting fragrance components include benzaldehyde, benzyl benzoate, benzyl propionate, benzyl salicylate, benzyl alcohol, cinnamic aldehydes, natural and essential oils derived from botanical sources, and mixtures thereof.

Composition Blends

The compositions of the disclosure can be used in amounts of 1-100%, such as 10-90% or 10-75%, to form any portion of the golf ball, optionally in blend with one or more other materials being present in amounts of 1-95%, 10-90%, or 25-90%. The percentages are based on the weight of the portion in question. Conventional materials for golf ball cover, intermediate layer, and core suitable as the other materials include:

1) Non-ionomeric acid polymers, such as copolymers E/Y of an olefin E having 2-8 carbon atoms and a carboxylic acid Y having 3-8 carbon atoms, or terpolymers E/X/Y having an additional softening comonomer X. The olefin E can be ethylene, and the acid Y can be acrylic, methacrylic, crotonic, maleic, fumaric, itaconic acid, or combinations thereof. The comonomer X can be vinyl esters of aliphatic carboxylic acids having 2-10 carbon atoms, alkyl ethers, alkyl acrylates, and alkyl alkylacrylates where alkyl groups can be linear or branched having 1-10 carbon atoms. Depending on the acid content by weight, the polymer may be referred to as low acid (2-10%), medium acid (10-16%), and high acid (16-50%). The comonomer, when present, may be in an amount of 2-40% by weight of the acid polymer. Examples include Nucrel® from E. I. Du Pont de Nemours & Company and Escor® from ExxonMobil.

2) Anionic and cationic ionomers such as the acid polymers above partially or fully neutralized with organic or inorganic cations, such as zinc, sodium, lithium, magnesium, potassium, calcium, manganese, nickel, ammonium primary, secondary, tertiary), and the like. The extent of neutralization can be 1-105% in terms of stoichiometric ratio of total cation to total anion, such as 50%, 70%, or greater. Examples include Surlyn® from E. I. Du Pont de Nemours & Company and Iotek® from ExxonMobil, as well as the material compositions disclosed in U.S. application Ser. No. 09/691,284, now U.S. Pat. No. 6,653,382, U.S. application Ser. No. 10/108,793, now U.S. Publication No. 2003/0050373, U.S. application Ser. No. 10/230, 015, now U.S. Publication No. 2003/0114565, and U.S. application Ser. No. 10/269,341, now U.S. Publication No. 2003/0130434, the disclosures of which are incorporated herein by reference in their entirety.

3) Thermoplastic or thermoset (vulcanized) synthetic or natural rubbers, including polyolefins and copolymers or blends thereof, such as balata, polyethylene, polypropylene, polybutylene, isoprene rubber, ethylene-propylene rubber, ethylene-butylene rubber, ethylene-propylene-(non-conjugated diene) terpolymers; polystyrenes and copolymers thereof, such as styrene-butadiene copolymers, poly(styrene-co-maleic anhydride), acrylonitrile-butylene-styrene copolymers, poly(styrene sulfonate); and homopolymers or copolymers produced using single-site catalyst such as metallocene (grafted or non-grafted).

4) Polyphenylene oxide resins, polyacrylene ethers, or blends of polyphenylene oxide with high impact polystyrene such as Noryl® from General Electric Company.

5) Aliphatic and/or aromatic thermoplastics, including polyesters, such as ethylene methylacrylate, ethylene ethylacrylate, ethylene vinyl acetate, poly(ethylene terephthalate), poly(butylene terephthalate), poly(propylene terephthalate), poly(trimethylene terephthalate), modified poly(ethylene terephthalate)/glycol, poly(ethylene naphthalate), cellulose esters, Hytrel® from E. I. Du Pont de Nemours & Company, and Lomod® from General Electric Company; polycarbonates; polyacetals; polyimides; polyetherketones; polyamideimides; thermoplastic block copolymers (Kraton® rubbers from Shell Chemical); co-polyetheramides (Pebax® from AtoFina); and elastomers in general.

6) Vinyl resins such as polyvinyl alcohols, polyvinyl alcohol copolymers, polyvinyl chloride, block copolymers of alkenyl aromatics with vinyl aromatics and polyesteramides, copolymers of vinyl chloride with vinyl acetate, acrylic esters or vinylidene chloride.

7) Polyamides such as poly(hexamethylene adipamide) and others prepared from diamines, fatty acids, dibasic acids, and amino acids (like polycaprolactams), and blends of polyamides with Surlyn®, ethylene homopolymers or copolymers or terpolymers, etc.

8) Acrylic resins and blends of these resins with polyvinyl chloride or other elastomers.

9) Epoxy resins and silicones, including siloxanes and urethane epoxies such as those disclosed in U.S. Pat. No. 5,908,358, which is incorporated by reference herein.

10) Blends and alloys, including blends of polycarbonate and acrylonitrile-butylene-styrene, blends of polycarbonate and polyurethane, blends of polyvinyl chloride with acrylonitrile-butadiene-styrene or ethylene vinyl acetate or other elastomers, blends of thermoplastic rubbers with polyethylene or polypropylene.

Preferably, a thermoplastic composition of the present disclosure is blended with one or more thermoplastic materials listed above to form the golf ball portion. One of ordinary skill in the art would be aware of methods to blend the materials with the compositions of the disclosure.

Core Compositions

The cores of the golf balls formed according to the disclosure may be solid, semi-solid, hollow, fluid-filled, gas-filled, powder-filled, one-piece or multi-component cores. The term "semi-solid" as used herein refers to a paste, a gel, or the like. Any core material known to one of ordinary skill in that art is suitable for use in the golf balls of the disclosure. Suitable core materials include thermoset materials, such as rubber, styrene butadiene, polybutadiene, isoprene, polyisoprene, trans-isoprene, as well as thermoplastics such as ionomer resins, polyamides, and polyesters, and thermoplastic or thermoset polyurethane or polyurea elastomers. As mentioned above, the compositions of the present disclosure may be incorporated into any portion of the golf ball, including the core. For example, an inner core center or a core layer may comprise at least one of the reactive compositions disclosed herein.

The golf ball core can comprise one or more materials chosen from base rubber (natural, synthetic, or a combination thereof, such as polybutadiene), crosslinking initiator (such as dialkyl peroxide), co-crosslinking agent (such as those having di- or polyunsaturation and at least one readily extractable hydrogen in the a position to the unsaturated bonds), filler, cis-to-trans catalyst, organosulfur compound, among others. Choices for these materials are known to one skilled in the art, such as those disclosed in co-pending and co-assigned U.S. Patent Publication No. 2003/0119989, bearing Ser. No. 10/190,705, the disclosure of which is incorporated by reference herein. The core compositions can be used to form any other portions of the golf ball, such as one or more of the intermediate layers and cover layers.

Intermediate Layer Compositions

When the golf ball comprises at least one intermediate layer, such as one disposed between the cover and the core, or an inner cover layer or outer core layer, i.e., any layer(s) disposed between the inner core and the outer cover of the golf ball, this layer can be formed from any one or more thermoplastic and thermosetting materials known to those of ordinary skill. These materials can be any and all of the compositions disclosed herein, including those listed under "Composition Blends" above, as well as those disclosed in U.S. Patent Publication No. 2003/0119989 and U.S. Pat. Nos. 5,334,673 and 5,484,870, which are all incorporated by reference herein.

The intermediate layer may include homopolymers or copolymers of ethylene, propylene, butylene, butene, and/or hexene, optionally incorporating functional monomers such as acrylic and methacrylic acid, optionally being fully or partially neutralized ionomer resins and their blends, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers, and blends thereof. The intermediate layer may include at least one ionomer, such as acid-containing ethylene copolymer ionomers, including E/X/Y terpolymers where E is ethylene, X is an acrylate or methacrylate-based softening comonomer in 0-50 wt. %, and Y is acrylic or methacrylic acid in 5-35 wt. % (such as 8-35 wt. % or 8-20 wt. %).

The acid copolymers can be E/X or E/X/Y copolymers where E is ethylene, X is $\alpha,\beta$-ethylenically unsaturated carboxylic acid or a combination of two or more thereof, such as having about 3-8 carbon atoms (e.g., acrylic acid and/or methacrylic acid), and Y is a softening co-monomer, such as alkyl(meth)acrylate where the alkyl group can be linear or branched and have about 1-8 carbon atoms (e.g., n-butyl). By "softening," it is meant that the crystallinity is disrupted (the polymer is made less crystalline). X can be at least about 2 wt. % of the copolymer, such as 2-30, 3-30, 4-20, 4-25, 5-20, or 5-20 wt. % of the polymer, and Y can be present in 0-30, 3-25, 10-23, 17-40, 20-40, or 24-35 wt. % of the acid copolymer.

Soft, resilient ionomers included in this disclosure can be partially neutralized ethylene/(meth)acrylic acid/butyl (meth)acrylate copolymers having a melt index (MI) and level of neutralization that results in a melt-processible polymer that has useful physical properties. The copolymers are at least partially neutralized. At least 40%, or at least 55%, such as about 70% or about 80% of the acid moiety of the acid copolymer can be neutralized by one or more alkali metal, transition metal, or alkaline earth metal cations, such as lithium, sodium, potassium, magnesium, calcium, barium, or zinc, or a combination of such cations.

Soft, resilient, thermoplastic, "modified" ionomers are also exemplary materials for use in any one or more golf ball portions present in any construction, such as the inner center, inner core layer, intermediate core layer, outer core layer, intermediate layer, inner cover layer, intermediate cover layer, outer cover layer, and the like and equivalents thereof. The "modified" ionomer can comprise a melt blend of (a) the acid copolymers or the melt processible ionomers made therefrom as described above and (b) one or more organic acid(s) or salt(s) thereof, wherein greater than 80%, or greater than 90%, even 100% of all the acid of (a) and of (b) can be neutralized by one or more cations. Amount of cations in excess of the amount required to neutralize 100% of the acid in (a) and (b) can be used to neutralize the acid in (a) and (b). Blends with fatty acids or fatty acid salts can be used.

The organic acids or salts thereof can be added in an amount sufficient to enhance the resilience of the copolymer, and/or substantially eliminate crystallinity of the copolymer. The amount can be at least about 5% by weight of the total amount of copolymer and organic acid(s), such as at least about 15%, or at least about 20%, and up to about 50%, such as up to about 40% or up to about 35%. Alternatively, the amount of the organic acids or salts thereof can be about 25-150 phr by weight of the copolymer or blend of copolymers. The non-volatile, non-migratory organic acids can be aliphatic, mono-functional, saturated or unsaturated organic acids or salts thereof as described below, such as those having less than about 36 carbon atoms, like fatty acids (e.g., stearic acid and oleic acid) or salts thereof. Agents other than organic acids/salts may be used, as long as they also exhibit ionic array plasticizing and ethylene crystallinity suppression properties.

Processes for fatty acid/salt modifications are known in the art. The modified highly-neutralized soft, resilient acid copolymer ionomers can be produced by:

(a) melt-blending 1) ethylene, $\alpha,\beta$-ethylenically unsaturated $C_3$ to $C_8$ carboxylic acid copolymer(s) or melt-processible ionomer(s) thereof optionally having crystallinity disrupted by addition of a softening monomer or other means, with 2) sufficient amount of non-volatile, non-migratory organic acids to substantially enhance the resilience and to disrupt or remove the remaining ethylene crystallinity, and then, concurrently or subsequently; and (b) adding a sufficient amount of a cation source to increase the level of neutralization of all the acid moieties (including those in the acid copolymer and in the organic acid if the non-volatile, non-migratory organic acid is an organic acid) to the desired level.

The ethylene-acid copolymers with high levels of acid (X) are difficult to prepare in continuous polymerizers because of monomer-polymer phase separation. This difficulty can be avoided however by use of "co-solvent technology" as described in U.S. Pat. No. 5,028,674, or by employing somewhat higher pressures than those which copolymers with lower acid can be prepared. The weight ratio of X to Y in the composition can be at least about 1:20, such as at least about 1:15, or at least about 1:10, and up to about 2:1, such as up to about 1.2:1, up to about 1:1.67, up to about 1:2, or up to about 1:2.2.

The acid copolymers can be "direct" acid copolymers (containing high levels of softening monomers). As noted above, the copolymers can be partially, highly, or fully neutralized, such as at least about 40%, 45%, 50%, 55%, 70, 80%, 90%, or 100% neutralized, The MI of the acid copolymer should be sufficiently high so that the resulting neutralized resin has a measurable MI in accord with ASTM D-1238, condition E, at 190° C., using a 2160 gram weight, such as at least about 0.1 g/10 min, at least about 0.5 g/10 min, or about 1 g/10 min or greater. In highly neutralized acid copolymer, the MI of the acid copolymer base resin can be at least about 20 g/10 min, at least 40 g/10 min, at least 75 g/10 min, at least 100 g/10 min, or at least 150 g/10 min.

Specific acid-copolymers include ethylene/(meth)acrylic acid/n-butyl(meth)acrylate, ethylene/(meth)acrylic acid/iso-butyl(meth)acrylate, ethylene/(meth)acrylic acid/methyl (meth)acrylate, and ethylene/(meth)acrylic acid/ethyl(meth) acrylate terpolymers. The organic acids and salts thereof employed can be aliphatic, mono-functional (saturated, mono-unsaturated, or poly-unsaturated) organic acids, including those having fewer than 36 carbon atoms, such as 6-26, 6-18, or 6-12 carbon atoms. The salts may be any of a wide variety, including the barium, lithium, sodium, zinc, bismuth, potassium, strontium, magnesium and calcium salts of the organic acids. Non-limiting examples of the organic acids include caproic acid, caprylic acid, capric acid, lauric acid, stearic acid, behenic acid, erucic acid, oleic acid, and linoleic acid. Other fatty acids and salts thereof include any and all of those disclosed herein above, such as fatty polyacids and polymerized fatty polyacids (e.g., dimer diacids) and salts thereof. Partial esters of polyacids (i.e., having at least one un-esterified acid group) and salts thereof are also useful. When mono- and/or poly-unsaturated organic acids and/or salts thereof are used, the ionomer composition can be crosslinked into a thermoset material using reactants known to one skilled in the art, such as peroxide and/or sulfur initiators, some of which are disclosed herein. Alternatively, radiations such as electron beam radiation and others disclosed herein can be used to crosslink the ionomer composition. Optional additives include acid copolymer wax (e.g., Allied wax AC 143 believed to be an ethylene/ 16-18% acrylic acid copolymer with a number average molecular weight of 2,040), which assist in preventing reaction between the filler materials (e.g., ZnO) and the acid moiety in the ethylene copolymer, $TiO_2$ (a whitening agent), optical brighteners, etc.

Ionomers may be blended with conventional ionomeric copolymers and terpolymers, and non-ionomeric thermoplastic resins. The non-ionomeric thermoplastic resins include, without limit, thermoplastic elastomers such as polyurethane, poly-ether-ester, poly-amide-ether, polyether-urea, PEBAX (a family of block copolymers based on polyether-block-amide, commercially supplied by Atochem), styrene-butadiene-styrene (SBS) block copolymers, styrene(ethylene-butylene)-styrene block copolymers, etc., poly amide (oligomeric and polymeric), polyesters, polyolefins including PE, PP, E/P copolymers, etc., ethylene copolymers with various comonomers, such as vinyl acetate, (meth)acrylates, (meth)acrylic acid, epoxy-functionalized monomer, CO, etc., functionalized polymers with maleic anhydride grafting, epoxidization etc., elastomers such as EPDM, metallocene catalyzed PE and copolymer, ground up powders of the thermoset elastomers, etc. Such thermoplastic blends can comprise about 1% to about 99% by weight of a first thermoplastic and about 99% to about 1% by weight of a second thermoplastic.

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized. Examples of these materials are disclosed in U.S. Pat. Nos. 6,565,466 and 6,565,455, which are incorporated herein by reference. In addition, polyamides, discussed in more detail below, may also be blended with ionomers.

The intermediate layer composition may include 1-99 phr (such as 5-90 phr, 10-75 phr, or 10-50 phr) of at least one grafted metallocene catalyzed polymer and 99-1 phr (such as 95-10 phr, 90-25 phr, or 90-50 phr) of at least one ionomer. The intermediate layer composition may also include at least one ionomer and at least one primarily or fully non-ionomeric thermoplastic material, such as polyamides, polyamide blends, grafted and non-grafted metallocene catalyzed polyolefins and polyamides, polyamide/ionomer blends, polyamide/non-ionomer blends, polyphenylene ether/ionomer blends, and mixtures thereof, like those disclosed in co-pending U.S. Patent Publication No. 2003/0078348, the disclosure of which is incorporated by reference herein. One example of a polyamide/non-ionomer blend is a polyamide and non-ionic polymers produced using non-metallocene single-site catalysts. As used herein, the term "non-metallocene catalyst" or "non-metallocene single-site catalyst" refers to a single-site catalyst other than a metallocene catalyst. Examples of suitable single-site catalyzed polymers are disclosed in U.S. Pat. No. 6,476,130, of which the disclosure is incorporated by reference herein. The intermediate layer may also be formed from the compositions as disclosed in U.S. Pat. No. 5,688,191, the disclosure of which is incorporated by reference herein.

The intermediate layer may also be formed of a binding material and an interstitial material distributed in the binding material, wherein the effective material properties of the intermediate layer can be different for applied forces normal to the surface of the ball from applied forces tangential to the surface of the ball. Examples of this type of intermediate layer are disclosed in U.S. Patent Publication No. 2003/0125134, the entire disclosure of which is incorporated by reference herein. At least one intermediate layer may also be a moisture barrier layer, such as the ones described in U.S. Pat. No. 5,820,488, which is incorporated by reference herein.

Cover Compositions

Obviously, one or more of the cover layers may be formed, at least in part, from the compositions of the present disclosure. The cover layers include outer cover layer, inner cover layer, and any intermediate layer disposed between the inner and outer cover layers. The cover compositions can include one or more of the polyurethane prepolymers, polyurea prepolymers, poly(urethane-co-urea) prepolymers, polyisocyanates, curatives, and additives. Other materials useful in cover composition blends include those disclosed herein for the core and the intermediate layer.

Golf Ball Constructions

The golf ball can have any construction, including, but not limited to, one-piece, two-piece, three-piece, four-piece, and other multi-piece designs. The golf ball can have a single core, a 2-layer core, a 3-layer core, a 4-layer core, a 5-layer core, a 6-layer core, a multi-layer core, a single cover, a 2-layer cover, a 3-layer cover, a 4-layer cover, a 5-layer cover, a 6-layer cover, a multi-layer cover, a multi-layer cover, and/or one or more intermediate layers. The compositions of the disclosure may be used in any one or more of these golf ball portions, each of which may have a single-layer or multi-layer structure. As used herein, the term "multi-layer" means at least two layers.

Any of these portions can be one of a continuous layer, a discontinuous layer, a wound layer, a molded layer, a lattice network layer, a web or net, an adhesion or coupling layer, a barrier layer, a layer of uniformed or non-uniformed thickness, a layer having a plurality of discrete elements such as islands or protrusions, a solid layer, a metallic layer, a liquid-filled layer, a gel-filled portion, a powder-filled portion, a gas-filled layer, a hollow portion, or a foamed layer.

In addition, when the golf ball of the present disclosure includes an intermediate layer, this layer may be incorporated with a single or multilayer cover, a single or multi-piece core, with both a single layer cover and core, or with both a multilayer cover and a multilayer core. The intermediate layer may be an inner cover layer or outer core layer, or any other layer(s) disposed between the inner core and the outer cover of a golf ball. As with the core, the intermediate layer may also include a plurality of layers. It will be appreciated that any number or type of intermediate layers may be used, as desired.

The intermediate layer may also be a tensioned elastomeric material wound around a solid, semi-solid, hollow, fluid-filled, or powder-filled center. As used herein, the term "fluid" refers to a liquid or gas and the term "semi-solid" refers to a paste, gel, or the like. A wound layer may be described as a core layer or an intermediate layer for the purposes of the disclosure. The would layer may be formed from a composition of the disclosure having at least one hydrophobic backbone or segment for improved water resistance. The tensioned elastomeric material may also be formed of any suitable material known to those of ordinary skill in the art, such as a polybutadiene reaction product, conventional polyisoprene, solvent spun polyether urea as disclosed in U.S. Pat. No. 6,149,535, or a high tensile filament as disclosed in co-pending U.S. Patent Publication No. 2002/0160859, or coated with a binding material to improve adhere to the core and cover, as disclosed in U.S. Patent Publication No. 2002/0160862. The disclosures of the above-mentioned patents and publications are incorporated by reference herein.

While hardness gradients can be used in a golf ball to achieve certain characteristics, the present disclosure also contemplates the compositions of the disclosure being used in a golf ball with multiple cover layers having essentially the same hardness, wherein at least one of the layers can be modified in some way to alter a property that affects the performance of the ball. Such ball constructions are disclosed in co-pending U.S. Application Publication No. 2003/0232666 and incorporated by reference herein. Other non-limiting golf ball constructions include those described in U.S. Pat. Nos. 6,548,618, 6,149,535, 6,056,842, 5,981,658, 5,981,654, 5,965,669, 5,919,100, 5,885,172, 5,803,831, 5,713,801, 5,688,191, as well as in U.S. Application Publication Nos. 2002/0025862 and 2001/0009310, the disclosures of which are incorporated by reference herein.

Methods of Forming Layers

The golf balls of the disclosure may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference.

The compositions of the disclosure may be formed over the core using a combination of casting and compression molding. For example, U.S. Pat. No. 5,733,428, the disclosure of which is hereby incorporated by reference, discloses a suitable method for forming a polyurethane cover on a golf ball core. Because this method relates to the use of both casting thermosetting and thermoplastic material as the golf ball cover, wherein the cover is formed around the core by mixing and introducing the material in mold halves, other reactive liquid compositions such as polyurea compositions may also be used employing the same casting process. Once the polyurea composition is mixed, an exothermic reaction commences and continues until the material is solidified around the core. Viscosity can be measured over time, so that the subsequent steps of filling each mold half, introducing the core into one half and closing the mold can be timed in order to center the core and achieve overall uniformity. A suitable viscosity range for molding the reactive composition can be about 2,000 cP, such as about 8,000 cP.

For illustration, the prepolymer and curative can be mixed in a motorized mixer inside a mixing head by metering amounts of the curative and prepolymer through the feed lines. Top preheated mold halves can be filled and placed in fixture units using centering pins moving into apertures in each mold half. At a later time, the cavity of a bottom mold half, or the cavities of a series of bottom mold halves, can be filled with similar mixture amounts as used in the top mold halves. After the reacting materials have resided in top mold halves for about 40-100 seconds, such as about 50-90 seconds, about 60-80 seconds, or about 70-80 seconds, golf ball subassemblies such as cores can be lowered at a controlled speed into the reacting mixture. Ball cups can hold the subassemblies by applying reduced pressure (or partial vacuum). Upon location of the subassemblies in the top mold halves after gelling for about 4-12 seconds, such as about 5-10 seconds, the vacuum can be released to release the subassembly. The top mold halves can then be removed from the centering fixture unit, inverted and mated with the bottom mold halves having a selected quantity of reacting composition gelling therein. Other non-limiting molding techniques include those disclosed in U.S. Pat. Nos. 5,006,297 and 5,334,673, and others known to those skilled in the art, which are incorporated herein by reference.

Injection molding and/or compression molding may be used. For example, half-shells of thermoplastic compositions may be made by injection molding or compression molding in conventional half-shell molds, then placed about the pre-formed subassembly within a compression molding machine, and compression molded at about 250-400° F. The molded balls can then be cooled in the mold and removed when the molded layer is hard enough to be handled without deforming. Prior to forming the layer, the subassembly may be surface treated to increase the adhesion between the subassembly and the molded layer. Examples of surface treatment techniques can be found in U.S. Pat. No. 6,315,915, which are incorporated by reference.

Dimples

The use of various dimple patterns and profiles provides a relatively effective way to modify the aerodynamic characteristics of a golf ball. As such, the manner in which the dimples are arranged on the surface of the ball can be by any available method. Non-limiting dimple patterns include icosahedral (U.S. Pat. No. 4,560,168), octahedral (U.S. Pat. No. 4,960,281), phyllotactic (U.S. Pat. No. 6,338,684), and Archimedean (U.S. Pat. No. 6,705,959) with non-linear parting line, including truncated octahedron, great rhombcuboctahedron, truncated dodecahedron, and great rhombicosidodecahedron. The dimples can be circular and/or non-circular, such as amorphous (U.S. Pat. No. 6,409,615), have tubular lattice pattern (U.S. Pat. No. 6,290,615), having catenary curvature (U.S. Patent Publication No. 2003/0114255), have varying sizes (U.S. Pat. Nos. 6,358,161 and 6,213,898), and/or have high percentage of surface coverage (U.S. Pat. Nos. 5,562,552, 5,575,477, 5,957,787, 5,249,804, and 4,925,193). These disclosures are all incorporated by reference herein.

Golf Ball Post-Processing

The golf balls of the present disclosure may be painted, coated, or surface treated for further advantages. The use of light stable reactive compositions may obviate the need for certain post-processing such as applying pigmented coating or clear topcoat, thus reducing cost and production time, reducing use of volatile organic compounds (VOCs), and improving labor efficiency. Toning the golf ball cover with titanium dioxide can enhance its whiteness. The cover can be subjected to such surface treatment as corona treatment, plasma treatment, UV treatment, flame treatment, electron beam treatment, and/or applying one or more layers of clear paint, which optionally may contain one or more fluorescent whitening agents. Trademarks and/or other indicia may be stamped, i.e., pad-printed, on the cover, and then covered with one or more clear coats for protection and glossy look. UV treatment can be used to cure UV-curable topcoat and/or ink layer (used as a paint layer or a discrete marking tool for logo and indicia), as disclosed in, for example, U.S. Pat. Nos. 6,500,495, 6,248,804, and 6,099,415. One or more portions of the golf ball may be subjected to dye sublimation, as disclosed in U.S. Patent Publication No. 2003/0106442, and/or laser marking or ablation, as disclosed in U.S. Pat. Nos. 5,248,878 and 6,462,303. The disclosures of these patents and publications are incorporated by reference herein.

Golf Ball Properties

Physical properties of each golf ball portion, such as hardness, modulus, compression, and thickness/diameter, can affect play characteristics such as spin, initial velocity, and feel. It should be understood that the ranges herein are meant to be intermixed with one another, i.e., the low end of one range may be combined with the high end of another range.

Component Dimensions

Golf balls and portions thereof of the present disclosure can have any dimensions, i.e., thickness and/or diameter. While USGA specifications limit the size of a competition golf ball to 1.68 inches or greater in diameter, golf balls of any sizes smaller or larger can be used for leisure play. As such, the golf ball diameter can be 1.68-1.8 inches, 1.68-1.76 inches, 1.68-1.74 inches, or 1.7-1.95 inches. Golf ball subassemblies comprising the core and one or more intermediate layers can have a diameter of 80-98% of that of the finished ball. The core may have a diameter of 0.09-1.65 inches, such as 1.2-1.63 inches, 1.3-1.6 inches, 1.4-1.6 inches, 1.5-1.6 inches, or 1.55-1.65 inches. Alternatively, the core diameter can be 1.54 inches or greater, such as 1.55 inches or greater, or 1.59 inches or greater, and 1.64 inches or less. The core diameter can be 90-98% of the ball diameter, such as 94-96%. When the core comprises an inner center and at least one outer core layer, the inner center can have a diameter of 0.9 inches or greater, such as 0.09-1.2 inches or 0.095-1.1 inches, and the outer core layer can have a thickness of 0.13 inches or greater, such as 0.1-0.8 inches, or 0.2 or less, such as 0.12-0.01 inches or 0.1-0.03 inches. Two, three, four, or more of outer core layers of different thickness such as the ranges above may be used in combination.

Thickness of the intermediate layer may vary widely, because it can be any one of a number of different layers, e.g., outer core layer, inner cover layer, wound layer, and/or moisture/vapor barrier layer. The thickness of the intermediate layer can be 0.3 inches or less, such as 0.1 inches, 0.09 inches, 0.06 inches, 0.05 inches, or less, and can be 0.002 inches or greater, such as 0.01 inches or greater. The intermediate layer thickness can be 0.01-0.045 inches, 0.02-0.04 inches, 0.025-0.035 inches, 0.03-0.035 inches. Two, three, four, or more of intermediate layers of different thickness such as the ranges above may be used in combination. The core and intermediate layer(s) together form an inner ball, which can have a diameter of 1.48 inches or greater, such as 1.5 inches, 1.52 inches, or greater, or 1.7 inches or less, such as 1.66 inches or less.

The cover thickness can be 0.35 inches or less, such as 0.12 inches, 0.1 inches, 0.07 inches, or 0.05 inches or less, and 0.01 inches or greater, such as 0.02 inches or greater. The cover thickness can be 0.02-0.05 inches, 0.02-0.045 inches, or 0.025-0.04 inches, such as about 0.03 inches. Thickness ratio of the intermediate layer (e.g., as an inner cover layer) to the cover (e.g., as an outer cover layer) can be 10 or less, such as 3 or less, or 1 or less.

Hardness

Golf balls can comprise layers of different hardness, e.g., hardness gradients, to achieve desired performance characteristics. The hardness of any two adjacent or adjoined layers can be the same or different. One of ordinary skill in the art understands that there is a difference between "material hardness" and "hardness, as measured directly on a golf ball." Material hardness is defined by the procedure set forth in ASTM-D2240 and generally involves measuring the hardness of a flat "slab" or "button" formed of the material in question. Hardness, when measured directly on a golf ball (or other spherical surface) is influenced by a number of factors including, but not limited to, ball construction (i.e., core type, number of core and/or cover layers, etc.), ball (or sphere) diameter, and the material composition of adjacent layers, and can therefore be different from the material hardness. The two hardness measurements are not linearly related and, therefore, cannot easily be correlated.

The cores of the present disclosure may have varying hardness depending at least in part on the golf ball construction. The core hardness as measured on a formed sphere can be at least 15 Shore A, such as at least 30 Shore A, about 50 Shore A to about 90 Shore D, about 80 Shore D or less, about 30-65 Shore D, or about 35-60 Shore D. The intermediate layer(s) of the present disclosure may also vary in hardness, depending at least in part on the ball construction. The hardness of the intermediate layer can be about 30 Shore D or greater, such as about 50 Shore D or greater, about 55 Shore D or greater, or about 65 Shore D or greater, and can be about 90 Shore D or less, such as about 80 Shore D or less or about 70 Shore D or less, or about 55-65 Shore D. The intermediate layer can be harder than the core layer, having a ratio of hardness of about 2 or less, such as about 1.8 or less, or about 1.3 or less. The intermediate layer can be different (i.e., harder or softer) than the core layer with a hardness difference of at least 1 unit in Shore A, C, or D, such as at least 3 units, or at least 5 units, or at least 8 units, or at least 10 units, or less than 20 units, or less than 10 units, or less than 5 units.

The hardness of the cover layer may vary, depending at least in part on the construction and desired characteristics of the golf ball. On the Shore C scale, the cover layer may have a hardness of about 70 Shore C or greater, such as about 80 Shore C or greater, and about 95 Shore C or less, such as about 90 Shore C or less.

The difference or ratio of hardness between the cover layer and the inner ball can be manipulated to influence the aerodynamics and/or spin characteristics of a ball. When the intermediate layer (such as inner cover layer) is at least harder than the cover layer (such as outer cover layer), or intended to be the hardest portion in the ball, e.g., about 50-75 Shore D, the cover layer may have a material hardness of about 20 Shore D or greater, such as about 25 Shore D or greater, or about 30 Shore D or greater, or the cover hardness as measured on the ball can be about 30 Shore D or greater, such as about 30-70 Shore D, about 40-65 Shore D, about 40-55 Shore D, less than about 45 Shore D, less than about 40 Shore D, about 25-40 Shore D, or about 30-40 Shore D. The material hardness ratio of softer layer to harder layer can be about 0.8 or less, such as about 0.75, about 0.7, about 0.5, about 0.45, or less. When the intermediate layer and the cover layer have substantially the same hardness, the material hardness ratio can be about 0.9 or greater, and up to 1.0, and the cover layer may have a hardness of about 55-65 Shore D. Alternatively, the cover layer can be harder than the intermediate layer, with the hardness ratio of the cover layer to the intermediate layer being about 1.33 or less, such as about 1.14 or less.

The core may be softer than the cover. For example, the cover hardness may be about 50-80 Shore D, and the core hardness may be about 30-50 Shore D, with the hardness ratio being about 1.75 or less, such as about 1.55 or less or about 1.25 or less.

Compression

As used herein, the terms "Atti compression" or "compression" refers to the deflection of an object or material relative to the deflection of a calibrated spring, as measured with an Atti Compression Gauge available from Atti Engineering Corp. of Union City, N.J. Compression values of the golf ball or portion thereof can be at least in part dependent on the diameter. Atti compression of the core or portion thereof can be 80 or less, such as 75 or less, 40-80, 50-70, 50 or less, 25 or less, 20 or less, 10 or less, or 0, or below the measurable limit of the Atti Compression Gauge. The core or portion thereof may have a Soft Center Deflection Index (SCDI) compression of 160 or less, such as 40-160 or 60-120. The golf ball can have an Atti compression of 40 or greater, such as 55 or greater, 50-120, 60-120, 50-120, 60-100, 75-95, or 80-95.

Initial Velocity and COR

USGA limits the initial velocity of a golf ball up to 250±5 ft/s. The initial velocity of the golf ball of the present disclosure can be 245-255 ft/s, or greater, such as 250 ft/s or greater, 253-254 ft/s, or about 255 ft/s. Coefficient of restitution (COR) of a ball or a portion thereof is measured by taking the ratio of the outbound or rebound velocity to the inbound or incoming velocity (such as, but not limited to, 125 ft/s). COR can be maximized so that the initial velocity is contained with a certain limit. COR of the golf ball can be 0.7 or greater at an inbound velocity of 125 ft/s, such as 0.75 or greater, 0.78 or greater, 0.8 or greater, and up to about 0.85, such as 0.8-0.815. The core and/or the inner ball can have a COR of 0.78 or more, such as 0.79 or greater.

Spin Rate

Spin rate of a golf ball can at least in part be dependent on construction, and can vary off different golf clubs (e.g., driver, woods, irons, wedges, etc.). In a multi-layer (e.g., 2-piece, 3-piece, 4-piece, wound) ball, the driver spin rate can be 2,700 rpm or greater, such as 2,700-3,300 rpm, 2,800-3,500 rpm, 2,900-3,400 rpm, or less than 2,700 rpm. Non-limiting measurements of spin rate are disclosed in U.S. Pat. Nos. 6,500,073, 6,488,591, 6,286,364, and 6,241,622, which are incorporated by reference herein.

Flexural Modulus

As used herein, the term "flexural modulus" or "modulus" refers to the ratio of stress to strain within the elastic limit (measured in flexural mode) of a material, indicates the bending stiffness of the material, and is similar to tensile modulus. Flexural modulus, typically reported in Pascal ("Pa") or pounds per square inch ("psi"), is measured in accordance to ASTM D6272-02.

The intermediate layer (e.g., outer core layer, inner cover layer) can have any flexural modulus of 500-500,000 psi, such as 1,000-250,000 psi or 2,000-200,000 psi. The flexural modulus of the cover layer (e.g., outer cover layer, inner cover layer, intermediate cover layer) can be 2,000 psi or greater, such as 5,000 psi or greater, 10,000-150,000 psi, 15,000-120,000 psi, 18,000-110,000 psi, 100,000 psi or less, 80,000 or less, 70,000 psi or less, 10,000-70,000 psi, 12,000-60,000 psi, or 14,000-50,000 psi.

The cover layer (e.g., inner cover, intermediate cover, outer cover layers) can have any flexural modulus, such as the numerical ranges illustrated for intermediate layer above. When the cover layer has a hardness of 50-60 Shore D, the flexural modulus can be 55,000-65,000 psi. In multilayer covers, the cover layers can have substantially the same hardness but different flexural moduli. The difference in flexural modulus between any two cover layers can be 10,000 psi or less, 5,000 psi or less, or 500 psi or greater, such as 1,000-25,00 psi. The ratio in flexural modulus of the intermediate layer to the cover layer can be 0.003-50, such as 0.006-4.5 or 0.11-4.5.

Specific Gravity

The specific gravity of a cover or intermediate layer can be at least 0.7, such as 0.8 or greater, 0.9 or greater, 1 or greater, 1.05 or greater, or 1.1 or greater. The core may have a specific gravity of 1 or greater, such as 1.05 or greater. In one example, the intermediate layer has a specific gravity of 0.9 or greater and the cover has a specific gravity of 0.95 or greater. In another example, the core specific gravity is 1.1 or greater and the cover specific gravity is about 0.95 or greater.

Adhesion Strength

The adhesion, or peel, strength of the compositions as presently disclosed can be 5 lb/in or greater, such as 10 lb/in or greater, 20 lb/in or greater, 24 lb/in or greater, or 26 lb/in or greater, or 30 lb/in or less, such as 25 lb/in, 20 lb/in, or less. Adhesion strength of a golf ball layer can be assessed using cross-hatch test (i.e., cutting the material into small pieces in mutually perpendicular directions, applying a piece of adhesive cellophane tape over the material, rapidly pulling off the tape, and counting the number of pieces removed) and repeated ball impact test (i.e., subjecting the finished golf ball to repeated impact and visually examining the coating film for peeling), as disclosed in U.S. Pat. No. 5,316,730, which is incorporated by reference herein.

Water Resistance

Water resistance of a golf ball portion can be reflected by absorption (i.e., weight gain following a period of exposure at a specific temperature and humidity differential) and transmission (i.e., water vapor transmission rate (WVTR) according to ASTM E96-00, which refers to the mass of water vapor that diffuses into a material of a given thickness per unit area per unit time at a specific temperature and humidity differential). The golf ball or a portion thereof can have a weight gain of 0.15 g or less, such as 0.13 g, 0.09 g, 0.06 g, 0.03 g, or less, and a diameter gain of 0.001 inches or less, over seven weeks at 100% relative humidity and 72° F. The golf ball portion such as the outer or inner cover layer can have a WVTR of 2 g/(m$^2$× day) or less, such as 0.45-0.95 g/(m$^2$× day), 0.01-0.9 g/(m$^2$× day), or less, at 38° C. and 90% relative humidity.

Shear/Cut Resistance

The shear/cut resistance of a golf ball portion (e.g., inner or outer cover layer) may be determined using a shear test having a scale from 1 to 6 in damage and appearance. The cover layer can have a number of 3, 2, 1, or less on the shear test scale.

Light Stability

Light stability (such as to UV irradiance power of 1.00 W/m$^2$/nm) of the cover layer (e.g., a visible layer such as an outer cover layer or an inner/intermediate cover layer having transparent or translucent outer cover layers) may be quantified using difference in yellowness index (? YI, according to ASTM D1925) before and after a predetermined period (such as 120 hrs) of exposure. The ? YI of the cover layer can be 10 or less, such as 6, 4, 2, 1, or less. Difference in yellow-to-blue chroma dimension before and after the exposure (? b*) can also quantify light stability. The ? b* of the cover layer can be 4 or less, such as 3, 2, 1, or less.

EXAMPLES

The following non-limiting examples are included herein merely for illustration, and are not to be construed as limiting the scope of the present disclosure.

Example 1

Saturated Polyurethane Golf Ball Cover

Golf balls comprising a saturated polyurethane cover were made following the teachings of U.S. Pat. No. 5,733,428. Cover composition and properties of cover and ball are listed below.

TABLE 1

GOLF BALLS WITH SATURATED
POLYURETHANE COVER

| Cover Composition | |
|---|---|
| H$_{12}$MDI Prepolymer* | 458.73 g |
| 1,4-Butanediol | 42.75 g |
| HCC-19584 Color Dispersion** | 17.55 g |

TABLE 1-continued

GOLF BALLS WITH SATURATED POLYURETHANE COVER

Physical Properties

| | |
|---|---|
| Cover Shore D Hardness | 54 |
| Ball Weight (g) | 45.58 |
| Ball Compression | 89 |
| Cover Shear Resistance | Good |
| Cover Color Stability | Comparable to Surlyn ® |

*Reaction product of 4,4'-dicyclohexylmethane diisocyanate and PTMEG with Mw of 2,000.
**A white-blue color dispersion manufactured by the PolyOne Corporation These molded balls were compared to golf balls having aromatic polyurethane or Surlyn® covers by subjecting them to a QUV test in accordance with ASTM G 53-88 "Standard Practice for Operating Light and Water-Exposure Apparatus (Fluorescent UV-Condensation Type) for Exposure of Nonmetallic Materials." Six balls of each variety were placed in golf ball holders and placed into the sample rack of a Q-PANEL model OUV/SER Accelerated Weathering Tester (Q-Panel Lab Products of Cleveland, Ohio). Each ball at its closes point was about 1.75 inches away from an UVA-340 bulb. The weathering tester was cycled every four hours between Condition 1 (UV on at irradiance power of 1.00 W/m$^2$/nm, water bath 50° C.) and Condition 2 (UV off, water bath 40° C.). Color was measured before weathering and after each time cycle using a BYK-Gardner Model TCS II sphere type Spectrophotometer with a 25-mm port. A D65/10° illumination was used in specular reflectance included mode. Test results are tabulated in Table 3, where ? L* is difference in light-to-dark dimension, ? a* is difference in red-to-green chroma dimension, ? C* is the combined chroma difference (a* and b*), ? H* is total hue difference (excluding effects of luminescence and saturation), ? E* is total color difference, and ? WI (ASTM E313) is difference in whiteness index.

TABLE 2

UV STABILITY DATA

| Duration | Sample Golf Balls | ? L* | ? a* | ? b* | ? C* | ? H* | ? E* | ? WI | ? YI |
|---|---|---|---|---|---|---|---|---|---|
| 24 hours | Aliphatic PU Cover | −0.21 | −0.30 | 1.54 | −1.26 | −0.94 | 1.58 | −9.07 | 2.99 |
| | Aromatic PU Cover | −17.27 | 11.36 | 46.14 | 47.31 | 4.36 | 50.56 | −142.35 | 93.80 |
| | Surlyn ® Cover | −0.39 | −0.25 | 0.91 | −0.76 | −0.55 | 1.02 | −6.19 | 1.69 |
| 48 hours | Aliphatic PU Cover | −0.48 | −0.37 | 2.54 | −2.02 | −1.59 | 2.61 | −15.16 | 4.98 |
| | Aromatic PU Cover | −23.46 | 15.01 | 42.75 | 45.18 | 3.44 | 51.02 | −127.75 | 98.96 |
| | Surlyn ® Cover | −0.54 | −0.39 | 1.43 | −1.18 | −0.91 | 1.58 | −9.50 | 2.66 |
| 120 hours | Aliphatic PU Cover | −0.92 | −0.46 | 5.87 | −3.01 | −5.06 | 5.96 | −33.72 | 11.68 |
| | Aromatic PU Cover | −30.06 | 16.80 | 33.37 | 37.29 | 2.11 | 47.95 | −107.12 | 94.42 |
| | Surlyn ® Cover | −0.99 | −0.85 | 4.06 | −2.91 | −2.96 | 4.26 | −24.88 | 7.73 |

Example 2

Diol-Cured Polyurea Cover

Golf balls were made having a polyurea cover comprising a prepolymer of H$_{12}$MDI and polyoxyalkylene diamine (M$_w$ 2,000), cured with 1,4-butanediol. Properties and performance results in comparison with aliphatic polyurethane covered golf balls of Example 1 above are listed below.

TABLE 3

GOLF BALL WITH DIOL-CURED POLYUREA COVER

| Ball Properties | Ex. 1 Covered Ball | Ex. 2 Covered Ball |
|---|---|---|
| Compression | 86 | 86 |
| COR @ 125 ft/sec | 0.807 | 0.805 |
| Cold Crack Test, 5° F. | no failure | no failure |
| ΔYI (5 Days QUV) | 3.2 | 0.8 |
| Δb* (5 Days QUV) | 1.7 | 0.4 |
| Shear Test | 3 | 2 |

Example 3

Diamine-Cured Polyurea Cover

Golf balls were made having a polyurea cover comprising a prepolymer of H$_{12}$MDI and polyoxyalkylene diamine (M$_w$ 2,000), cured with Clearlink® 1000. Properties and performance results as compared to aliphatic polyurethane covered golf balls of Example 1 are listed below.

TABLE 4

GOLF BALL WITH DIAMINE-CURED POLYUREA COVER

| Properties/Performance | Ex. 1 Covered Ball | Ex. 3 Covered Ball |
|---|---|---|
| Compression | 89 | 92 |
| COR @ 125 ft/s | 0.807 | 0.815 |
| Cold Crack at 5° F. | no failure | no failure |
| ΔYI (5 Days QUV) | 4.3 | 0.6 |
| Δb* (5 Days QUV) | 2.4 | 0.3 |
| Shear Test | 3 | 1 |

Example 4

H$_{12}$MDI Amine-Terminated Compound Urea Cured with a Diamine

Golf balls were made having a polyurea cover comprising a prepolymer of H$_{12}$MDI and amine-terminated polybutadiene, cured with N,N'-diisopropyl-isophorone diamine (Jefflink® 754 by Huntsman Corporation). These balls, in comparison with aliphatic polyurethane covered balls of Example 1 above, had better shear resistance, improved light stability, and higher COR.

Example 5

Moisture Resistance of Polyurethane-Covered Golf Balls

Golf balls were made having a cover comprising a prepolymer of MDI and hydroxy-terminated polybutadiene, cured with 4,4'-bis(sec-butylamino)diphenylmethane (Unilink® 4200 by Huntsman Corporation), and compared to aliphatic polyurethane covered golf balls of Example 1 above. The covers were molded over wound cores of 1.58 inches in diameter, and finished with a conventional coating. The golf balls were incubated at 50% relative humidity and 72° F. for one week, and then at 100% relative humidity and 72° F. for 7 weeks. Weight and size gains at different time points are listed below.

TABLE 5

WEIGHT & SIZE GAINS IN POLYURETHANE-COVERED GOLF BALLS

| Balls | 4 days | 1 week | 12 days | 18 days | 3 weeks | 4 weeks | 5 weeks | 7 weeks |
|---|---|---|---|---|---|---|---|---|
| Ex. 1 | +0.06 g | +0.08 g | +0.09 g | +0.13 g | +0.13 g | +0.13 g | +0.15 g | +0.18 g |
| Covered | 0 | +0.001 in. | +0.001 in. | +0.001 in. | +0.001 in. | +0.001 in. | +0.001 in. | +0.001 in. |
| Ex. 5 | +0.01 g | +0.01 g | +0.01 g | +0.02 g | +0.02 g | +0.02 g | +0.02 g | +0.03 g |
| Covered | 0 | 0 | 0 | 0 | 0 | 0 | 0 | 0 |

Example 6

Moisture Resistance of Polyurea-Covered Golf Balls

Golf balls were made having a solid core, an intermediate layer, and a polyurea cover comprising a prepolymer of $H_{12}$MDI and amine-terminated polybutadiene, cured with Unilink® 4200 and/or Jefflink® 754, and compared to golf balls having the cover of Example 5 above, using the same incubation procedure. The polyarea-covered golf balls had a weight gain of 75-80% less than the polyurethane-covered golf balls, and no size gain after 7 weeks.

Example 7

Polyamide Polyurea Compositions

Golf balls were made having polyurea covers comprising prepolymers of $H_{12}$MDI and diamino polyamides (reaction products of Jeffamine® D2000 and adipic acid or dimer diacid), cured with Clearlink® 1000. Properties and performance results in comparison with aromatic polyurethane covered control golf balls are listed below.

TABLE 6

POLYAMIDE POLYUREA GOLF BALL COVERS

| | | Control | Example 7A | Example 7B |
|---|---|---|---|---|
| Formulations | Isocyanate | MDI | $H_{12}$MDI | $H_{12}$MDI |
| | Telechelic | PTMEG with $M_w$ of 2,000 | Diamino Polyamide A[1] | Diamino Polyamide B[2] |
| | Curative | Ethacure® 300[3] | Clearlink® 1000 | Clearlink® 1000 |
| Ball Diameter (in.) | Pole | 1.682 | 1.689 | 1.688 |
| | Equator | 1.682 | 1.685 | 1.684 |
| Weight Average (oz.) | | 1.610 | 1.608 | 1.603 |
| Compression | | 84 | 85 | 85 |
| Cover Hardness | Shore C | 80 | 77 | 78 |
| | Shore D | 59 | 56 | 58 |
| COR @ 125 ft/s | | 0.810 | 0.808 | 0.806 |
| Shear Test | | 1 | 3 | 2 |
| Durability @ 400 hits | | No failures | No failures | No failures |
| Cold Crack Test @ 5° F., 15 hits | | No failures | No failures | No failures |
| Light Stability (8 Days QUV) | | Yellowing | No Change | No Change |

[1] Reaction product of Jeffamine® D2000 and adipic acid.
[2] Reaction product of Jeffamine® D2000 and Empol® 1008 (dimer diacid from Monson of Leominster, MA).
[3] Dimethylthiotoluene diamine from Albemarle Corporation of Baton Rouge, LA.

Golf balls were made having polyurea covers comprising prepolymers of $H_{12}$MDI and diamino polyamides (reaction products of adipic acid and blends of Jeffamine® D400 and D2000), cured with 1.02 eq. of Clearlink® 1000. Properties and performance results in comparison with aromatic polyurethane covered control golf balls are listed below.

TABLE 7

POLYAMIDE POLYUREA GOLF BALL COVERS

| | | Control | Example 7C | Example 7D |
|---|---|---|---|---|
| Formulations | Isocyanate | MDI | $H_{12}$MDI | $H_{12}$MDI |
| | Telechelic | PTMEG with $M_w$ of 2,000 | Diamino Polyamide C[1] | Diamino Polyamide D[2] |
| | Curative | Ethacure® 300 | Clearlink® 1000 | Clearlink® 1000 |
| Ball Diameter (in.) | Pole | 1.683 | 1.686 | 1.685 |
| | Equator | 1.683 | 1.683 | 1.683 |
| Weight Average (oz.) | | 1.609 | 1.599 | 1.600 |
| Compression | | 87 | 89 | 90 |
| Cover Hardness | Shore C | 82 | 86 | 84 |
| | Shore D | 58 | 62 | 60 |
| Material Hardness (Shore D) | | 48 | 52 | 51 |
| COR @ 125 ft/s | | 0.810 | 0.808 | 0.808 |
| Shear Test | | 1.2 | 4.8 | 6 |
| Durability @ 400 hits | | No failures | 1 failure | No failures |
| Cold Crack Test @ 5° F., 15 hits | | No failures | 4 cracked | No failures |
| Light Stability (8 Days QUV) | | Yellowing | No Change | No Change |

[1] 60% D400, 40% D2000, % NCO 6.4%.
[2] 40% D400, 60% D2000, % NCO 6.95%.

Example 8

Polyamide Polyurethane Compositions

Golf balls were made having polyurethane covers comprising prepolymers of $H_{12}$MDI and polyamide diol with caprolactone and 7% Desmophen® N, cured with Clearlink® 1000. Properties and performance results in comparison with aromatic polyurethane covered control golf balls are listed below.

TABLE 8

POLYAMIDE POLYURETHANE GOLF BALL COVERS

| | | Control | Example 8C |
|---|---|---|---|
| Formulations | Isocyanate | MDI | $H_{12}$MDI |
| | Telechelic | PTMEG with $M_w$ of 2,000 | Polyamide diol with caprolactone and 7% Desmophen® N[1] |
| | Curative | Ethacure® 300 | Clearlink® 1000 |
| Compression | | 87 | 89 |
| Cover Hardness | Shore C | 82 | 84 |
| | Shore D | 59 | 60 |
| Material Hardness (Shore D) | | 48 | 46 |
| COR @ 125 ft/s | | 0.808 | 0.806 |
| Shear Test | | 1.5 | 2.7 |
| Light Stability (8 Days QUV) | | Yellowing | No Change |
| Durability @ 400 hits | | No failures | No failures |
| Cold Crack Test @ 5° F., 15 hits | | No failures | No failures |

Example 9

Aminoalcohol Telechelic Based Reactive Compositions

Golf balls were made having covers comprising prepolymers of uretdione of HDI or $H_{12}$MDI and aminoalcohol telechelics, cured with Ethacure® 100 LC or Clearlink® 1000. Properties and performance results in comparison with aromatic polyurethane covered control golf balls are listed below.

TABLE 9

AMINOALCOHOL TELECHELIC BASED GOLF BALL COVERS

| | | Control | Example 8A | Example 8B |
|---|---|---|---|---|
| Formulations | Isocyanate | MDI | Uretdione of HDI | $H_{12}$MDI |
| | Telechelic | PTMEG with $M_w$ of 2,000 | Aminoalcohol Telechelic A[1] | Aminoalcohol Telechelic B[2] |
| | Curative | Ethacure® 300 | Ethacure® 100 LC | Clearlink® 1000 |
| Material Hardness (Shore D) | | 48 | 49 | 51 |
| Compression | | 86 | 87 | 88 |
| COR @ 125 ft/s | | 0.807 | 0.808 | 0.809 |
| Shear Test | | 2 | 2.2 | 2.8 |
| Durability @ 400 hits | | No failures | No failures | No failures |
| ΔYI (8 Days QUV) | | 65.2 | 25.6 | 1.7 |
| Δb* (8 Days QUV) | | 24.9 | 14.5 | 0.9 |

[1] % NCO at 8.5%.
[2] % NCO at 7.5%.

Golf balls were made having covers comprising prepolymer (10% NCO) of uretdione of HDI and aminoalcohol telechelics, cured with a blend of 0.825 eq. Clearlink® 1000 and 0.125 eq. Desmophen® 1520 (from Bayer Corp.). Properties and performance results in comparison with polyurea covered control golf balls are listed below.

TABLE 10

AMINOALCOHOL TELECHELIC BASED GOLF BALL COVERS

| | | Control | Example 8C |
|---|---|---|---|
| Formulations | Isocyanate Telechelic | $H_{12}MDI$ Polyoxyalkylene diamine ($M_w$ of 2,000) | Uretdione of HDI Aminoalcohol Telechelic C[1] |
| | Curative | Clearlink ® 1000 | Clearlink ® 1000 & Desmophen ® 1520 |
| Compression | | 90 | 93 |
| Cover Hardness | Shore C Shore D | 84 58 | 90 60 |
| COR @ 125 ft/s | | 0.805 | 0.805 |
| Shear Test | | 2 | 1 |
| ΔYI (8 Days QUV) | | 0.9 | 4.2 |
| Δb* (8 Days QUV) | | 0.5 | 2.4 |
| Heat Resistance (8 Days QUV) | | No cracks or wrinkles | No cracks or wrinkles |

[1] % NCO is 10%.

Example 10

Amorphous Polycarbonate Telechelic Based Reactive Compositions

Golf balls were made having polyurethane covers comprising prepolymers of $H_{12}MDI$ and amorphous polycarbonate polyols, cured with 1,4-butanediol. Properties and performance results in comparison with polyurea covered control golf balls are listed below.

TABLE 11

AMORPHOUS POLYCARBONATE TELECHELIC BASED GOLF BALL COVERS

| | | Control | Example 8B |
|---|---|---|---|
| Formulations | Isocyanate Telechelic | $H_{12}MDI$ Polyoxyalkylene diamine ($M_w$ of 2,000) | $H_{12}MDI$ Poly(hexamethylene carbonate-block-trioxyethylene carbonate-block-hexamethylene carbonate)diol |
| | Curative | 1,4-butanediol | 1,4-butanediol |
| Material Hardness (Shore D) | | 48 | 47 |
| Compression | | 85 | 85 |
| COR @ 125 ft/s | | 0.806 | 0.801 |
| Shear Test | | 1 | 2 |
| Durability @ 400 hits | | No failures | No failures |
| ΔYI (8 Days QUV) | | 0.8 | 1.2 |
| Δb* (8 Days QUV) | | 0.4 | 0.6 |

The forgoing disclosure and the claims below are not to be limited in scope by the illustrative examples presented herein. Any equivalent examples are intended to be within the scope of this disclosure. For example, while disclosure is directed mainly to compositions for use in golf balls, the same compositions may be used in other golf equipment such as putters (e.g., as inserts or in the grip), golf clubs and portions thereof (e.g., heads, shafts, or grips), golf shoes and portions thereof, and golf bags and portions thereof. Indeed, various modifications of the disclosure in addition to those shown and described herein will become apparent to those skilled in the art from the foregoing description. Such modifications are also intended to fall within the scope of the appended claims. Disclosures of relevant subject matters in all patents, applications, and publications as cited in the foregoing disclosure are expressly incorporate herein by reference in their entirety.

We claim:

1. A golf ball comprising a core, an inner cover layer, and an outer cover layer, the outer cover layer being formed from a polyurea comprising:

a prepolymer comprising:

an aliphatic isocyanate mixture comprising dimerized uretdione of HDI and trimerized isocyanurate of HDI;

a first amount of modified polyoxypropylene diamine having a formula:

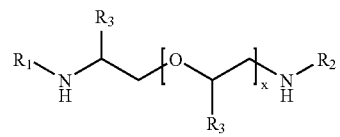

where x=1-70; $R_1$ and $R_2$ each independently=a $C_{1-20}$ alkyl group, phenyl, or a mixture thereof; and $R_3$=$CH_3$; and a caprolactone; and a curative comprising a mixture of 3,5-diethyl-2,4-toluenediamine and 3,5-diethyl-2,6-toluenediamine.

2. The golf ball of claim 1, wherein the aliphatic isocyanate mixture further comprises trimerized biuret of HDI.

3. The golf ball of claim 1, wherein the core comprises a solid center and an outer core layer.

4. The golf ball of claim 3, wherein the center has an outer diameter of 0.095 inches to 1.1 inches.

5. The golf ball of claim 1, wherein the core has an Atti compression of 75 or less.

6. The golf ball of claim 1, wherein the outer cover layer has a material hardness of 70 Shore C to 80 Shore C and a hardness, as measured on the golf ball, of 40 Shore D to 55 Shore D.

7. The golf ball of claim 1, wherein the outer cover layer has a first hardness and the inner cover layer has a second hardness, and a ratio of the first to second hardness is 0.8 to 0.7.

8. The golf ball of claim 1, wherein the outer cover layer has a thickness of 0.025 inches to 0.04 inches.

9. The golf ball of claim 1, wherein the inner cover layer has a thickness of 0.01 inches to 0.045 inches.

10. The golf ball of claim 1, wherein the inner cover layer has a thickness of 0.025 inches to 0.035 inches.

11. The golf ball of claim 1, wherein the core has an outer diameter of 1.5 inches to 1.6 inches.

12. The golf ball of claim 1, wherein the isocyanate mixture has 6% free isocyanate to 9.5% free isocyanate.

13. A golf ball consisting of a core and an outer cover layer, the outer cover layer being formed from a polyurea comprising:

a prepolymer comprising:

an aliphatic isocyanate mixture comprising dimerized uretdione of HDI and trimerized isocyanurate of HDI;

a modified polyoxypropylene diamine; and a caprolactone; and a curative comprising a mixture of 3,5-diethyl-2,4-toluenediamine and 3,5-diethyl-2,6-toluenediamine.

14. The golf ball of claim 13, wherein the aliphatic isocyanate mixture further comprises trimerized biuret of HDI.

15. The golf ball of claim 13, wherein the modified polyoxypropylene diamine does not contain an —OH group.

16. The golf ball of claim 13, wherein the core comprises a solid center and an outer core layer.

17. The golf ball of claim 16, wherein the golf ball further comprises an inner cover layer disposed between the outer core layer and the outer cover layer, the inner cover layer having a thickness of 0.02 inches to 0.04 inches.

18. The golf ball of claim 17, wherein the golf ball has an Atti compression of 95 to 120.

19. The golf ball of claim 13, wherein the golf ball further comprises an inner cover layer disposed between the core and the outer cover layer, the inner cover layer and outer cover layer each having a thickness of 0.01 inches to 0.045 inches.

* * * * *